US006581835B1

(12) United States Patent
Lucera et al.

(10) Patent No.: US 6,581,835 B1
(45) Date of Patent: Jun. 24, 2003

(54) METHOD OF AND SYSTEM FOR SCANNING BAR CODE SYMBOLS USING A LASER SCANNING PATTERN HAVING MULTIPLE FOCAL ZONES, WHEREIN THE MINIMUM BEAM DIMENSION/MINIMUM BAR WIDTH (MBD/MBW) RATIO IS GREATER THAN OR EQUAL TO 2.0

(75) Inventors: Mark Lucera, Pine Hill, NJ (US); Frank Check, San Jose, CA (US); C. Harry Knowles, Moorestown, NJ (US); Xiaoxun Zhu, Philadelphia, PA (US); LeRoy Dickson, Morgan Hill, CA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 09/500,874

(22) Filed: Feb. 9, 2000

Related U.S. Application Data

(63) Continuation of application No. 09/441,718, filed on Nov. 18, 1999, which is a continuation of application No. 09/241,930, filed on Feb. 2, 1999, which is a continuation of application No. 09/157,778, filed on Sep. 21, 1998, which is a continuation of application No. 09/047,146, filed on Mar. 24, 1998, which is a continuation of application No. 08/949,915, filed on Oct. 14, 1997, now Pat. No. 6,158,659, which is a continuation of application No. 08/854,832, filed on May 12, 1997, now Pat. No. 6,085,978, which is a continuation of application No. 08/886,806, filed on Apr. 22, 1997, now Pat. No. 5,984,185, which is a continuation of application No. 08/726,522, filed on Oct. 7, 1996, now Pat. No. 6,073,846, which is a continuation of application No. 08/573,949, filed on Dec. 18, 1995, now abandoned.

(51) Int. Cl.[7] .................................................. G06K 7/10

(52) U.S. Cl. ............................. 235/462.01; 235/462.16; 235/462.22; 235/462.23; 235/462.39; 235/462.43

(58) Field of Search ....................... 235/462.01, 462.16, 235/462.22, 472.01

(56) References Cited

U.S. PATENT DOCUMENTS 4,000,397 A 12/1976 Hebert et al.

(List continued on next page.)

FOREIGN PATENT DOCUMENTS

GB 2 246 653 B 2/1992

Primary Examiner—Michael G. Lee
Assistant Examiner—Ahshik Kim
(74) Attorney, Agent, or Firm—Thomas J. Perkowski, Esq., P.C.

(57) ABSTRACT

A multi-focal zone laser scanning system for scanning bar code symbols having a minimum bar element width (MBW). The multi-focal zone laser scanning system comprises a laser beam producing device for producing a laser beam, and a laser beam scanning mechanism for scanning the laser beam so as to generate a laser scanning pattern having a plurality of different focal zones. In the system, the scanned laser beam has a minimum beam dimension (MBD) with each focal zone, and the ratio of the minimum beam dimension (MDB) within each focal zone to the minimum bar element width (MBW) of a scanned bar code symbol therewithin (i.e. MDB/MBW) is greater than or equal to 2.0. Consequently, less modulation of the laser scanning beam is required during scanning operations, and therefore, bar code symbols having narrower minimum bar element widths can be resolved.

6 Claims, 48 Drawing Sheets

| FOCAL PLANE | FP1 | FP2 | FP3 | FP4 | FP5 |
|---|---|---|---|---|---|
| LASER BEAM CROSS-SECTION AT FOCAL PLANE | 10 MILS. | 12 MILS. | 14 MILS. | 16 MILS. | 18 MILS. |
| MINIMUM BAR CODE ELEMENT THAT CAN BE RESOLVED | 5.0 MILS. | 6 MILS. | 7 MILS. | 8 MILS. | 9 MILS. |
| MBD/MBW RATIO | 2.0. | 2.0. | 2.0. | 2.0. | 2.0. |

U.S. PATENT DOCUMENTS

| | | |
|---|---|---|
| 4,409,470 A | 10/1983 | Shepard et al. |
| 4,542,528 A | 9/1985 | Sanner et al. |
| 4,548,463 A | 10/1985 | Cato et al. |
| 4,560,862 A | 12/1985 | Eastman et al. |
| 4,728,789 A | 3/1988 | Broockman et al. |
| 4,758,058 A | 7/1988 | Cato et al. |
| 4,798,943 A | 1/1989 | Cherry |
| 4,800,256 A | 1/1989 | Brookkman et al. |
| 5,298,728 A | 3/1994 | Elliott et al. |
| 5,302,812 A * | 4/1994 | Li et al. ................. 235/462.22 |
| 5,347,121 A | 9/1994 | Rudeen |
| 5,371,361 A | 12/1994 | Arends et al. |
| 5,463,211 A | 10/1995 | Arends et al. |
| 5,479,011 A * | 12/1995 | Rudeen ....................... 250/235 |
| 5,537,411 A * | 7/1996 | Chen et al. ................. 714/108 |
| 5,545,888 A | 8/1996 | Barkan et al. |
| 5,565,668 A * | 10/1996 | Reddersen et al. .... 235/462.22 |
| 5,641,958 A * | 6/1997 | Rudeen ....................... 250/235 |
| 5,869,827 A | 2/1999 | Rando |
| 5,923,023 A | 7/1999 | Arends et al. |
| 5,925,868 A | 7/1999 | Arends et al. |
| 5,952,644 A | 9/1999 | Barkan |
| 6,047,894 A | 4/2000 | Arends et al. |
| 6,328,212 B1 * | 12/2001 | Metlinsky et al. ...... 235/462.16 |

* cited by examiner

| SCANNER: | 4 LINES/5 FOCAL PLANES | | | | | |
|---|---|---|---|---|---|---|
| ROTATIONAL SPEED OF DISK (RPM) | 5200 | | | | | |

FACET PARAMETERS

| | FACET | DIFFRACTION FOCAL LENGTH (INCHES) | GEOMETRICAL FOCAL LENGTH (INCHES) | ANGLE A (DEGREES) | ANGLE B (DEGREES) | ANGLE OF DIFFRACTION (DEGREES) | SCAN ANGLE (DEGREES) |
|---|---|---|---|---|---|---|---|
| F21 | 1 | 39.04 | 39.11 | 45.9 | 55.30 | 34.70 | 26.24 |
| | 2 | 39.04 | 39.11 | 45.9 | 55.30 | 34.70 | 26.24 |
| | 3 | 39.04 | 39.11 | 45.9 | 55.30 | 34.70 | 26.24 |
| | 4 | 39.04 | 39.11 | 45.9 | 55.30 | 34.70 | 26.24 |
| F22 | 5 | 45.04 | 45.14 | 45.9 | 55.54 | 34.46 | 22.84 |
| | 6 | 45.04 | 45.14 | 45.9 | 55.54 | 34.46 | 22.84 |
| | 7 | 45.04 | 45.14 | 45.9 | 55.54 | 34.46 | 22.84 |
| | 8 | 45.04 | 45.14 | 45.9 | 55.54 | 34.46 | 22.84 |
| F23 | 9 | 51.54 | 51.69 | 45.9 | 55.73 | 34.27 | 20.03 |
| | 10 | 51.54 | 51.69 | 45.9 | 55.73 | 34.27 | 20.03 |
| | 11 | 51.54 | 51.69 | 45.9 | 55.73 | 34.27 | 20.03 |
| | 12 | 51.54 | 51.69 | 45.9 | 55.73 | 34.27 | 20.03 |
| F24 | 13 | 58.34 | 58.56 | 45.9 | 55.89 | 34.11 | 17.73 |
| | 14 | 58.34 | 58.56 | 45.9 | 55.89 | 34.11 | 17.73 |
| | 15 | 58.34 | 58.56 | 45.9 | 55.89 | 34.11 | 17.73 |
| | 16 | 58.34 | 58.56 | 45.9 | 55.89 | 34.11 | 17.73 |
| F25 | 17 | 64.94 | 65.24 | 45.9 | 56.02 | 33.98 | 15.95 |
| | 18 | 64.94 | 65.24 | 45.9 | 56.02 | 33.98 | 15.95 |
| | 19 | 64.94 | 65.24 | 45.9 | 56.02 | 33.98 | 15.95 |
| | 20 | 64.94 | 65.24 | 45.9 | 56.02 | 33.98 | 15.95 |

FIG. 1H

| SCAN MULT. FACTOR(M) | ROTATION ANGLE (DEGREES) | MAXIMUM COLLECTION AREA (IGNORING NOTCH) (SQ. INCHES) | DESIGN COLLECTION AREA (INCLUDES NOTCH LOSS OF 0.15) (SQ. INCHES) | BEAM SPEED AT CENTER OF SCAN LINE (INCHES/SEC) | BEAM SPEED AT MAX DEPTH OF FIELD (INCHES/SEC) | BEAM SPEED AT MIN DEPTH OF FIELD (INCHES/SEC) |
|---|---|---|---|---|---|---|
| 1.37 | 19.19 | 1.29 | 1.36 | 29078 | 32057 | 26099 |
| 1.37 | 19.19 | 1.29 | 1.36 | 29078 | 32057 | 26099 |
| 1.37 | 19.19 | 1.29 | 1.36 | 29078 | 32057 | 26099 |
| 1.37 | 19.19 | 1.29 | 1.36 | 29078 | 32057 | 26099 |
| 1.35 | 16.91 | 1.71 | 1.75 | 33126 | 36068 | 30184 |
| 1.35 | 16.91 | 1.71 | 1.75 | 33126 | 36068 | 30184 |
| 1.35 | 16.91 | 1.71 | 1.75 | 33126 | 36068 | 30184 |
| 1.35 | 16.91 | 1.71 | 1.75 | 33126 | 36068 | 30184 |
| 1.34 | 14.98 | 2.23 | 2.23 | 37511 | 40423 | 34600 |
| 1.34 | 14.98 | 2.23 | 2.23 | 37511 | 40423 | 34600 |
| 1.34 | 14.98 | 2.23 | 2.23 | 37511 | 40423 | 34600 |
| 1.34 | 14.98 | 2.23 | 2.23 | 37511 | 40423 | 34600 |
| 1.33 | 13.38 | 2.84 | 2.81 | 42099 | 44986 | 39213 |
| 1.33 | 13.38 | 2.84 | 2.81 | 42099 | 44986 | 39213 |
| 1.33 | 13.38 | 2.84 | 2.81 | 42099 | 44986 | 39213 |
| 1.33 | 13.38 | 2.84 | 2.81 | 42099 | 44986 | 39213 |
| 1.32 | 12.12 | 3.51 | 3.43 | 46553 | 49420 | 43685 |
| 1.32 | 12.12 | 3.51 | 3.43 | 46553 | 49420 | 43685 |
| 1.32 | 12.12 | 3.51 | 3.43 | 46553 | 49420 | 43685 |
| 1.32 | 12.12 | 3.51 | 3.43 | 46553 | 49420 | 43685 |

FIG. 1H1

| SCAN RANGE | DEPTH OF FIELD | FOCAL ZONES |
|---|---|---|
| NEAR | 0 TO 13 INCHES | 1 AND 2 |
| FAR | 12 TO 33 INCHES | 3,4 AND 5 |

FIG. 1I

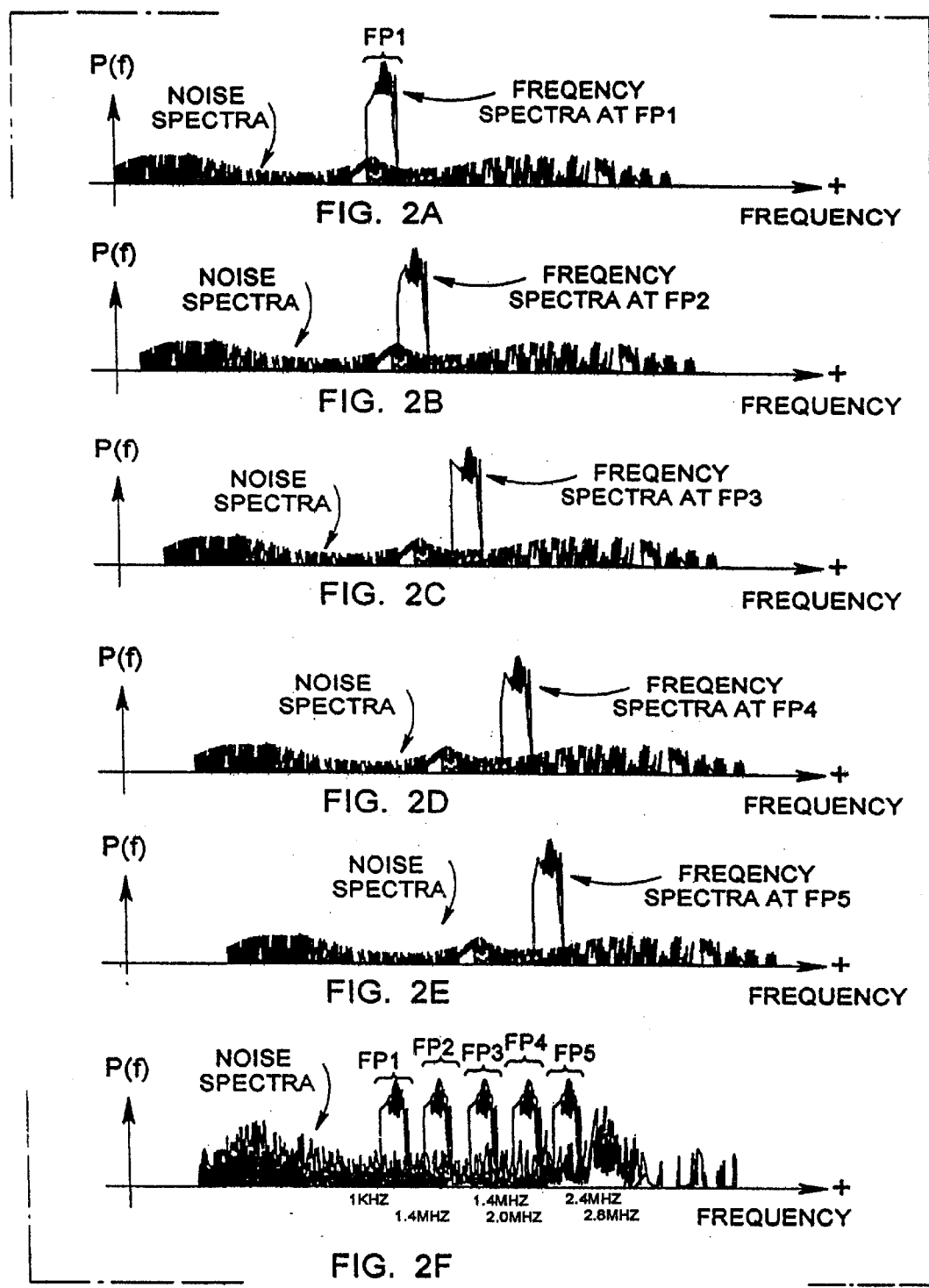

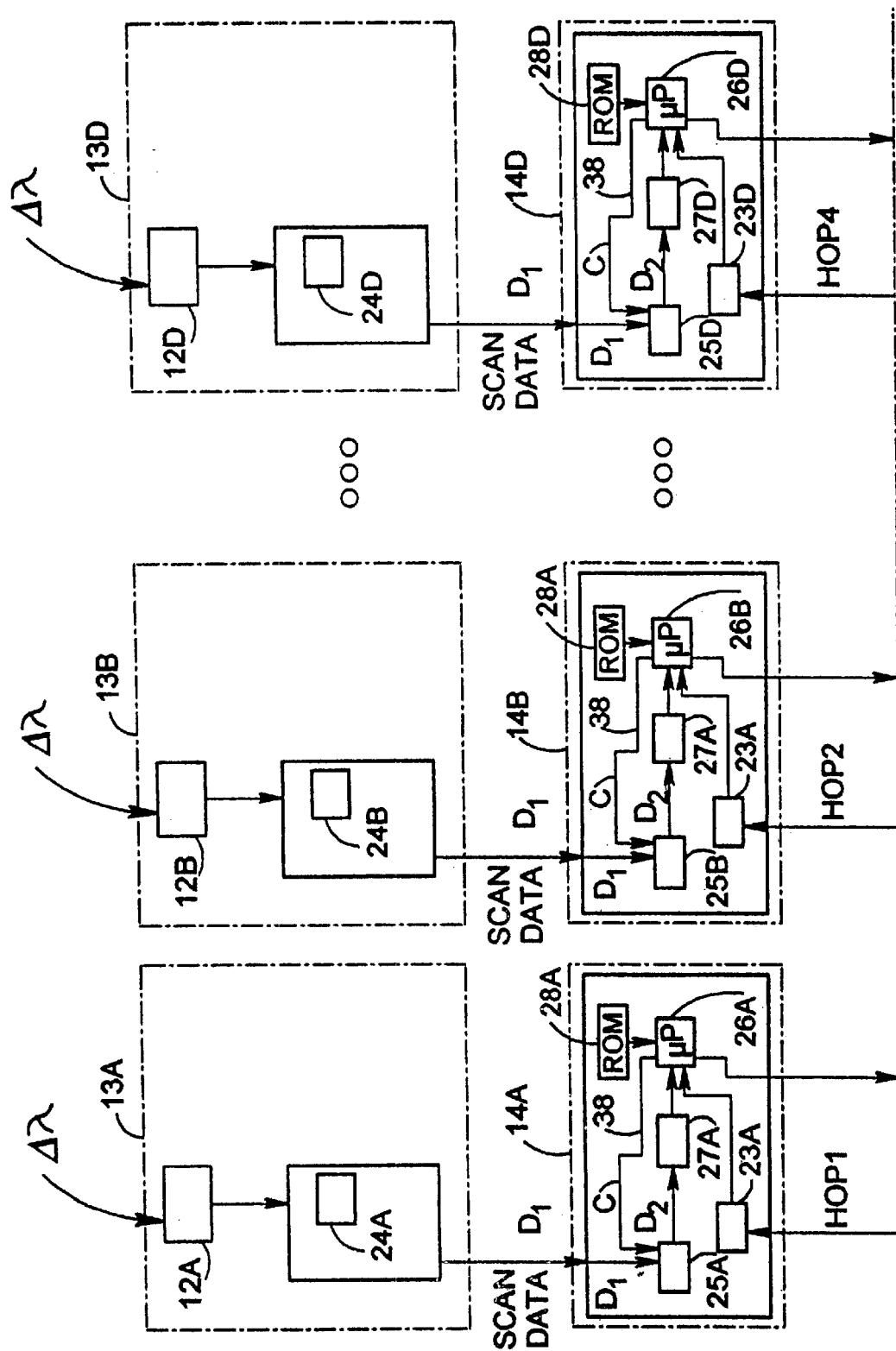
FIG. 3A1

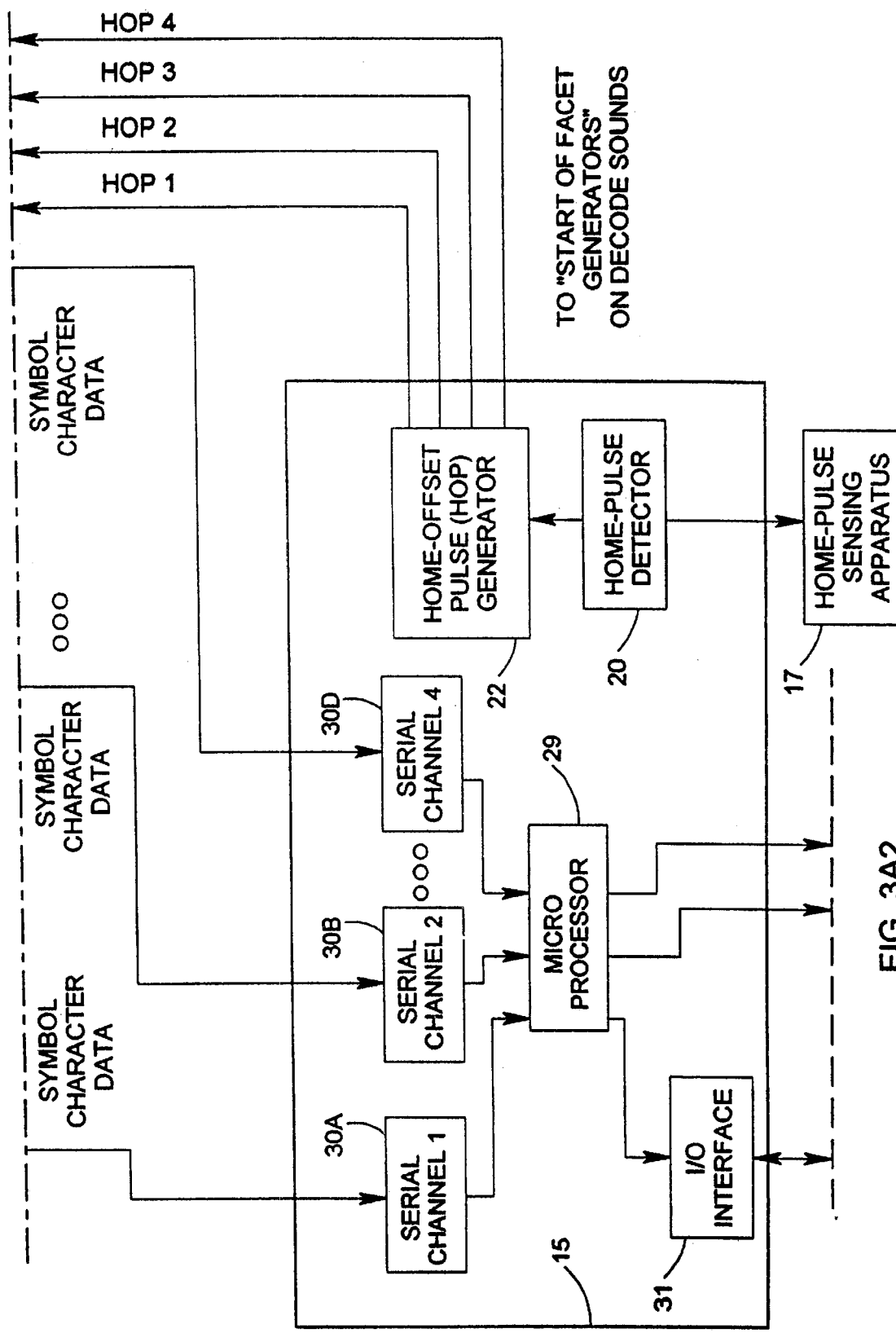
FIG. 3A2

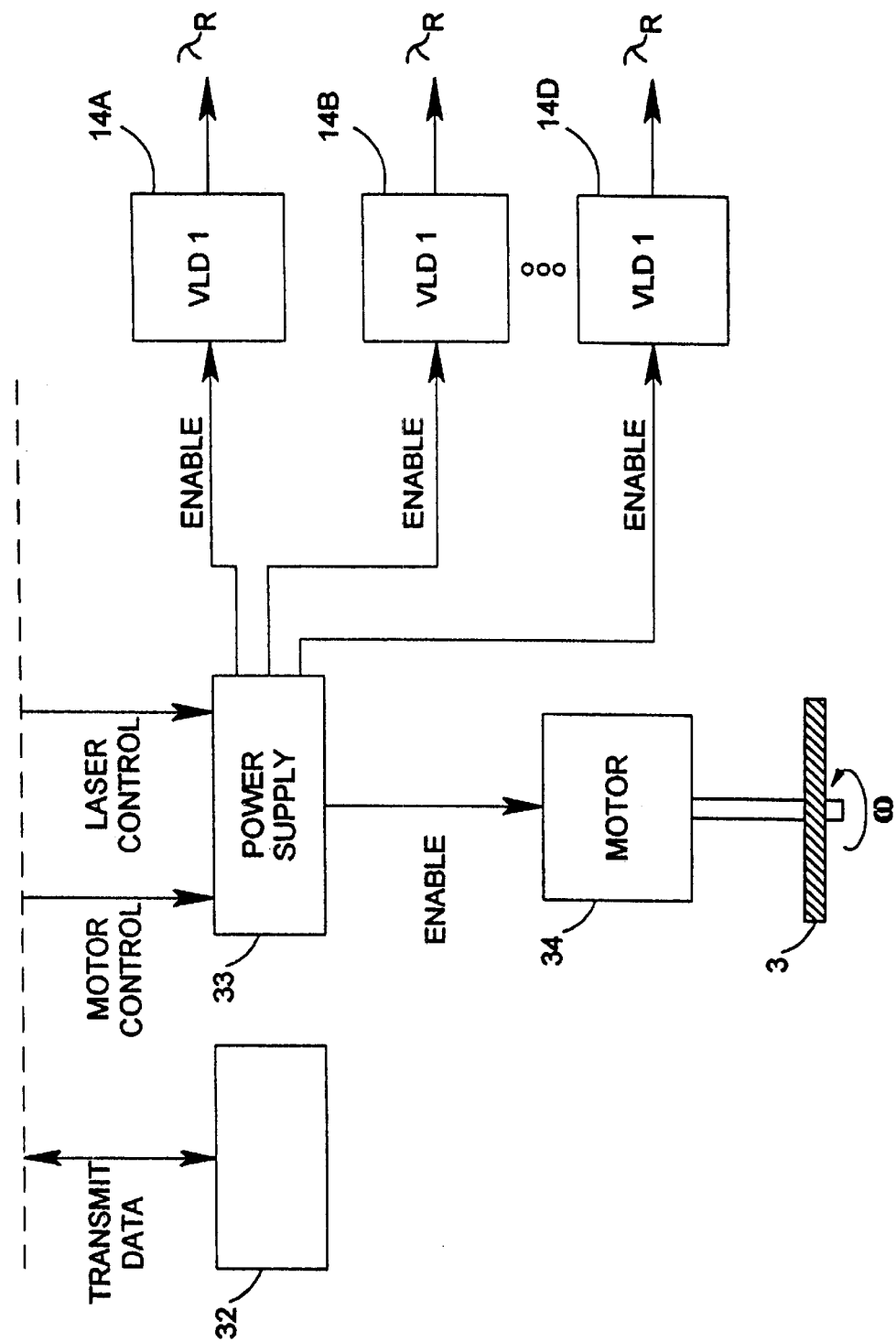
FIG. 3A3

"DATA TABLE EMBODIED IN SFP GENERATOR ON DIODE PROCESSOR BOARD"

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

$\omega$ = 5200 RPM    CLOCK PULSE WIDTH = 4 µSEC

FIG. 3C

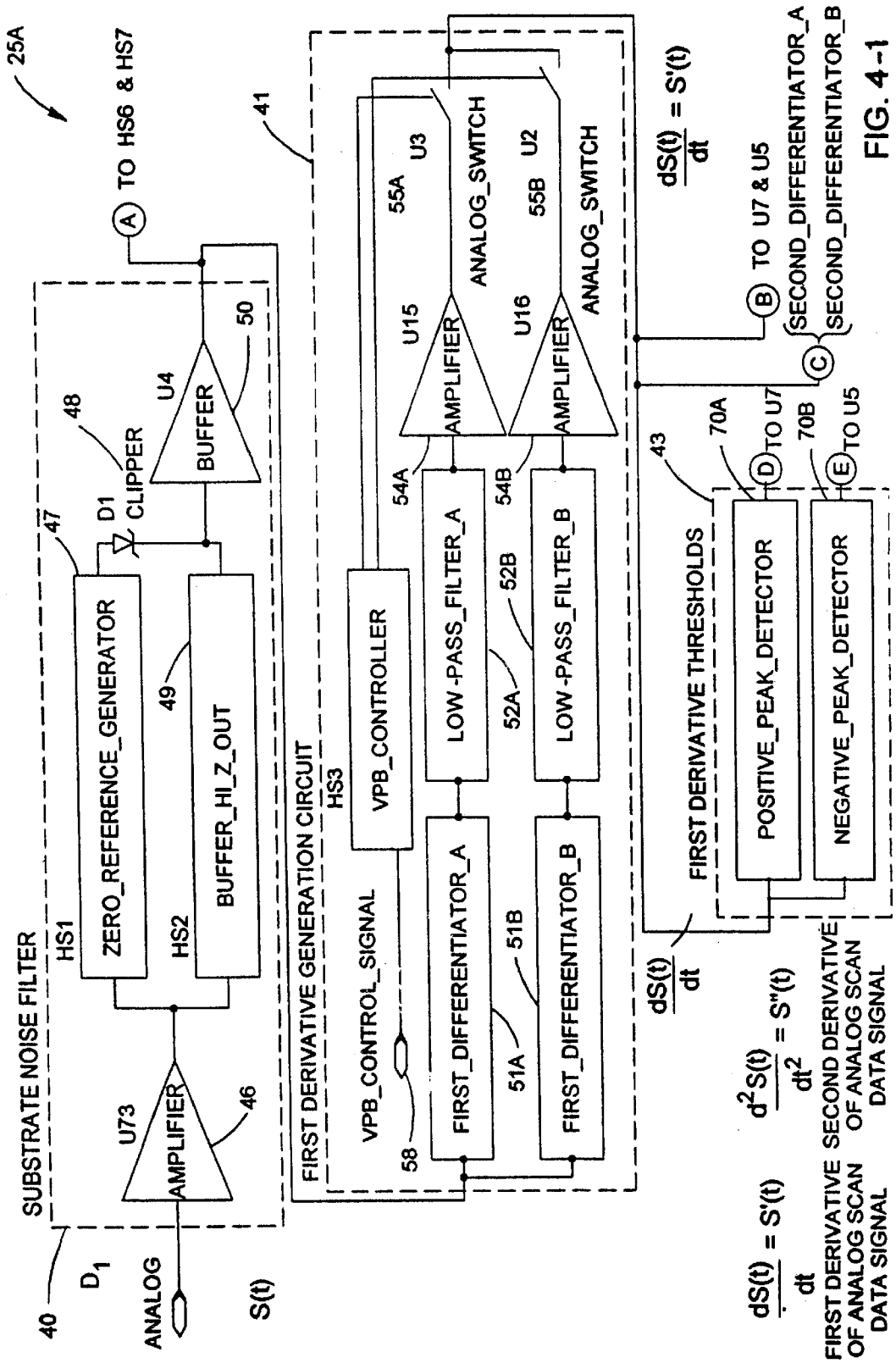

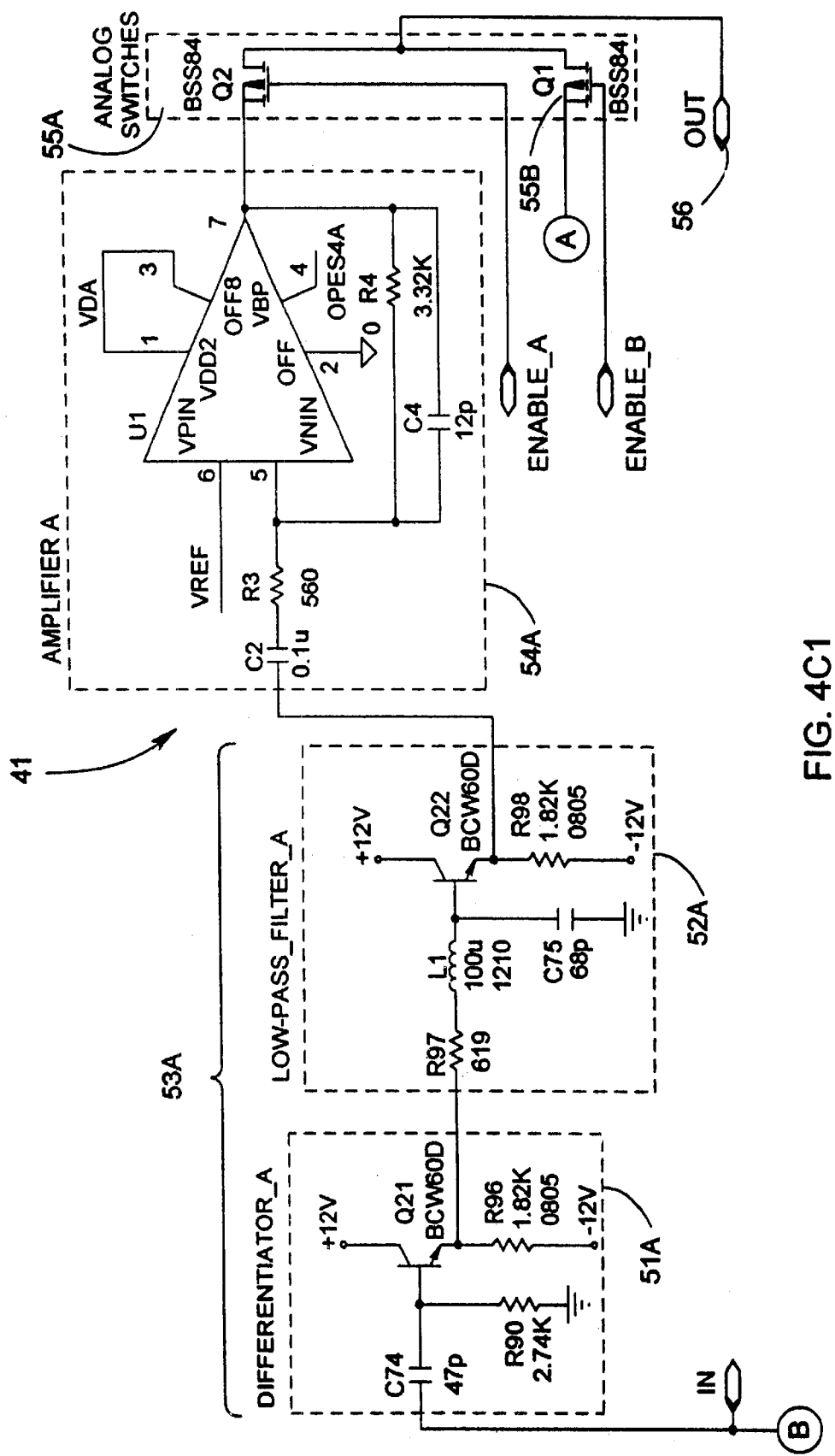
FIG. 4C1

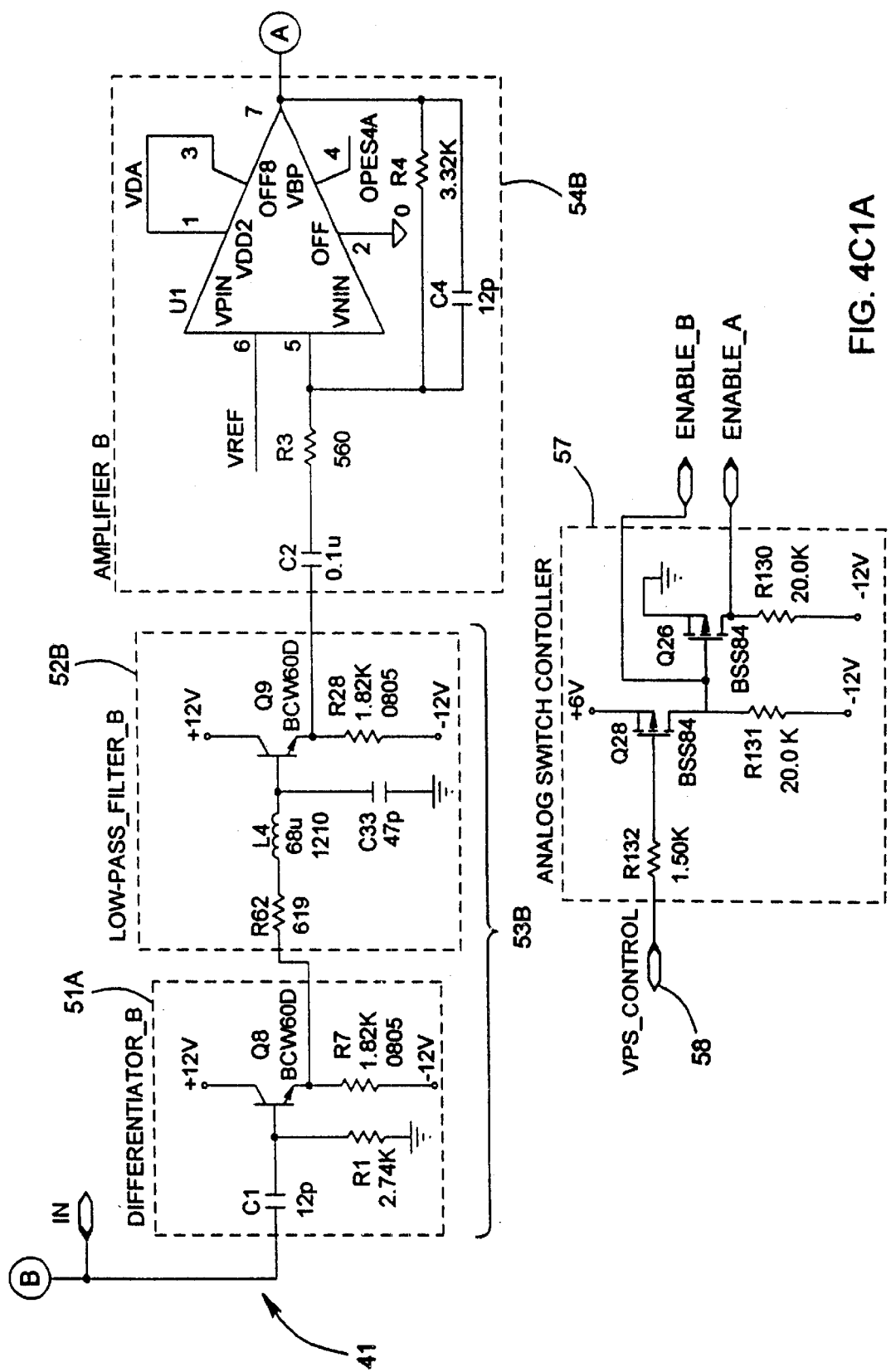
FIG. 4C1A

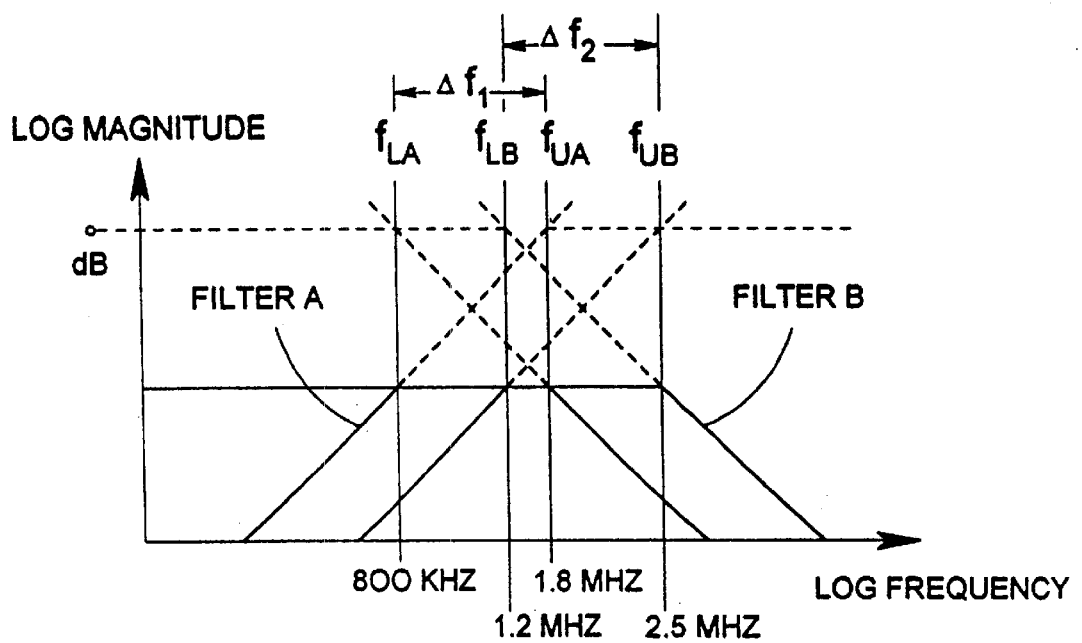

FIG. 4C2

| VPB CONTROLLER INPUT LEVEL | NEAR SCAN RANGE FIRST DERIVATIVE SIGNAL FILTERED | FAR SCAN RANGE FILTERED FIRST DERIVATIVE |
|---|---|---|
| LOW | 800 KHZ - 1.8MHZ | DISABLED |
| HIGH | DISABLED | 1.2 MHZ - 2.5 MHZ |

FIG. 4C3

$$f_{LA} \leq \frac{\text{MAXIMUM BEAM SPOT SPEED IN FZ2}}{2 \cdot \text{MINIMUM BAR CODE ELEMENT WIDTH}}$$

$$f_{UA} \geq \frac{\text{MAXIMUM BEAM SPOT SPEED IN FZ2}}{2 \cdot \text{MINIMUM BAR CODE ELEMENT WIDTH}}$$

$$f_{LB} \leq \frac{\text{MAXIMUM BEAM SPOT SPEED IN FZ5}}{2 \cdot \text{MINIMUM BAR CODE ELEMENT WIDTH}}$$

$$f_{UB} \geq \frac{\text{MAXIMUM BEAM SPOT SPEED IN FZ5}}{2 \cdot \text{MINIMUM BAR CODE ELEMENT WIDTH}}$$

FIG. 4C4

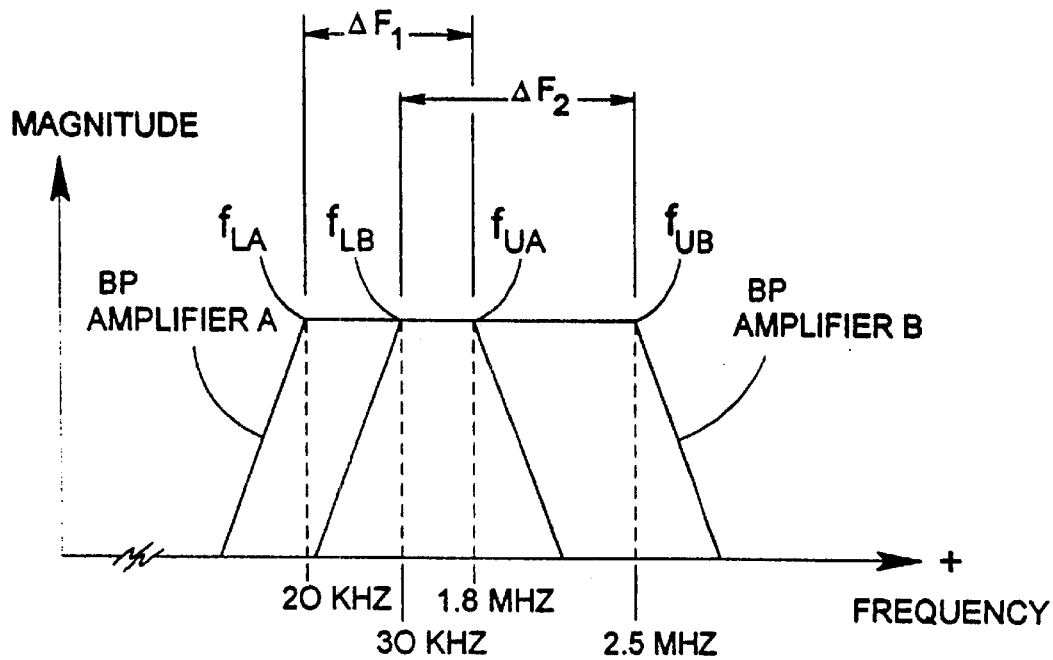

FIG. 4C5

| VPB CONTROLLED INPUT LEVEL | NEAR SCAN RANGE FIRST DERIVATIVE SIGNAL PASS-BAND AMPLIFIER | FAR SCAN RANGE FIRST DERIVATIVE SIGNAL PASS-BAND AMPLIFIER |
|---|---|---|
| LOW | 20 KHZ - 1.8MHZ | DISABLED |
| HIGH | DISABLED | 30KHZ - 2.5 MHZ |

FIG. 4C6

$$f_{LA} \leq \frac{\text{MINIMUM BEAM SPOT SPEED IN FOCAL ZONE FZ1}}{20 \cdot (\text{MAXIMUM BAR CODE ELEMENT WIDTH})}$$

$$f_{UA} \geq \frac{\text{MAXIMUM BEAM SPOT SPEED IN FOCAL ZONE FZ2}}{2 \cdot (\text{MINIMUM BAR CODE ELEMENT WIDTH})}$$

$$f_{LB} \leq \frac{\text{MINIMUM BEAM SPOT SPEED IN FOCAL ZONE FZ3}}{20 \cdot (\text{MAXIMUM BAR CODE ELEMENT WIDTH})}$$

$$f_{UB} \geq \frac{\text{MAXIMUM BEAM SPOT SPEED IN FOCAL ZONE FZ5}}{2 \cdot (\text{MINIMUM BAR CODE ELEMENT WIDTH})}$$

FIG. 4C7

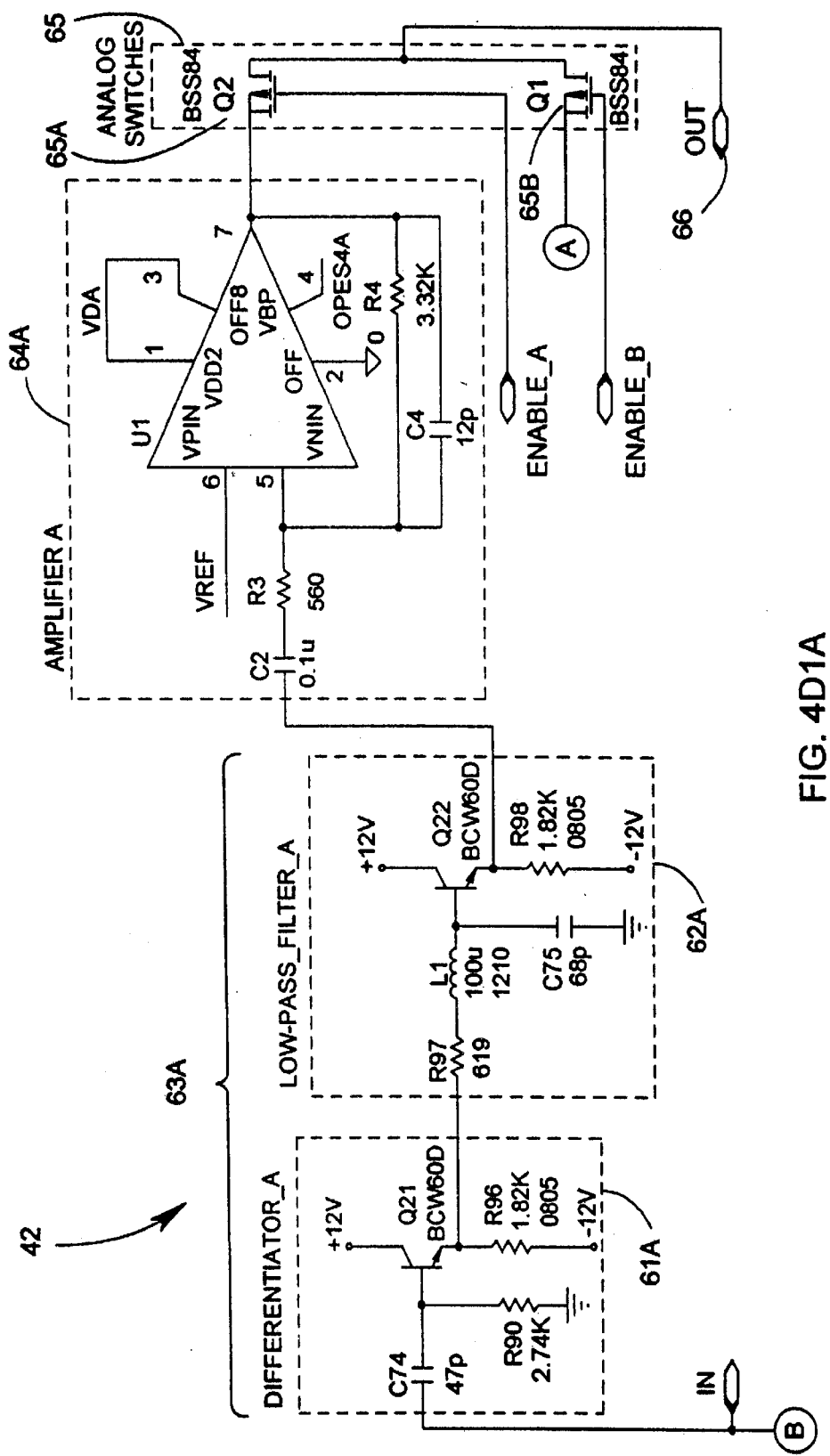
FIG. 4D1A

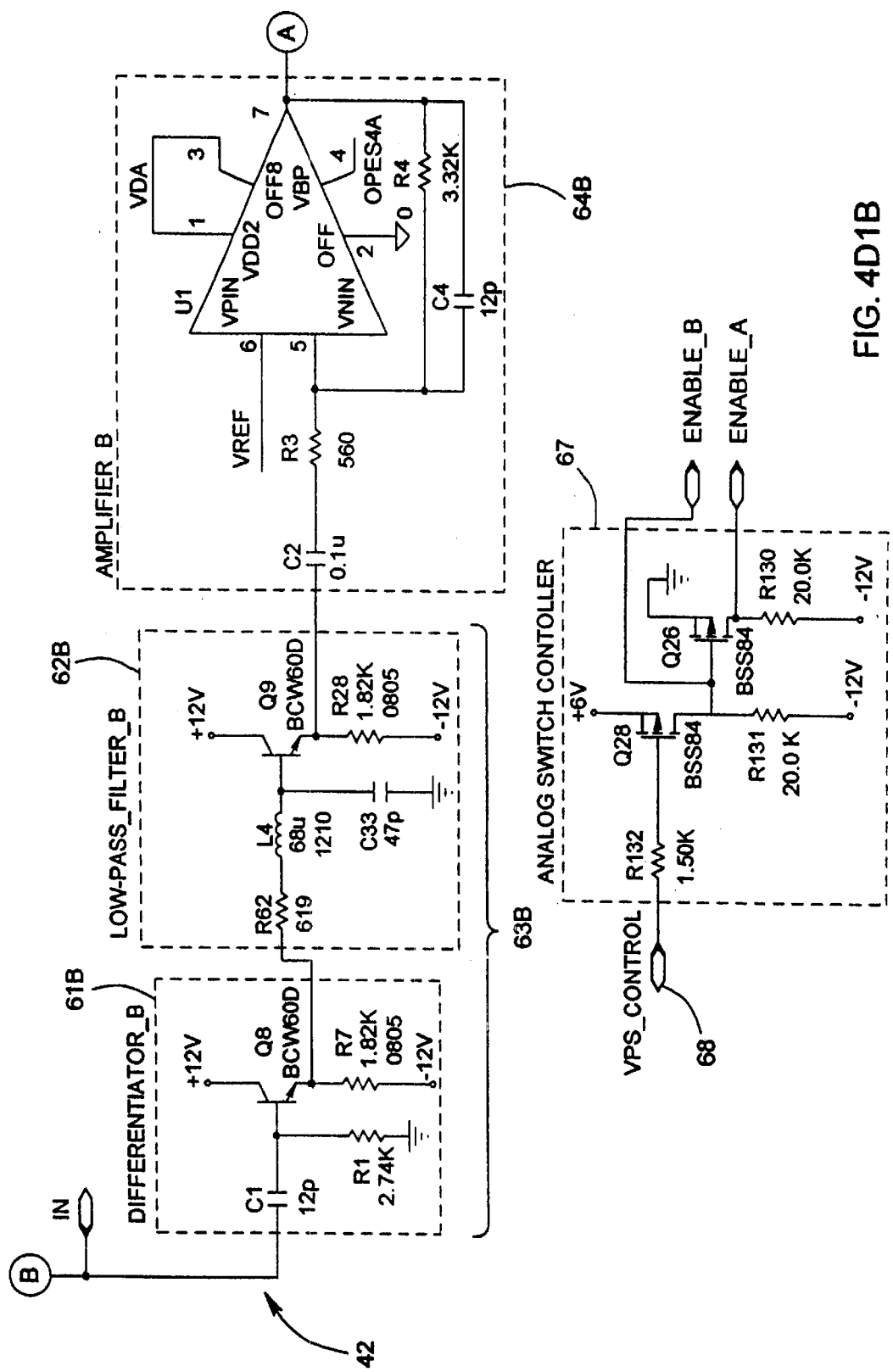
FIG. 4D1B

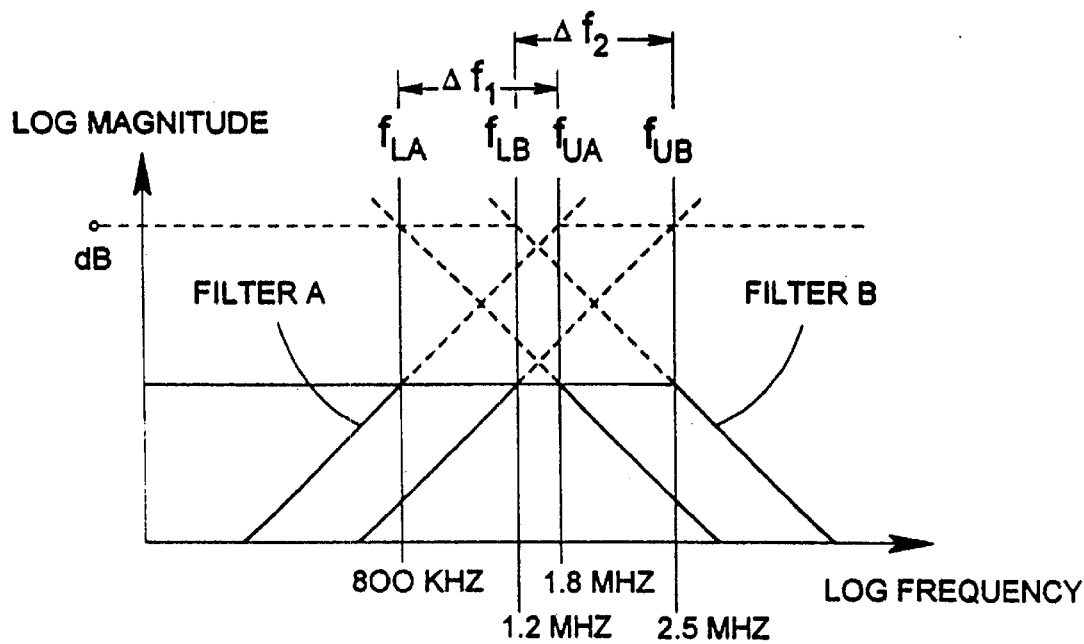

FIG. 4D2

| VPB CONTROLLER INPUT LEVEL | NEAR SCAN RANGE FIRST DERIVATIVE SIGNAL FILTERED | FAR SCAN RANGE FILTERED FIRST DERIVATIVE |
|---|---|---|
| LOW | 800 KHZ - 1.8MHZ | DISABLED |
| HIGH | DISABLED | 1.2 MHZ - 2.5 MHZ |

FIG. 4D3

$$f_{LA} \leq \frac{\text{MAXIMUM BEAM SPOT SPEED IN FZ2}}{2 \cdot \text{MINIMUM BAR CODE ELEMENT WIDTH}}$$

$$f_{UA} \geq \frac{\text{MAXIMUM BEAM SPOT SPEED IN FZ2}}{2 \cdot \text{MINIMUM BAR CODE ELEMENT WIDTH}}$$

$$f_{LB} \leq \frac{\text{MAXIMUM BEAM SPOT SPEED IN FZ5}}{2 \cdot \text{MINIMUM BAR CODE ELEMENT WIDTH}}$$

$$f_{UB} \geq \frac{\text{MAXIMUM BEAM SPOT SPEED IN FZ5}}{2 \cdot \text{MINIMUM BAR CODE ELEMENT WIDTH}}$$

FIG. 4D4

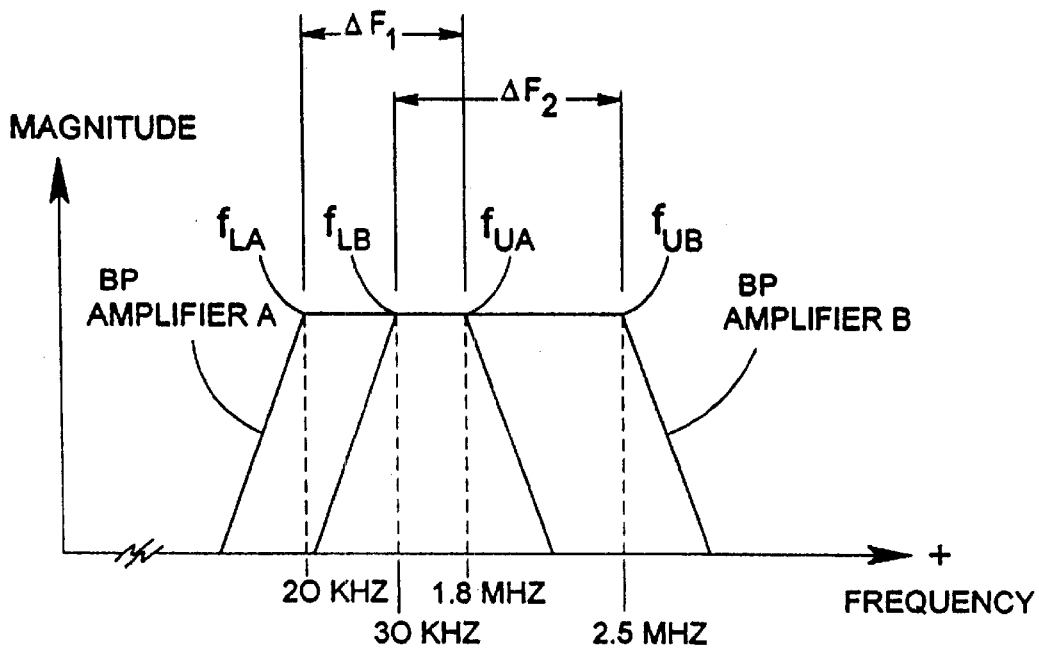

FIG. 4D5

| | NEAR SCAN RANGE SECOND DERIVATIVE SIGNAL PASS-BAND AMPLIFIER | FAR SCAN RANGE SECOND DERIVATIVE SIGNAL PASS-BAND AMPLIFIER |
|---|---|---|
| LOW | 20 KHZ - 1.8MHZ | DISABLED |
| HIGH | DISABLED | 30KHZ - 2.5 MHZ |

FIG. 4D6

$$f_{LA} \leq \frac{\text{MINIMUM BEAM SPOT SPEED IN FOCAL ZONE FZ1}}{20 \cdot (\text{MAXIMUM BAR CODE ELEMENT WIDTH})}$$

$$f_{UA} \geq \frac{\text{MAXIMUM BEAM SPOT SPEED IN FOCAL ZONE FZ2}}{2 \cdot (\text{MINIMUM BAR CODE ELEMENT WIDTH})}$$

$$f_{LB} \leq \frac{\text{MINIMUM BEAM SPOT SPEED IN FOCAL ZONE FZ3}}{20 \cdot (\text{MAXIMUM BAR CODE ELEMENT WIDTH})}$$

$$f_{UB} \geq \frac{\text{MAXIMUM BEAM SPOT SPEED IN FOCAL ZONE FZ5}}{2 \cdot (\text{MINIMUM BAR CODE ELEMENT WIDTH})}$$

FIG. 4D7

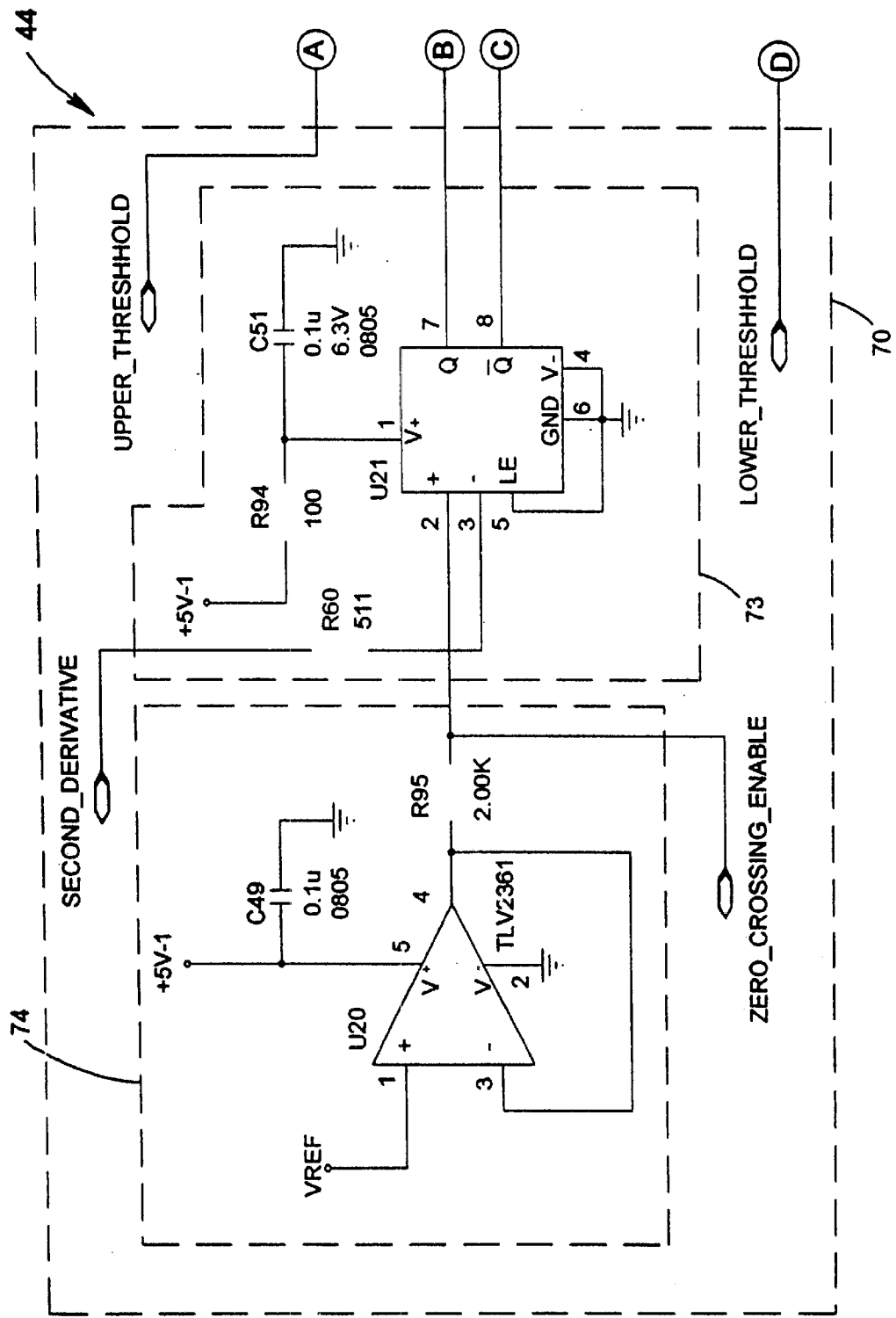
FIG. 4F  1-BIT A/D CONVERTER

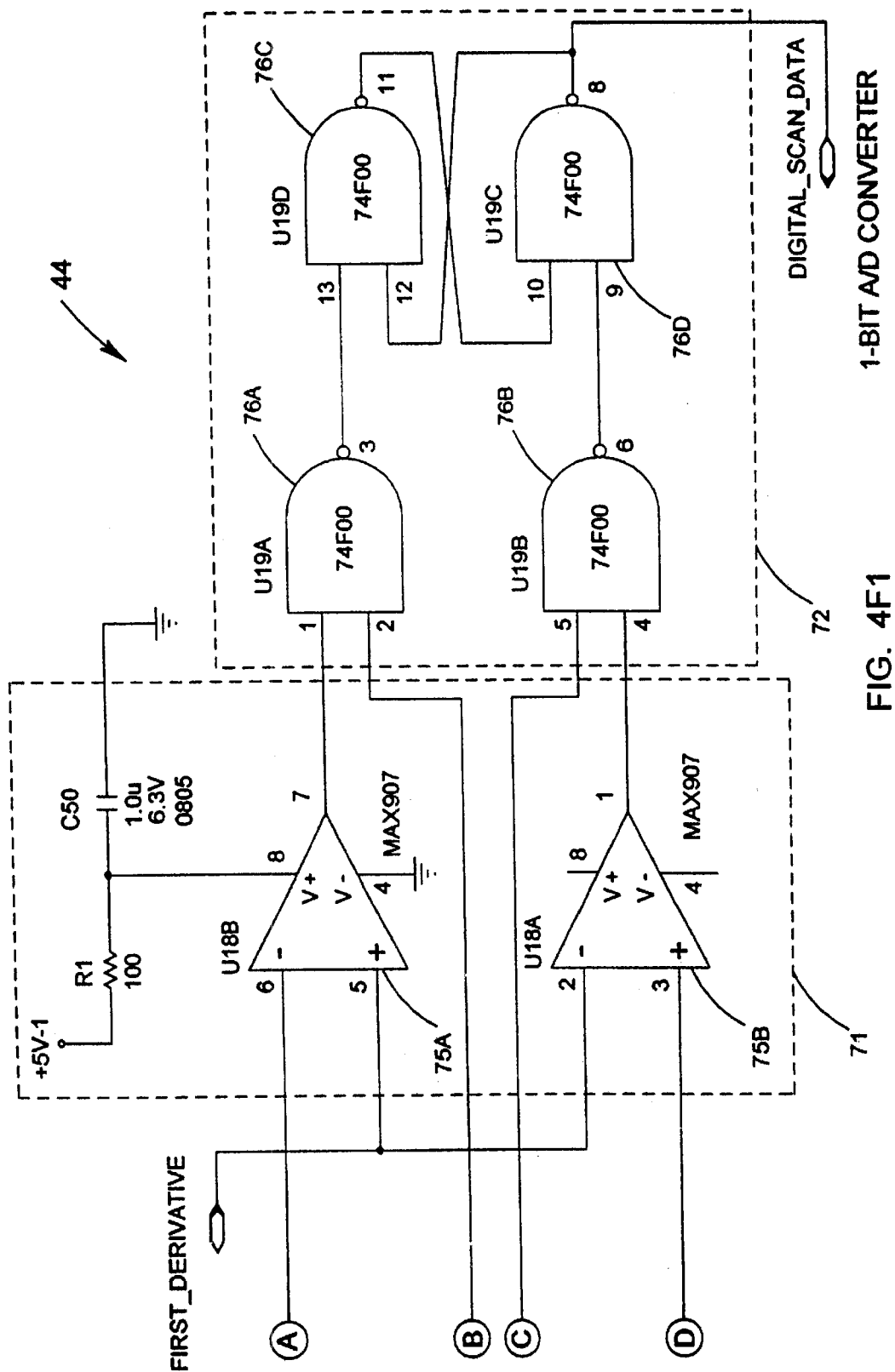
FIG. 4F1

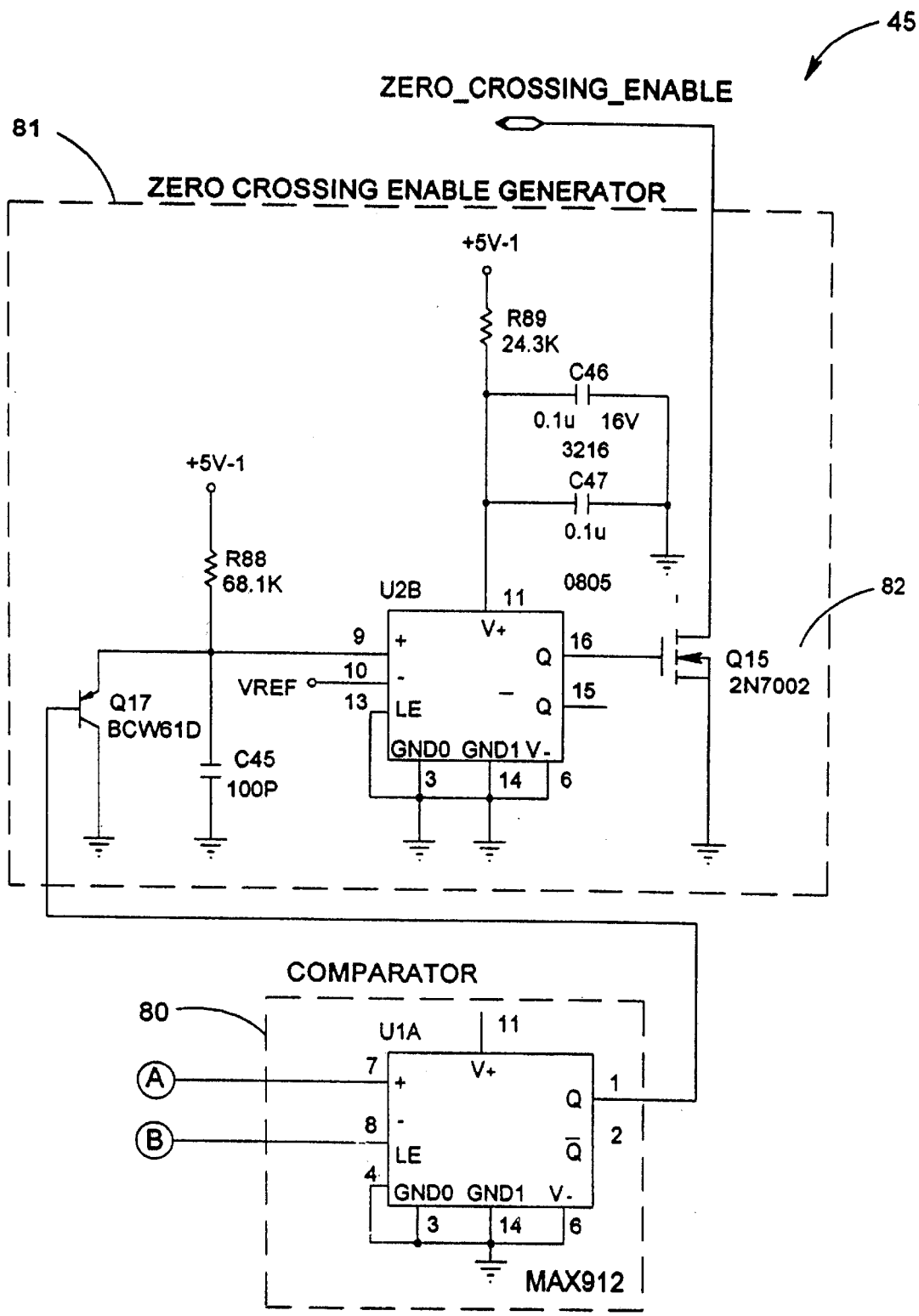
FIG. 4G1

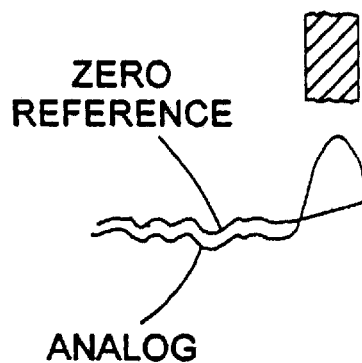
FIG. 4H1
FIG. 4H2
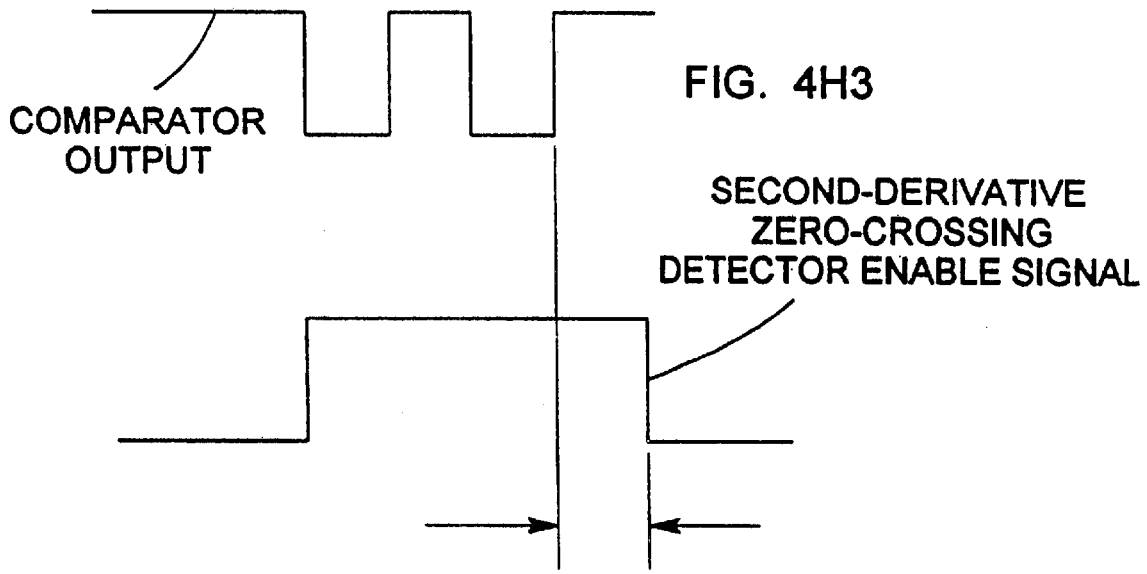
FIG. 4H3
FIG. 4H4

| FOCAL PLANE | FP1 | FP2 | FP3 | FP4 | FP5 |
|---|---|---|---|---|---|
| LASER BEAM CROSS-SECTION AT FOCAL PLANE | 10 MILS. | 12 MILS. | 14 MILS. | 16 MILS. | 18 MILS. |
| MINIMUM BAR CODE ELEMENT THAT CAN BE RESOLVED | 5.0 MILS. | 6 MILS. | 7 MILS. | 8 MILS. | 9 MILS. |
| MBD/MBW RATIO | 2.0. | 2.0. | 2.0. | 2.0. | 2.0. |

FIG 5C

BEAM SPOT SPEED/SCANNING DISTANCE LOOK-UP TABLE 92

BAR CODE RESOLUTION SPECIFIED BY MINIMUM ELEMENT WIDTH (X)

| BEAM SPOT SPEED | SCANNING DISTANCE | $X_1$ | $X_2$ | $X_3$ | $X_4$ | $X_5$ | $X_6$ | $X_7$ | $X_8$ | ... | $X_n$ |
|---|---|---|---|---|---|---|---|---|---|---|---|
| $V_1$ | $d_1$ | $T_{11}$ | $T_{12}$ | $T_{13}$ | $T_{14}$ | $T_{15}$ | $T_{16}$ | $T_{17}$ | $T_{18}$ | ... | $T_{1n}$ |
| $V_2$ | $d_2$ | $T_{21}$ | $T_{22}$ | $T_{23}$ | $T_{24}$ | $T_{25}$ | $T_{26}$ | $T_{27}$ | $T_{28}$ | ... | $T_{2n}$ |
| $V_3$ | $d_3$ | | | | | | | | | ... | |
| $V_4$ | $d_4$ | | | | | | | | | ... | |
| $V_5$ | $d_5$ | | | | | | | | | ... | |
| $V_6$ | $d_6$ | | | | | | | | | ... | |
| ... | ... | ... | ... | ... | ... | ... | ... | ... | ... | ... | ... |
| $V_M$ | $d_M$ | $T_{M1}$ | $T_{M2}$ | $T_{M3}$ | $T_{M4}$ | $T_{M5}$ | $T_{M6}$ | $T_{M7}$ | $T_{M8}$ | ... | $T_{Mn}$ |

$T_{11}$ = TIME COUNT OF MINIMUM ELEMENT WIDTH $X_1$ AT SCANNING DISTANCE $d_1$

| BEAM SPOT SPEED | SCANNING DISTANCE | RESOLUTION MINIMUM ELEMENT WIDTH (X) | | | | | | | | | |
|---|---|---|---|---|---|---|---|---|---|---|---|
| | | $X_1$ | $X_2$ | $X_3$ | $X_4$ | $X_5$ | $X_6$ | $X_7$ | $X_8$ | ... | $X_n$ |
| $V_1$ | $d_1$ | $T_{11}$ | $T_{12}$ | $T_{13}$ | $T_{14}$ | $T_{15}$ | $T_{16}$ | $T_{17}$ | $T_{18}$ | ... | $T_{1n}$ |
| $V_2$ | $d_2$ | $T_{21}$ | $T_{22}$ | $T_{23}$ | $T_{24}$ | $T_{25}$ | $T_{26}$ | $T_{27}$ | $T_{28}$ | ... | $T_{2n}$ |
| $V_3$ | $d_3$ | | | | | | | | | | |
| $V_4$ | $d_4$ | | | | | | | | | | |
| $V_5$ | $d_5$ | | | | | | | | | | |
| $V_6$ | $d_6$ | ... | ... | ... | ... | ... | ... | ... | ... | | |
| ... | ... | | | | | | | | | | |
| $V_n$ | $d_M$ | $T_{M1}$ | $T_{M2}$ | $T_{M3}$ | $T_{M4}$ | $T_{M5}$ | $T_{M6}$ | $T_{M7}$ | $T_{M8}$ | | $T_{Mn}$ |

$T_{11}$ = TIME COUNT OF MINIMUM ELEMENT WIDTH $X_1$ AT SCANNING DISTANCE $d_1$

FIG. 7B

| BEAM SPOT SPEED | SCANNING DISTANCE | $X_1$ | $X_2$ | $X_3$ | $X_4$ | $X_5$ | $X_6$ | $X_7$ | $X_8$ | ... | $X_n$ |
|---|---|---|---|---|---|---|---|---|---|---|---|
| $v_1$ | $d_1$ | $T_{11}$ | $T_{12}$ | $T_{13}$ | $T_{14}$ | $T_{15}$ | $T_{16}$ | $T_{17}$ | $T_{18}$ | ... | $T_{1n}$ |
| $v_2$ | $d_2$ | $T_{21}$ | $T_{22}$ | $T_{23}$ | $T_{24}$ | $T_{25}$ | $T_{26}$ | $T_{27}$ | $T_{28}$ | ... | $T_{2n}$ |
| $v_3$ | $d_3$ | | | | | | | | | | |
| $v_4$ | $d_4$ | | | | | | | | | | |
| $v_5$ | $d_5$ | | | | | | | | | | |
| $v_6$ | $d_6$ | | | | | | | | | | |
| ... | ... | ... | ... | ... | ... | ... | ... | ... | ... | ... | |
| $v_n$ | $d_M$ | $T_{M1}$ | $T_{M2}$ | $T_{M3}$ | $T_{M4}$ | $T_{M5}$ | $T_{M6}$ | $T_{M7}$ | $T_{M8}$ | | $T_{Mn}$ |

RESOLUTION MINIMUM ELEMENT WIDTH (X)

$T_{11}$ = TIME COUNT OF MINIMUM ELEMENT WIDTH $X_1$ AT SCANNING DISTANCE $d_1$

FIG. 8B

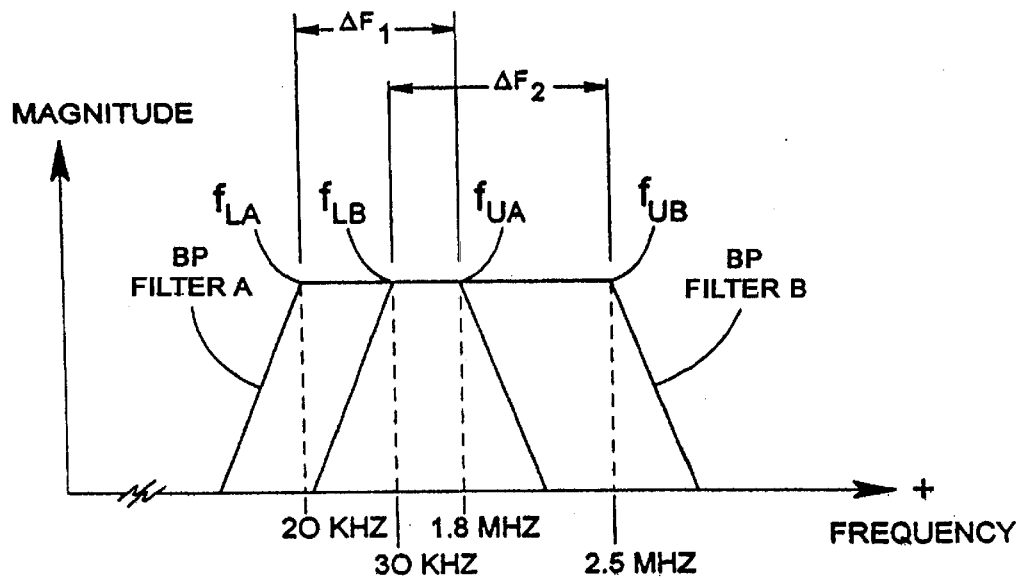

FIG. 9A1

| VPB CONTROLLED INPUT LEVEL | NEAR SCAN RANGE ANALOG SCAN DATA SIGNAL PASS-BAND PREAMP | FAR SCAN RANGE ANALOG SCAN DATA SIGNAL PASS-BAND PREAMP |
|---|---|---|
| LOW | 20 KHZ - 1.8MHZ | DISABLED |
| HIGH | DISABLED | 30KHZ - 2.5 MHZ |

FIG. 9A2

$$f_{LA} \leq \frac{\text{MINIMUM BEAM SPOT SPEED IN FOCAL ZONE FZ1}}{20 \cdot (\text{MAXIMUM BAR CODE ELEMENT WIDTH})}$$

$$f_{UA} \geq \frac{\text{MAXIMUM BEAM SPOT SPEED IN FOCAL ZONE FZ2}}{2 \cdot (\text{MINIMUM BAR CODE ELEMENT WIDTH})}$$

$$f_{LB} \leq \frac{\text{MINIMUM BEAM SPOT SPEED IN FOCAL ZONE FZ3}}{20 \cdot (\text{MAXIMUM BAR CODE ELEMENT WIDTH})}$$

$$f_{UB} \geq \frac{\text{MAXIMUM BEAM SPOT SPEED IN FOCAL ZONE FZ5}}{2 \cdot (\text{MINIMUM BAR CODE ELEMENT WIDTH})}$$

FIG. 9A3

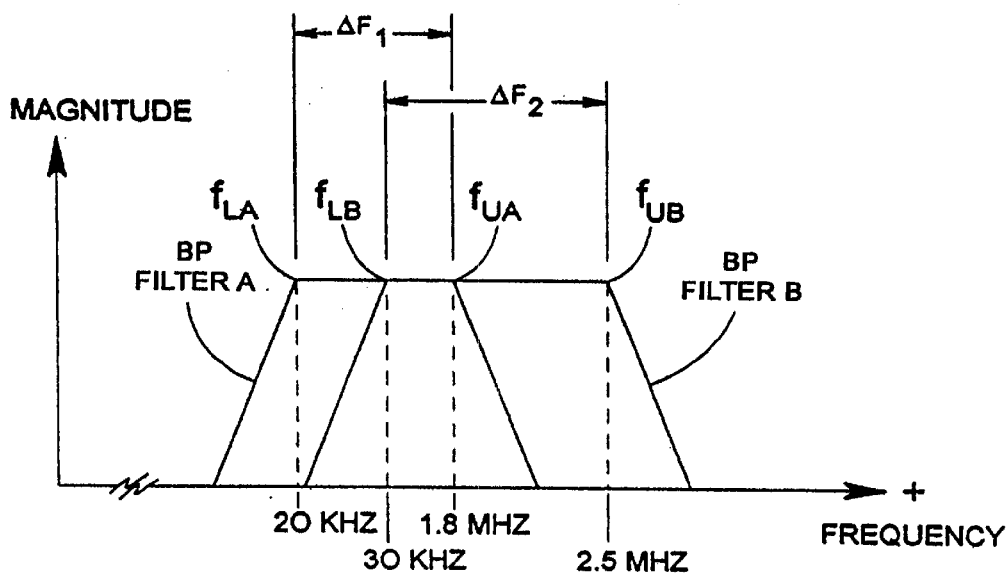

FIG. 10A1

| | NEAR SCAN RANGE PASS-BAND | FAR SCAN RANGE PASS-BAND FILTER |
|---|---|---|
| LOW | 20 KHZ - 1.8MHZ | DISABLED |
| HIGH | DISABLED | 30KHZ- 2.5 MHZ |

FIG. 10A2

$$f_{LA} \leq \frac{\text{MINIMUM BEAM SPOT SPEED IN FOCAL ZONE FZ1}}{20 \cdot (\text{MAXIMUM BAR CODE ELEMENT WIDTH})}$$

$$f_{UA} \geq \frac{\text{MAXIMUM BEAM SPOT SPEED IN FOCAL ZONE FZ2}}{2 \cdot (\text{MINIMUM BAR CODE ELEMENT WIDTH})}$$

$$f_{LB} \leq \frac{\text{MINIMUM BEAM SPOT SPEED IN FOCAL ZONE FZ3}}{20 \cdot (\text{MAXIMUM BAR CODE ELEMENT WIDTH})}$$

$$f_{UB} \geq \frac{\text{MAXIMUM BEAM SPOT SPEED IN FOCAL ZONE FZ5}}{2 \cdot (\text{MINIMUM BAR CODE ELEMENT WIDTH})}$$

FIG. 10A3

METHOD OF AND SYSTEM FOR SCANNING BAR CODE SYMBOLS USING A LASER SCANNING PATTERN HAVING MULTIPLE FOCAL ZONES, WHEREIN THE MINIMUM BEAM DIMENSION/MINIMUM BAR WIDTH (MBD/MBW) RATIO IS GREATER THAN OR EQUAL TO 2.0

RELATED CASES

The present application is a Continuation of copending Application No. 09/442,718 filed Nov. 18, 1999, which is a Continuation of Application No. 09/241,930 filed Feb. 2, 1999, now U.S. Pat. No. 6,422,467, which is a Continuation-in-Part (CIP) of: copending Application No. 09/157,778 filed Sep. 21, 1998, which is a Continuation-in-Part of Application Nos. 09/047,146 filed March 24, 1998, now U.S. Pat. No. 6,360,947, 08/949,915 filed Oct. 14, 1997, now U.S. Pat. No. 6,158,659; 08/854,832 filed May 12, 1997, now U.S. Pat. No. 6,085,978; and copending Application No. 08/886,806 filed Apr. 22, 1997, now U.S. Pat. No. 5,984,185, which is a Continuation of Application No. 08/726,522 filed Oct. 7, 1996, now U.S. Pat. No. 6,073,846 which is a Continuation of Application No. 08/573,949 filed Dec. 18, 1995, now abandoned. Each said patent application is assigned to and commonly owned by Metrologic Instruments, Inc. of Blackwood, New Jersey, and is incorporated herein by reference in its entirety.

BACKGROUND OF THE INVENTION

1. Field of Invention

The present invention relates to an improved laser scanning system wherein first and second derivative signals derived from analog scan data signals generated therewithin are processed in an improved manner so that the effects of thermal noise and substrate/paper noise alike are minimized in diverse laser scanning environments including multiple focal zone scanning systems and large depth-of-field scanning systems alike.

2. Brief Description Of State Of The Art

Code symbol scanners are widely used in diverse environments for purposes of object identification, data-entry and the like.

During operation of such machines, a focused light beam is produced from a light source such as a visible laser diode (VLD), and repeatedly scanned across the elements of the code symbol attached, printed or otherwise fixed to the object to be identified. In the case of bar code scanning applications, the elements of the code symbol consists of a series of bar and space elements of varying width. For discrimination purposes, the bars and spaces have different light reflectivity (e.g. the spaces are highly light-reflective while the bars are highly light-absorptive). As the laser beam is scanned across the bar code elements, the bar elements absorb a substantial portion of the laser beam power, whereas the space elements reflect a substantial portion thereof. As a result of this scanning process, the intensity of the laser beam is modulated in accordance with the information structure encoded within the scanned bar code symbol. As the laser beam is scanned across the bar code symbol, a portion of the reflected light beam is collected by optics within the scanner. The collected light signal is subsequently focused upon a photodetector 20 within the scanner which generates an analog electrical output signal which can be decomposed into a number of signal components, namely: a digital scan data signal having first and second signal levels, corresponding to the bars and spaces within the scanned code symbol; ambient light noise produced as a result of ambient light collected by the light collection optics of the system; thermal noise produced as a result of thermal activity within the signal detecting and processing circuitry; and "paper" or substrate noise produced as a result of the microstructure of the substrate in relation to the cross-sectional dimensions of the focused laser scanning beam. The analog scan data signal has positive-going transitions and negative-going transitions which signify transitions between bars and spaces in the scanned bar code symbol. However, as a result of such noise components, the transitions from the first signal level to the second signal level and vice versa are not perfectly sharp, or instantaneous, as in the underlying digital scan data signal. Consequently, it is difficult to determine the exact instant that each binary signal level transition occurs in the detected analog scan data signal.

It is well known that the ability of a scanner to accurately scan a bar code symbol and accurately produce digital scan data signals representative of a scanned bar code symbol in noisy environments depends on the depth of modulation of the laser scanning beam. The depth of modulation of the laser scanning beam, in turn, depends on several important factors, namely: the ratio of the laser beam cross-sectional dimensions at the scanning plane to the width of the minimal bar code element in the bar code symbol being scanned, and (ii) the signal to noise ratio (SNR) in the scan data signal processor at the stage where binary level (I-bit) analog to digital (A/D) signal conversion occurs.

As a practical matter, it is not possible in most instances to produce analog scan data signals with precisely-defined signal level transitions. Therefore, the analog scan data signal must be further processed to precisely determine the point at which the signal level transitions occur.

Hitherto, various circuits have been developed for carrying out such scan data signal processing operations. Typically, signal processing circuits capable of performing such operations include filters for removing unwanted noise components, and signal thresholding devices for rejecting signal components which do not exceed a predetermined signal level.

One very popular approach for converting analog scan data signals into digital scan data signals is disclosed in U.S. Pat. No. 4,000,397, incorporated herein by reference in its entirety. In this U.S. Letters Patent, a method and apparatus are disclosed for precisely detecting the time of transitions between the binary levels of encoded analog scan data signals produced from various types of scanning devices. According to this prior art method, the first signal processing step involves double-differentiating the analog scan data input signal analog to produce a second derivative signal $S''_{analog}$. Then the zero-crossings of the second derivative signal are detected, during selected gating periods, to signify the precise time at which each transition between binary signal levels occurs. As taught in this U.S. Patent, the selected gating periods are determined using a first derivative signal $S'_{analog}$ formed by differentiating the input scan data signal $S_{analog}$. Whenever the first derivative signal $S'_{analog}$ exceeds a threshold level using peak detection, the gating period is present and the second derivative signal $S''_{analog\ is}$ detected for zero-crossings. At each instant a second-derivative zero-crossing, is detected, a binary signal level is produced at the output of the signal processor. The binary output signal level is a logical "1" when the detected signal level falls below the threshold at the gating interval, and a logical "0" when the detected signal level falls above the threshold at the gating interval. The output digital signal produced by this signal processing technique corresponds to the digital scan data signal component contributing to the underlying structure of the analog scan data input signal $S_{analog}$.

While the above-described signal processing technique describes a simple way of generating a digital scan data signal from a corresponding analog scan data signal, this method has a number of shortcomings and drawbacks.

In particular, thermal as well as "paper" or substrate noise imparted to the analog scan data input signal $S_{analog}$ tends to generate zero-crossings in the second-derivative signal $S''_{analog}$ in much the same manner as does binary signal level transitions encoded in the input analog scan data signal $S_{analog}$. Consequently, the gating signal mechanism disclosed in U.S. Pat. No. 4,000,397 allows "false" second-derivative zero-crossing signals to be passed onto the second derivative zero-crossing detector thereof, thereby producing erroneous binary signal levels at the output stage of this prior art signal processor. In turn, error-ridden digital data scan data signals are transmitted to the digital scan data signal processor of the bar code scanner for conversion into digital words representative of the length of the binary signal levels in the digital scan data signal. This can result in significant errors during bar code symbol decoding operations, causing objects to be incorrectly identified and/or erroneous data to be entered into a host system.

Also, when scanning bar code symbols within large scanning fields volumes having multiple focal zones, as taught in co-applicant's PCT International Patent Publication No. WO97/22945 published on Jun. 26, 1997, Applicants have observed that the effects of paper/substrate noise are greatly amplified when scanning bar code symbols in the near focal zone(s) of the system, thereby causing a significant decrease in overall system performance. In the far out focal zones of the scanning system, Applicants have observed that laser beam spot speed is greatest and the analog scan data signals produced therefrom are time-compressed relative to analog scan data signals produced from bar code symbols scanned in focal zones closer to the scanning system. Thus, in such prior art laser scanning systems, Applicants' have provided, between the first and second differentiator stages of the scan data signal processor thereof, a low-pass filter (LHF) having cutoff frequency which passes (to the second differentiator stage) the spectral components of analog scan data signals produced when scanning bar code elements at the focal zone furthest out from the scanning system. While this technique has allowed prior art scanning systems to scan bar codes in the far focal zones of the system, it has in no way addressed or provided a solution to the problem of increased paper/substrate noise encountered when scanning bar code symbols in the near focal zones of such laser scanning systems.

Thus, there is a great need in the art for an improved laser scanning system wherein first and second derivative signals derived from analog scan data signals generated therewithin are processed so that the effects of thermal and paper noise encountered within the system are significantly mitigated.

OBJECTS AND SUMMARY OF THE PRESENT INVENTION

Accordingly, it is a primary objective of the present invention to provide an improved laser scanning system, wherein first and second derivative signals from analog scan data signals produced therewithin are processed so that the effects of thermal and paper noise encountered within the system are significantly mitigated.

Another object of the present invention is to provide such an improved laser scanning system, wherein the beam spot speed of the laser beam varies as a function of distance from the X system, or focal zone of the system.

Another object of the present invention is to provide an improved laser scanning system, wherein the scan data signal processor has improved performance throughout the depth of field of the scanning system by automatically tuning the scan data signal processor to an optimum setting for the focal zone being scanned at each moment of scanning system operations.

Another object of the present invention is to provide an improved laser scanning system, wherein a variable first derivative signal pass-band filter is employed having pass-band filter characteristics that are dynamically controlled by the focal distance of the laser scanning beam producing the analog scan data signal being produced.

Another object of the present invention is to provide an improved laser scanning system, wherein a different pass-band filter is dynamically switched into operation for pass-band filtering the first derivative of analog scan data signals produced by laser scanned bar code symbols within each predefined focal zone in the laser scanning system, in order to filter out spectral components of paper noise residing outside the frequency spectrum of the analog scan data signal scanned within the predefined focal zone.

Another object of the present invention is to provide such an improved laser scanning system, which can be a holographic laser scanning systems, a polygonal-type laser scanning system as well as any other type of laser scanning system having multiple focal zones or a large depth-of-field.

Another object of the present invention is to provide an improved laser scanning system, wherein a time-domain non-linear substrate noise filter is employed before the first derivative (signal generation stage of the processor so as to produce, as output, a substantially fixed zero reference signal level whenever a signal level indicative of the substrate is detected, and the signal level of the analog scan data signal whenever a signal level indicative of a bar code element (e.g. dark bar) is detected.

Another object of the present invention is to provide a laser scanning system which employs a signal processor having a bar code element detector for automatically enabling the second-derivative zero-crossing detector employed therein.

Another object of the present invention is to provide an improved signal processing method, wherein detection of second derivative signal zero-crossings is automatically activated (i.e. enabled) upon detection of bar element data encoded within the analog scan data signal, thereby preventing the detection of zero-crossings in the second derivative signal caused by thermal and paper noise during bar code scanning operations.

Another object of the present invention is to provide a novel method of reading bar code symbols, wherein after automatically enabling the detection of zero-crossings in the second derivative signal, second-derivative zero-crossing detection is automatically disabled after a predetermined time period, and automatically re-enabled after redirection of subsequent bar code elements in the same bar code symbol or in subsequently scanned bar code symbols.

Another object of the present invention is to provide an improved method of processing analog scan data signals, wherein gating signals for second derivative zero-crossing detection are automatically generated only when bar code element data is detected in the analog scan data input signal, thereby substantially improving the overall performance of the signal processor in the presence of thermal and paper noise.

Another object of the present invention is to provide a novel laser scanning system capable of being used in diverse types of bar code scanning environments (e.g. where data element stitching is employed).

Another object of the present invention is to provide a novel laser scanning system, wherein the scan data signal processor employs a real-time bar code element detector for enabling a second-derivative zero-crossing detector in response to the detection of the presence and absence of bar code element data encoded within the analog scan data input signal.

Another object of the present invention is to provide a multi-focal zone laser scanning system which employs a scan data signal processor that allows reading of bar code symbols having bar code elements substantially narrower than the beam cross-section of the laser scanning beam.

Another object of the present invention is to provide a multi-focal zone laser scanning bar code symbol reading system, in which the ratio of the minimum laser beam cross-section dimension (MBD) to the minimum bar element width (MBW) in each focal zone of the system is greater than or equal to 2.0.

Another object of the present invention is to provide a multi-focal zone laser scanning system, wherein a scan data signal processor is used having a higher overall signal-to-noise ratio (SNR), thereby requiring less modulation of the laser scanning beam during scanning operations, and decreasing the effective laser beam diameter (i.e. beam spot size) at each focal zone in the system, and thus increasing the bar code scanning resolution of the system.

Another object of the present invention is to provide a multi-focal zone scanning system, wherein without increasing or otherwise changing the laser beam power characteristics, the length of each focal zone in the system can be increased to allow either more overlap between adjacent focal zones, or a larger overall depth of field in the system.

Another object of the present invention is to provide a laser scanning system that has an increased depth of field without increasing the power level of the laser scanning beams, or adding additional focal zones to the system.

Another object of the present invention is to provide a laser scanning system which employs a scan data signal processor having a plurality of first derivative signal pass-band filter structures that are electronically-switched into operation in response to control signals derived from information about the focal distance of the laser scanning beam at each instant in time.

Another object of the present invention is to provide a multi-focal zone laser scanning bar code symbol reading system, wherein each scan data producing channel includes a scan data signal processor which employs a variable first derivative signal pass-band filter dynamically controlled by the focal distance of the laser scanning beam producing the analog scan data signal being processed.

Another object of the present invention is to provide a laser scanning bar code symbol reader employing a variable first derivative signal pass-band filter structure having frequency characteristics that are controlled in a real-time manner by measuring the time duration of binary signal levels in digital scan data signals produced in response to laser scanning bar code symbol elements located within the scanning range of the system.

Another object of the present invention is to provide a laser scanning bar code symbol reader employing a variable second derivative signal pass-band filter structure having frequency characteristics that are controlled in a real-time manner by measuring the time duration of binary signal levels in digital scan data signals produced in response to laser scanning bar code symbol elements located within the scanning range of the system.

Another object of the present invention is to provide such a laser scanning bar code symbol reading system, wherein time measurement of bar code symbol elements is carried out using an application specific integrated circuit (ASIC) chip that compares real-time measurement of binary signal levels in digital scan data signals with predetermined time measures thereof, stored in an EPROM or like device, for bar code symbols of different resolutions and scanning distances from the bar code symbol reading system.

Another object of the present invention is to provide such a bar code symbol reading system, wherein a rotating polygon-type mechanism is used to scan the laser scanning beam over the scanning field or volume of the system.

Another object of the present invention is to provide such a bar code symbol reading system, wherein a variable laser beam focusing mechanism and rotating polygon-type mechanism are used to produce an X-bar or like laser scanning pattern at varying depths of focus over the scanning field of the system.

Another object of the present invention is to provide such a laser scanning bar code symbol reading system mounted over a high-speed conveyor-belt system in order to identify packages, parcels and the like transported therealong in a highly reliable manner.

These and other objects of the present invention will become apparent hereinafter and in the Claims to Invention.

BRIEF DESCRIPTION OF THE DRAWINGS

For a more complete understanding of the Object of the Present Invention, the following Detailed Description of the Illustrative Embodiment should be read in conjunction with the accompanying drawings, wherein:

FIGS. 1H and 1H1, taken together, set forth a table containing design and construction parameters for each of the twenty holographic optical elements (i.e. volume transmission holograms) supported on the holographic scanning disc in the holographic laser scanning system of FIG. 1, as well as the laser beam speed at the center of each scanline within each focal zone generated by the system, and the beam speed at the maximum and minimum depths of field within each such focal zone therein;

FIG. 1I is a table identifying the depth of field and the focal zones which are included the "Near" and "Far" Scan Ranges of the holographic laser scanning system shown in FIG. 1;

FIG. 2A is a graphical representation of the power spectrum of an exemplary analog scan data signal produced when laser scanning a bar code symbol within the first focal zone (FZ1) of the zone holographic laser scanning system of FIG. 1, shown plotted along with the power density spectrum of the substrate noise signal produced while laser scanning the bar code symbol on its substrate within the first focal zone of the holographic laser scanning system of FIG. 1;

FIG. 2B is a graphical representation of the power spectrum of an exemplary analog scan data signal produced when laser scanning a bar code symbol within the second focal zone (FZ2) of the holographic laser scanning system of FIG. 1, shown plotted along with the power density spectrum of the paper/substrate noise signal produced while laser scanning the bar code symbol on its substrate within the second focal zone of the holographic laser scanning system of FIG. 1;

FIG. 2C is a graphical representation of the power spectrum of an exemplary analog scan data signal produced when laser scanning a bar code symbol within the third focal zone (FZ3) of the holographic laser scanning system of FIG. 1, shown plotted along with the power density spectrum of the paper/substrate noise signal produced while laser scanning the bar code symbol on its substrate within the third focal zone of the holographic laser scanning system of FIG. 1;

FIG. 2D is a graphical representation of the power spectrum of an exemplary analog scan data signal produced when laser scanning a bar code symbol within the fourth focal zone (FZ4) of the holographic laser scanning system of FIG. 1, shown plotted along with the power density spectrum of the paper/substrate noise signal produced while laser scanning the bar code symbol on its substrate within the fourth focal zone of the holographic laser scanning system of FIG. 1;

FIG. 2E is a graphical representation of the power spectrum of an exemplary analog scan data signal produced when laser scanning a bar code symbol within the fifth focal zone (FZ5) of the holographic laser scanning system of FIG. 1, shown plotted along with the power density spectrum of the paper/substrate noise signal produced while laser scanning the bar code symbol on its substrate within the fifth focal zone of the holographic laser scanning system of FIG. 1;

FIG. 2F is an exemplary graphical representation showing a superposition of the power spectrums of paper noise and the analog scan data signals produced when laser scanning bar code symbols within the first, second, third, fourth and fifth focal zones of the holographic laser scanning system of FIG. 1;

FIGS. 3A1 through 3A3, taken together, show the subcomponents of the holographic laser scanning system of FIG. 1 configured together on the analog signal preamplification boards, the analog/digital (decode) signal processing boards and the housing thereof;

FIG. 3C is a first table containing parameters and information that are used within the SFP generation module of the SFP generator shown in FIG. 3B2;

FIGS. 4-1 and 4-2, taken together, set forth a schematic diagram of the scan data signal processor of the present invention shown comprising a time-domain substrate noise filtering circuit, a first derivative signal generation circuit with focal-zone controlled first derivative signal pass-band filters and amplifiers integrated therewith, a second derivative signal generation circuit including focal-zone controlled second derivative signal pass-band filters and amplifiers integrated therewith, a first derivative signal threshold-level generation circuit for-generating upper and lower first derivative signal thresholds (used in detected second derivative zero-crossing gating), a binary-level type analog-to-digital (A/D) signal conversion circuit having a buffer amplifier, a second derivative zero-crossing detector, a pair of first derivative signal comparators and a digital output signal level generation circuit, and also a bar code element detection circuit for activating and deactivating the second derivative signal zero-crossing detection circuit employed within the A/D signal conversion circuit;

FIGS. 4C1 and 4C1A, taken together, set forth a detailed schematic representation of the first derivative signal generation circuit employed in the scan data signal processor of FIGS. 4-1 and 4-2, shown comprising a first scan-range controlled first derivative signal pass-band filter and amplifier arranged along the first channel (A) of the circuit corresponding to the "Near Scan Range" of the system, and a second scan-range controlled first derivative signal pass-band filter and amplifier arranged along the second channel (B) of the circuit corresponding to the "Far Scan Range" of the system, as identified in FIG. 1I;

FIG. 4C2 shows a graphical representation of the magnitude of the frequency response characteristics of the first derivative signal pass-band filters realized by the differentiator circuit A and the low-pass filter A employed along Channel A, and the differentiator circuit B and the low-pass filter B employed along Channel B of the first derivative signal generation circuit of FIGS. 4C1 and 4C1A;

FIG. 4C3 is a table identifying the bandwidth of the first derivative signal pass-band filters employed along Channels A and B of the first derivative signal generation circuit of FIGS. 14C1 and 4C1A, as well as the control signal levels that enable and disable such pass-band filters during system laser scanning operations;

FIG. 4C4 is a table setting forth approximation formulas for computing the upper and lower cutoff frequencies $f_{LA}$, $f_{UA}$ and $f_{LB}$, $f_{UB}$, characteristic of the first derivative signal pass-band filters employed along Channels A and B, respectively, in the first derivative signal generation circuit shown in FIGS. 4C1 and 4C1A;

FIG. 4C5 shows a graphical representation of the magnitude of the frequency response characteristics of the first derivative signal pass-band amplifiers realized by the operational amplifier A employed along Channel A, and the operational amplifier B employed along Channel B of the first derivative signal generation circuit shown in FIGS. 4C1 and 4C1A;

FIG. 4C6 is a table identifying the bandwidth of the first derivative signal pass-band amplifiers employed along Channels A and B of the first derivative signal generation circuit of FIGS. 4C1 and 4C1A, as well as the control signal levels that enable and disable such pass-band filters during laser scanning operations;

FIG. 4C7 is a table setting forth approximation formulas for computing the upper and lower cutoff frequencies $f_{LA}$, $f_{UA}$ and $f_{LB}$, $f_{UB}$, characteristic of the first derivative signal passband amplifiers employed along Channels A and B, respectively, in the first derivative signal generation circuit shown in FIGS. 4C1 and 4C1A;

FIGS. 4D1A and 4D1B, taken together, set forth a detailed schematic diagram of the second derivative signal generation circuit employed in the scan data signal processor of FIGS. 4-1 and 4-2, shown comprising a first scan-range controlled second derivative signal pass-bands filter and amplifier arranged along the first channel (A) of the circuit corresponding to the "Near Scan Range" of the system, and a second scan-range controlled second derivative signal passband filter and amplifier arranged along the second channel (B) of the circuit corresponding to t the "Far Scan Range" of the system, as identified in FIG. 1I;

FIG. 4D2 shows a graphical representation of the magnitude of the frequency response characteristics of the second derivative signal pass-band filters realized by the differentiator circuit A and the low-pass filter A employed along Channel A, and the differentiator circuit B and the low-pass filter B employed along Channel B of the second derivative signal generation circuit shown in FIGS. 4C1 and 4C1A;

FIG. 4D3 is a table identifying the bandwidth of the second derivative signal pass-band filters employed along Channels A and B of the second derivative signal generation circuit of FIGS. 4D1A and 4D1B, as well as the control signal levels that enable and disable such pass-band filters during laser scanning system operations;

FIG. 4D4 is a table setting forth approximation formulas for computing the upper and lower cutoff frequencies $f_{LA}$, $f_{UA}$ and $f_U$, characteristic of the second derivative signal pass-band filters employed along Channels A and B, respectively, in the second derivative signal generation circuit shown in FIGS. 4D1A and 4D1B;

FIG. 4D5 shows a graphical representation of the magnitude of the frequency response characteristics of the second derivative signal pass-band amplifiers realized by the operational amplifier A employed along Channel A, and the operational amplifier B employed along Channel B of the second derivative signal generation circuit shown in FIGS. 4D1A and 4D1B;

FIG. 4D6 is a table identifying the bandwidth of the second derivative signal pass-band amplifiers employed along Channels A and B of the second derivative signal generation circuit of FIGS. 4C1 and 4C1A, as well as the control signal levels that enable and disable such passband filters during laser scanning operations;

FIG. 4D7 is a table setting forth approximation formulas for computing the upper and lower cutoff frequencies $f_{LA}$, $f_{UA}$ and $f_{LB}$, $f_{UB}$, characteristic of the second derivative signal pass-band amplifiers employed along Channels A and B, respectively, in the second derivative signal generation circuit of FIGS. 4D1A and 4D1B;

FIGS. 4F and 4F1, taken together, set forth a detailed schematic diagram of the binary (i.e. one-bit) A/D signal conversion circuit employed in the scan data signal processor of FIGS. 4-1 and 4-2, shown comprising a second derivative zero-crossing detector realized by a comparator and a high-input/low-output impedance amplifier (i.e. buffer), a pair of first derivative signal comparators for comparing the first derivative signal with the first derivative signal upper and lower threshold levels, and digital output signal generating circuit realized by a set/reset latch circuit consisting of four NAND gates arranged to produce as output, a digital output signal corresponding to the analog scan data signal provided as input to the scan data signal processor of FIGS. 4-1 and 4-2;

FIGS. 4G and 4G1, taken together, set forth a detailed schematic diagram of the bar code element detection circuit employed in the scan data signal processor shown in FIGS. 4-1 and 4-2, comprising a zero-reference signal generator, an analog signal level shifting circuit, a comparator circuit, and a second-derivative zero-crossing detector enable circuit;

FIG. 4H1 is a graphical representation of a pair of spaced apart "bar-type elements taken from an exemplary bar code symbol;

FIG. 4H2 is a graphical representation of an exemplary analog scan data signal and a zero reference signal produced by the zero-reference level generation circuit within the bar code element detector shown in FIGS. 4G and 4G1 when scanning the bar elements shown in FIG. 4H2;

FIG. 4H3 is a graphical representation of the output signal produced from the comparator circuit employed within the bar code element detection circuit shown in FIGS. 4G and 4G1;

FIG. 4H4 is a graphical representation of the digital output signal produced from the second derivative zero-crossing detector enable circuit shown in FIGS. 4G and 4G1;

FIG. 5C is a table setting forth the laser beam cross-sectional dimensions at each of the five focal planes in the holographic laser scanning system of FIG. 1, as well as the minimum bar code element width that can detected by the scan data signal processor shown in FIGS. 4-1 and 4-2 and thus readable by the system shown in FIG. 1;

FIG. 6 is a schematic representation of an alternative embodiment of a multi-focal zone laser scanning system in accordance with the present invention, shown comprising the scan data signal processor of FIGS. 4-1 and 4-2, adapted to process analog scan data signals generated from a rotating-polygon type laser scanning beam mechanism contained within its housing, producing an X-bar or like scan pattern dynamically focused along a plurality of different focal zones in order to extend the depth of field and thus scanning range of the system;

FIG. 6B is a schematic representation of a Beam Spot Speed Look-Up Table used by the real-time bar code element width measurement processor employed in the laser scanning system, of FIG. 6;

FIG. 7 is a schematic representation of another alternative embodiment of a laser scanning system in accordance with the present invention, realized in the form of a hand-supportable laser scanning bar code symbol reading device, shown comprising the scan data signal processor of FIGS. 4-1 and 4-2 adapted to process analog scan data signals generated from a laser scanning beam mechanism contained within its housing;

FIG. 7B is a schematic representation of a Beam Spot Speed Look-Up Table used by the real-time bar code element width measurement processor employed in the laser scanning system, of FIG. 7;

FIG. 8B is a schematic representation of a Beam Spot Speed Look-Up Table used by the real-time bar code element width measurement processor employed in the laser scanning system, of FIG. 8;

FIG. 9A1 shows a graphical representation of the magnitude of the frequency response characteristics of the analog scan data signal pass-band preamplifier employed after each photodetector in the laser scanning system of FIG. 1;

FIG. 9A2 is a table identifying the bandwidth of the analog scan data signal pass-band preamplifier employed after each photodetector in the laser scanning system of FIG. 1, as well as the control signal levels that enable and disable the same during system laser scanning operations;

FIG. 9A3 is a table setting forth approximation formulas for computing the upper and lower cutoff frequencies $f_{LA}$, $f_{UA}$ and $f_{LB}$, $f_{UB}$, characteristic of the analog scan data pass-band preamplifier employed after photodetector in the laser scanning system of FIG. 1;

FIG. 10A1 shows a graphical representation of the magnitude of the frequency response characteristics of the analog scan data signal pass-band preamplifier employed before the first derivative signal generation circuit of FIGS. 4C1 and 4C1A;

FIG. 10A2 is a table identifying the bandwidth of the analog scan data signal pass-band preamplifier employed before the first derivative signal generation circuit of FIGS. 4C1 and 4C1A, as well as the control signal levels that enable and disable the same during system laser scanning operations; and FIG. 10A3 is a table setting forth approximation formulas for computing the upper and lower cutoff frequencies $f_{LA}$, $f_{UA}$ and $f_{LB}$, $f_{UB}$, characteristic of the analog scan data pass-band preamplifier employed before the first derivative signal generation circuit shown in FIGS. 4C1 and 4C1A.

DETAILED DESCRIPTION OF THE ILLUSTRATIVE EMBODIMENTS OF THE PRESENT INVENTION

Figure 1:
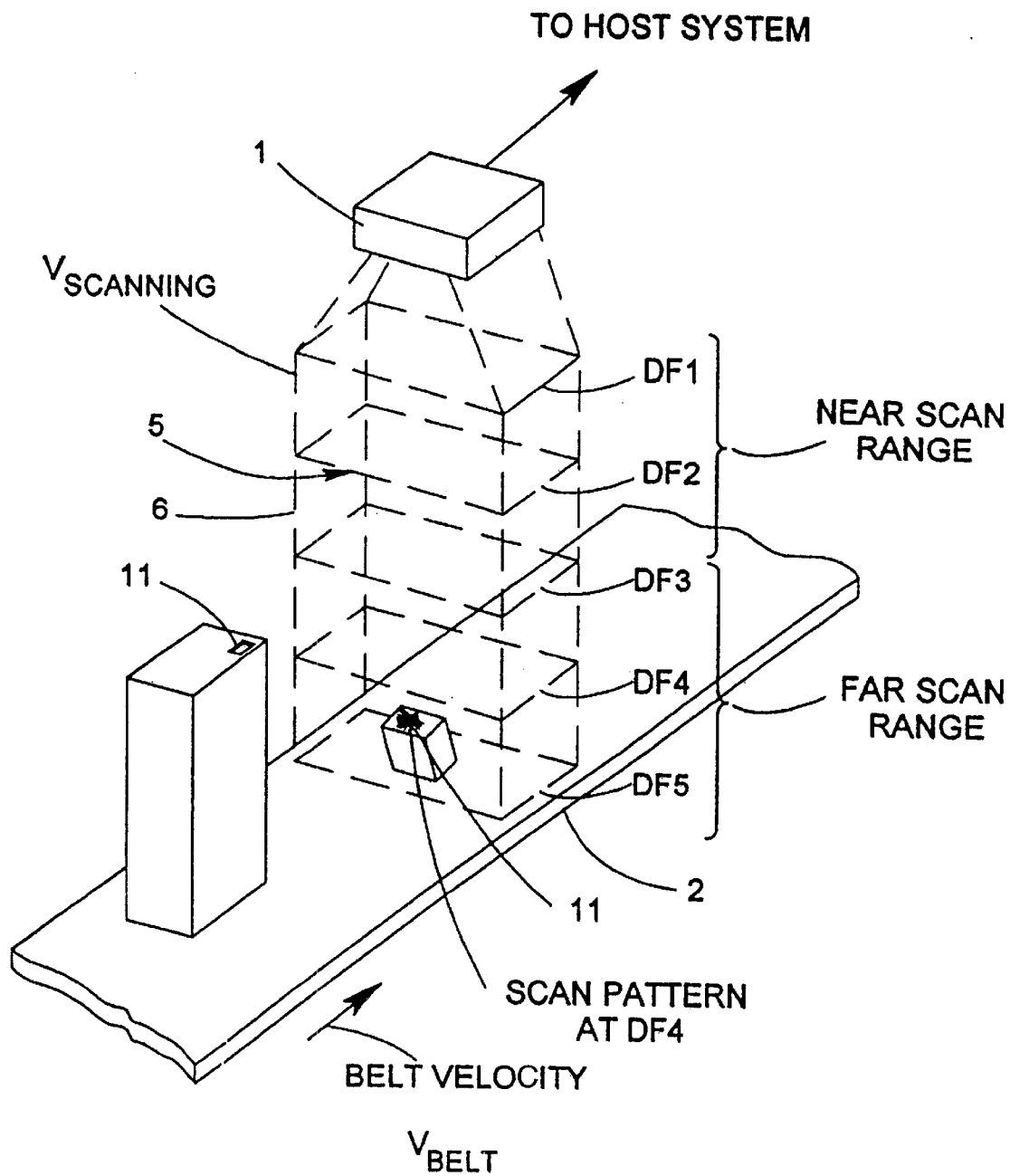
FIG. 1 is a schematic representation of a multi-focal zone holographic laser scanning bar code symbol reading system mounted over a conveyor-belt along with bar coded packages of various dimensions are transported in a high-speed manner.

Referring now to the figure drawings, the Detailed Description of the Illustrative Embodiments of the present invention will now be described in great detail with reference to the figure drawings, wherein like elements shall be indicated by like reference numerals.

Figures 2, 4:
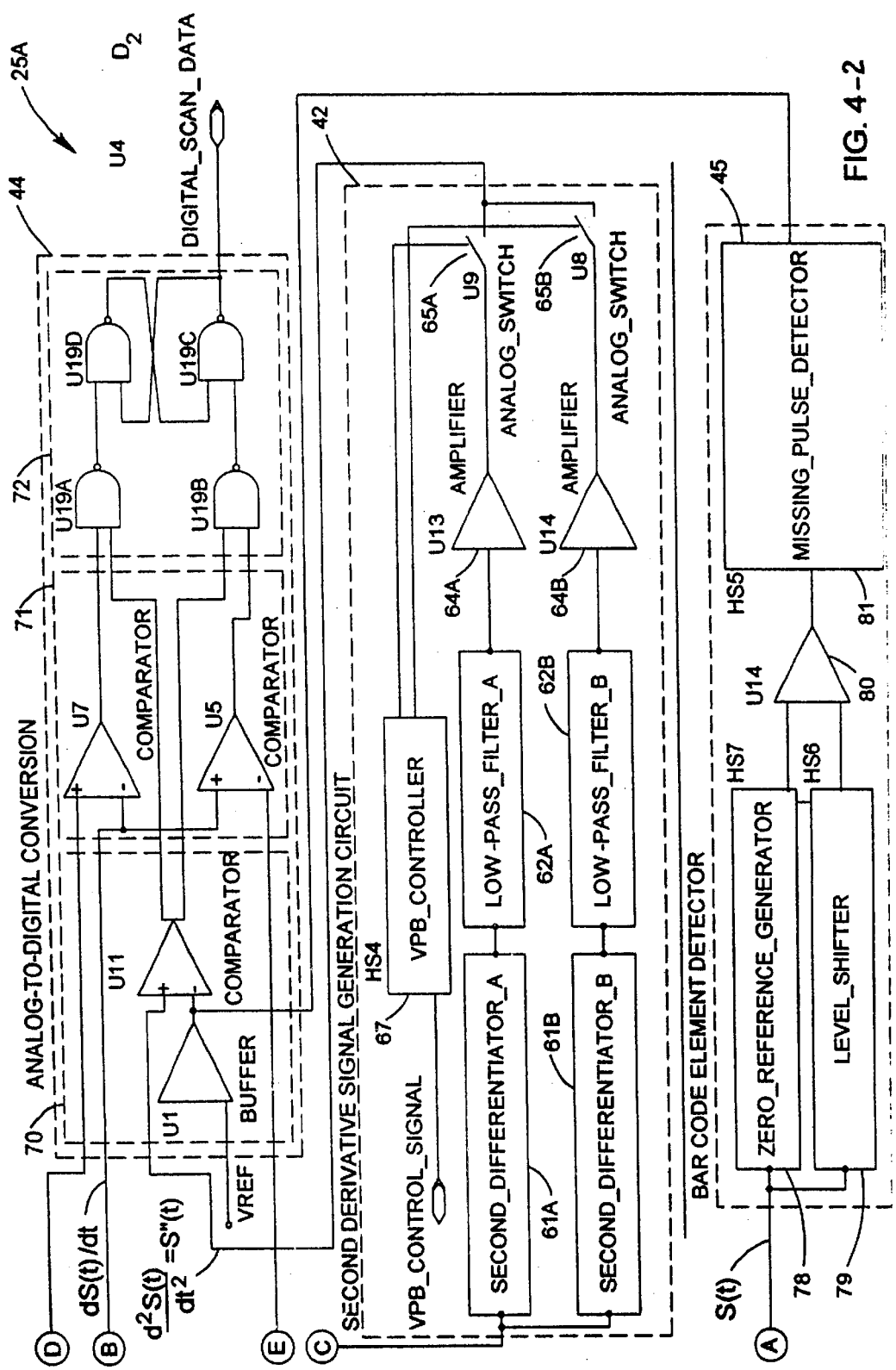
Figure 5A:
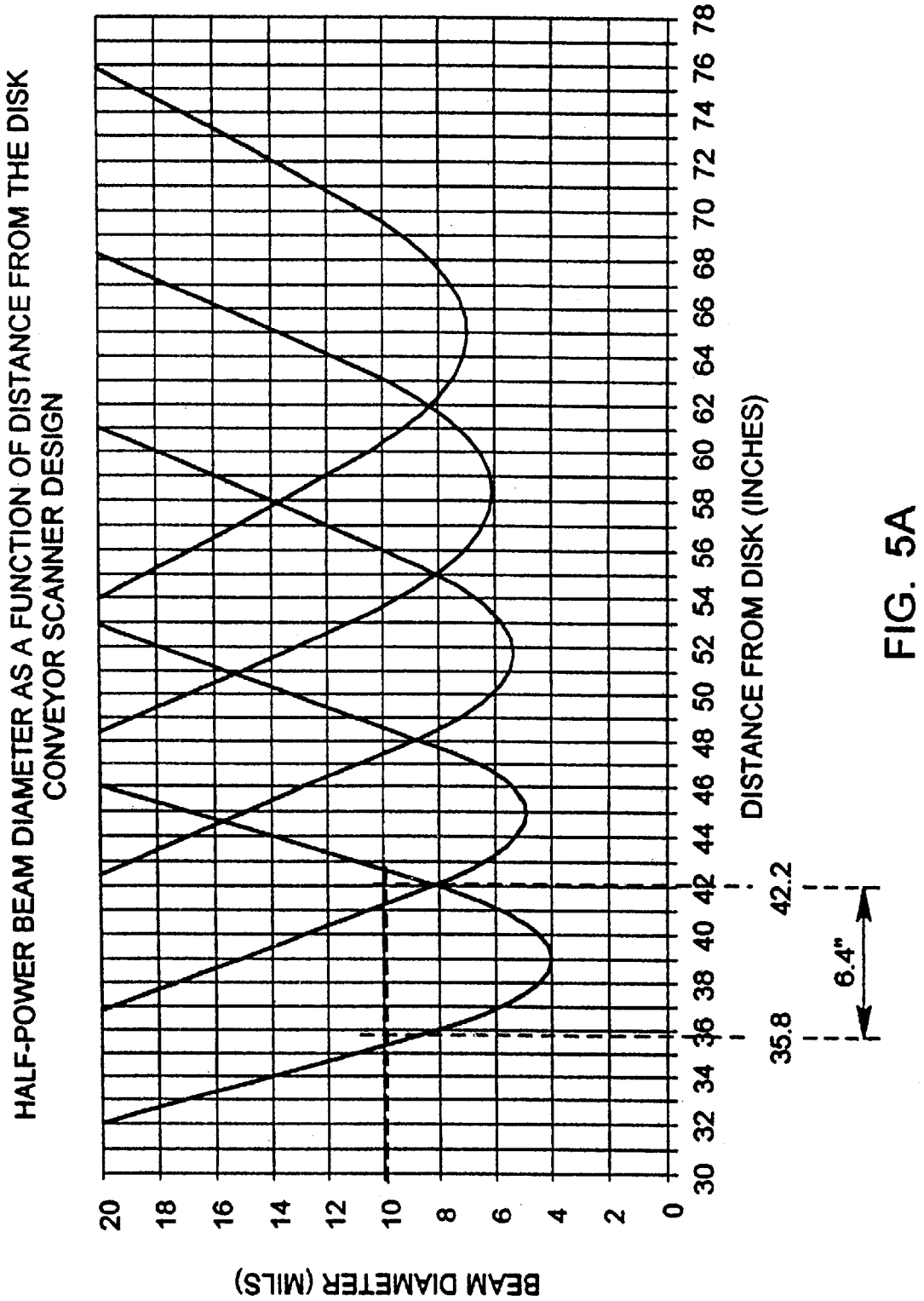
FIG. 5A is a graphical representation of the laser scanning beam diameter of a holographic laser scanning system employing a prior art scan data signal processor, shown plotted as a function of distance away from its holographic scanning disc, graphically indicating Is the depth dimension of each focal zone defined by the distance between the occurrence of 10 millimeter beam cross-sectional diameter measures taken about a particular focal plane at which a laser scanning beam is focused to its minimum beam cross-sectional diameter.

In general, the scan data signal processor of the present invention, illustrated in FIGS. 4-1 through 5C, can be used in virtually any laser scanning bar code symbol reading system having a scanning field or volume in which beam spot speed of the laser scanning beam varies as a function of distance away from the scanning mechanism.

For purposes of illustration, four exemplary laser scanning systems are disclosed herein invention can be embodied.

In FIGS. 1 through 5C, the scan data signal processor of the present invention is shown embodied within a multi-focal zone holographic laser scanning system mounted over a conveyor belt system.

Figure 6:
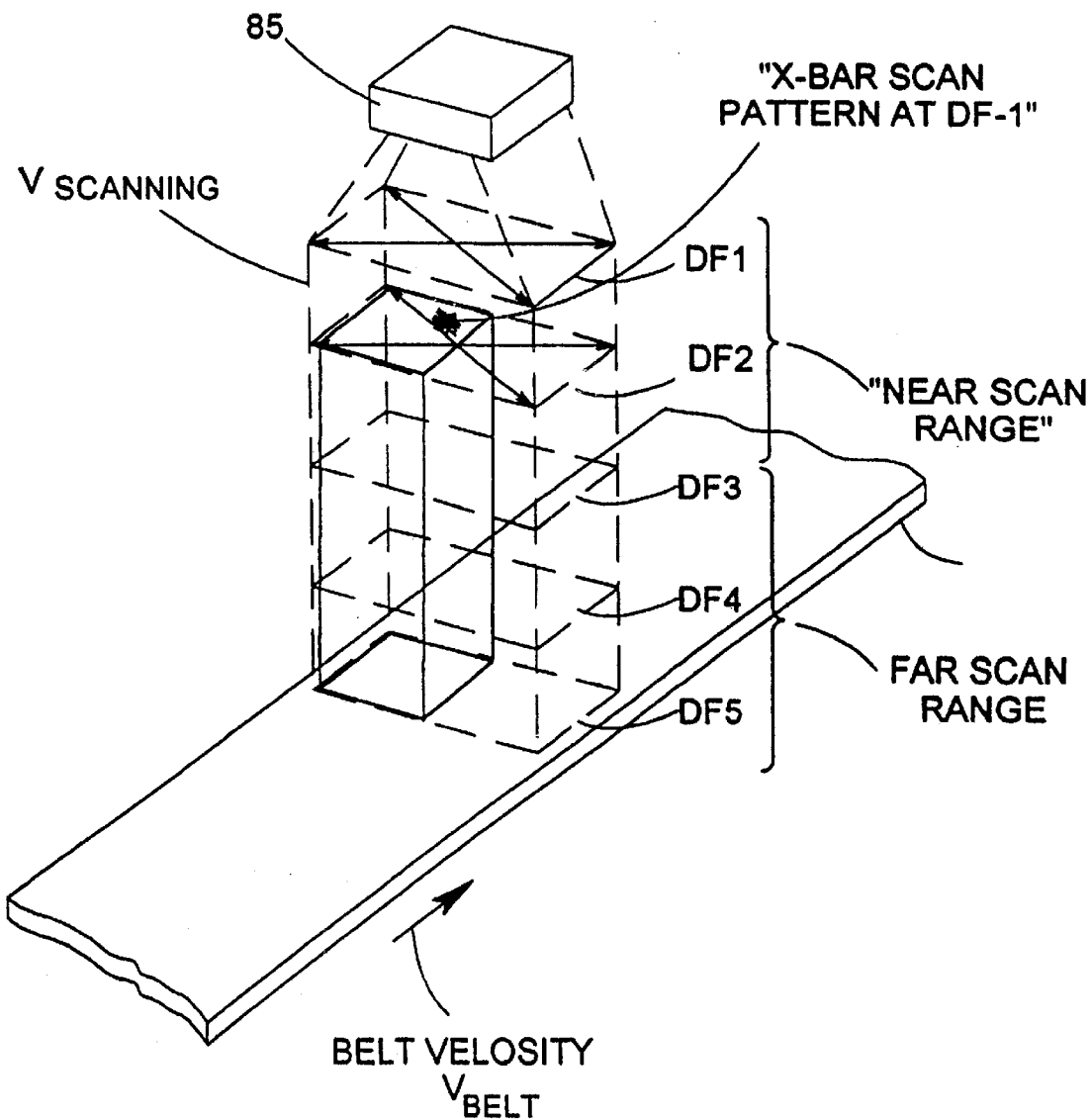
Figure 6A:
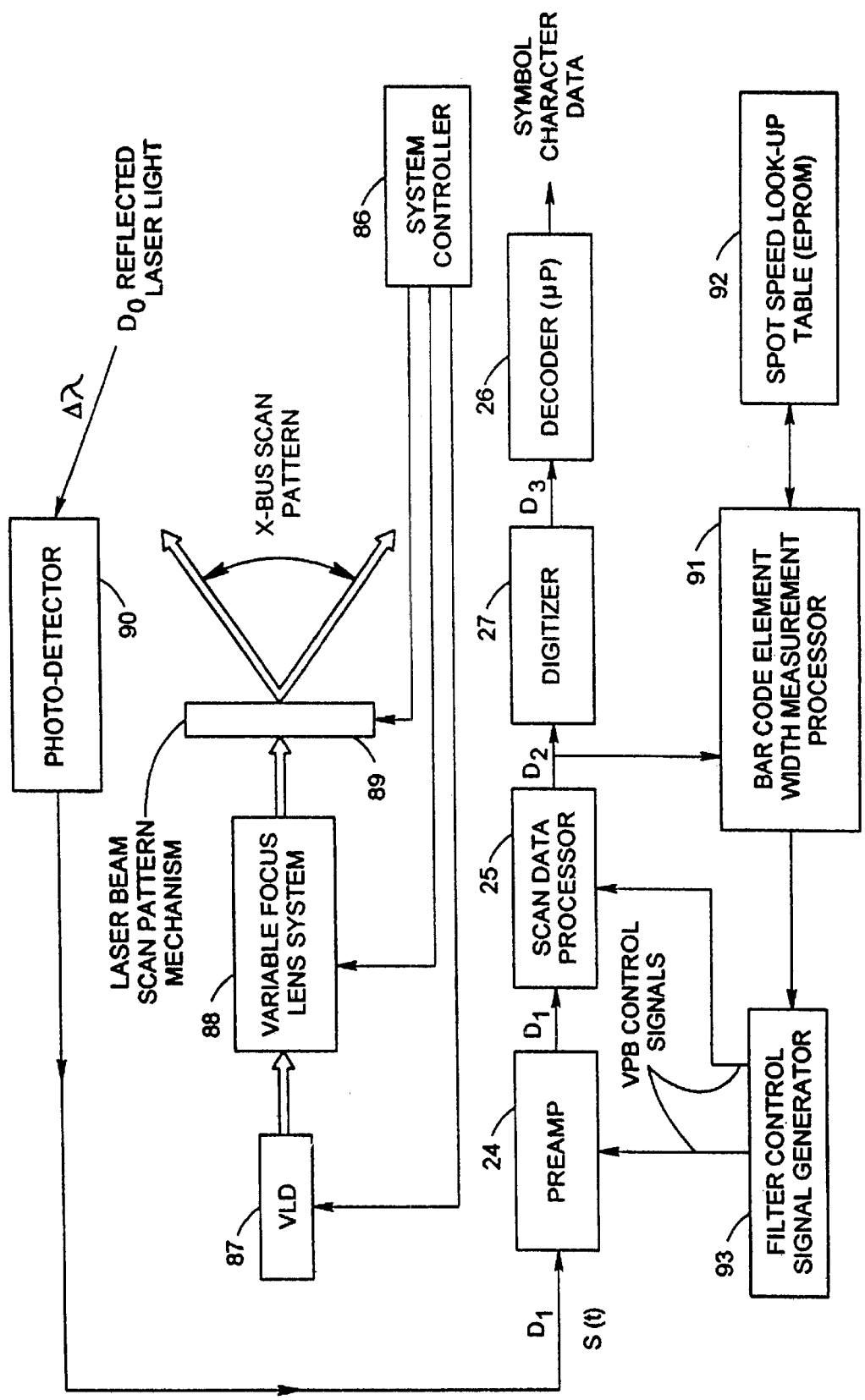
FIG. 6A is a block schematic diagram of the laser scanning system shown in FIG. 6.

In FIGS. 6 and 6A, the scan data signal processor of the present invention is shown embodied within a multi-focal zone polygonal-type laser scanning system also mounted over a conveyor belt system. In general, embodiments of this type will include fixed projection laser scanners, tunnel-type laser scanning systems, and the like.

Figure 7:
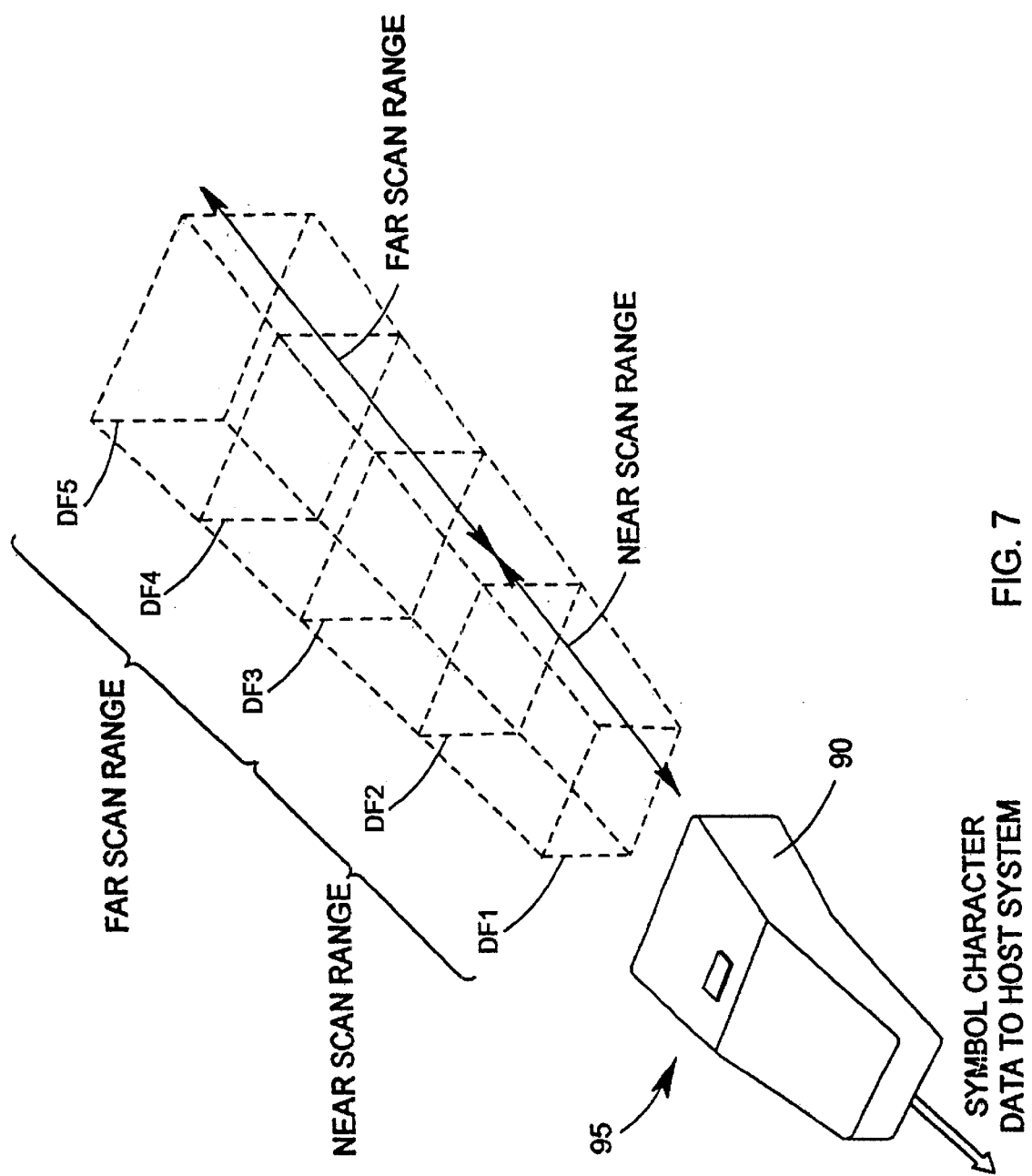
Figure 7A:
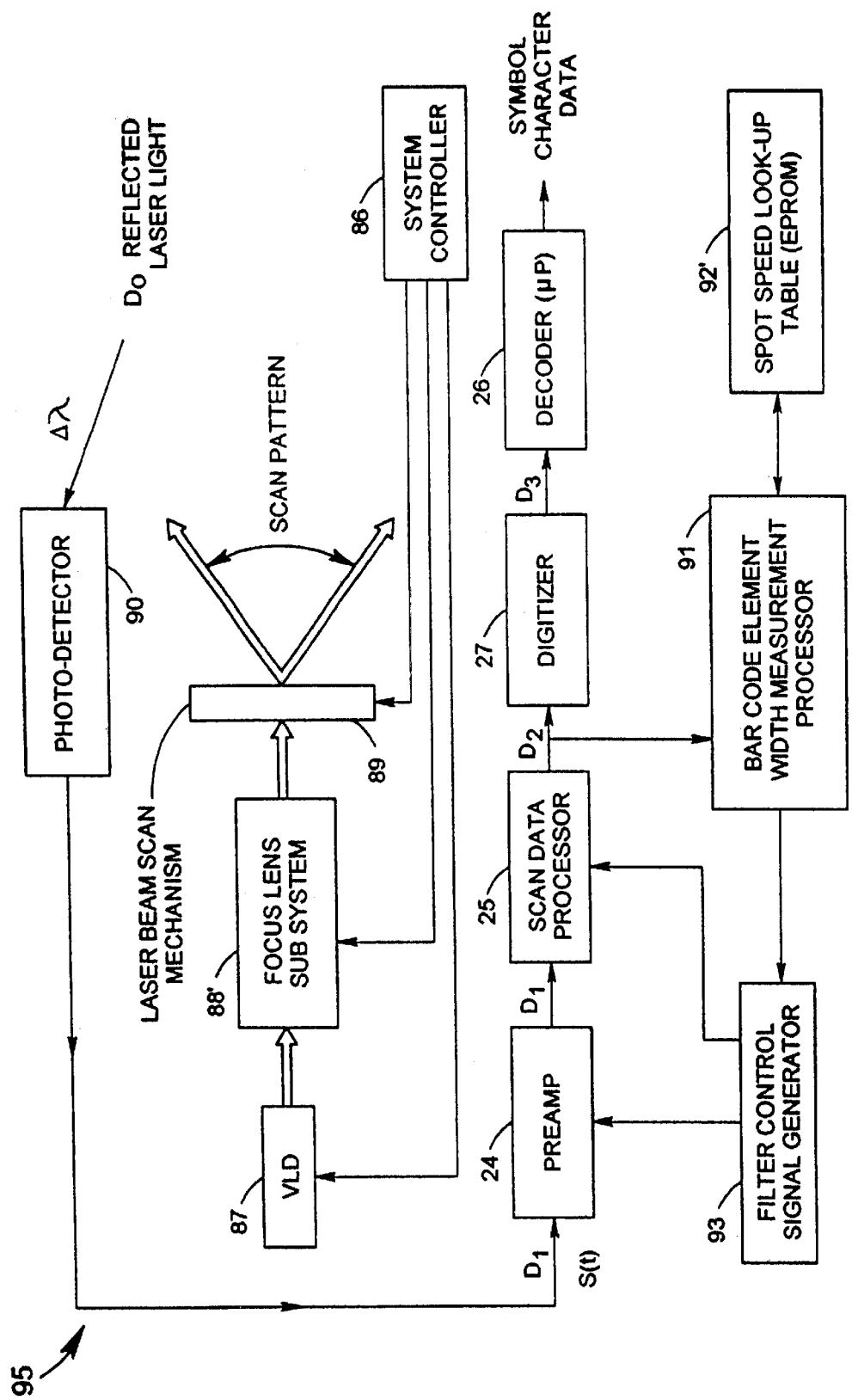
FIG. 7A is a block schematic diagram of the laser scanning system shown in FIG. 7.

In FIGS. 7 and 7A, the scan data signal processor of the present invention is shown embodied within a hand-supportable laser scanning bar code symbol reading device capable of producing a scanning field or volume having multiple focal zones or a large scanning range over which the maximum laser beam spot speed is about twice or greater than the minimum laser beam spot speed therewithin. In general, embodiments of this type will include hand supportable devices such as hand-held laser scanners, finger-mounted laser scanners, wand-type scanners as well as body-wearable laser scanners. Examples of such bar code symbol scanning systems are disclosed in U.S. Application No. Ser. 09/204,176, now U.S. Pat. No. 6,283,375, incorporated herein by reference in its entirety.

Figure 8:
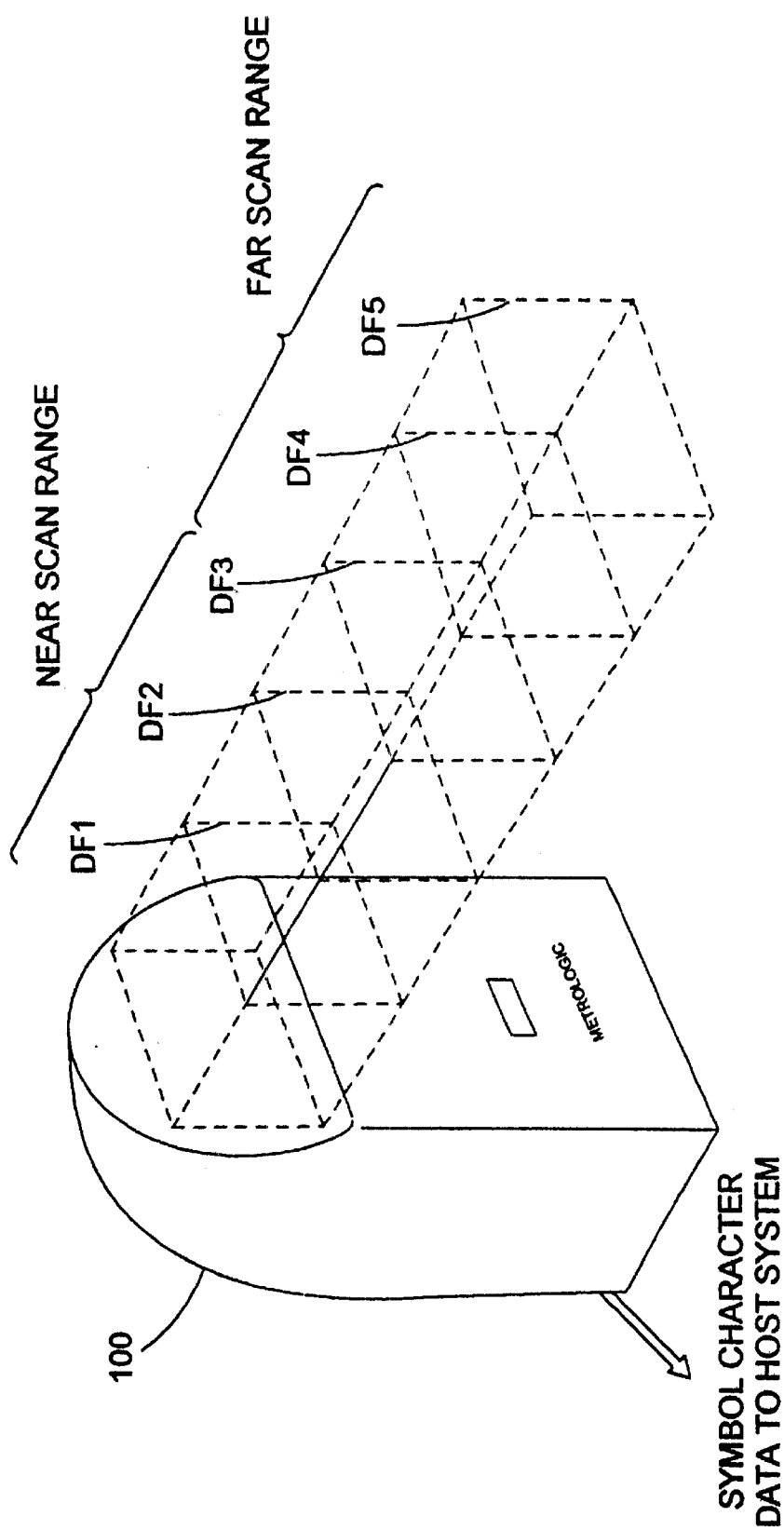
FIG. 8 is a schematic representation of yet another alternative embodiment of a laser scanning system in accordance with the present invention, realized in the form of a fixed or portable projection-type laser scanning bar code symbol reading device, shown comprising the scan data signal processor of FIGS. 4-1 and 4-2 adapted to process analog scan data signals generated from a laser scanning beam mechanism contained within its housing.
Figure 8A:
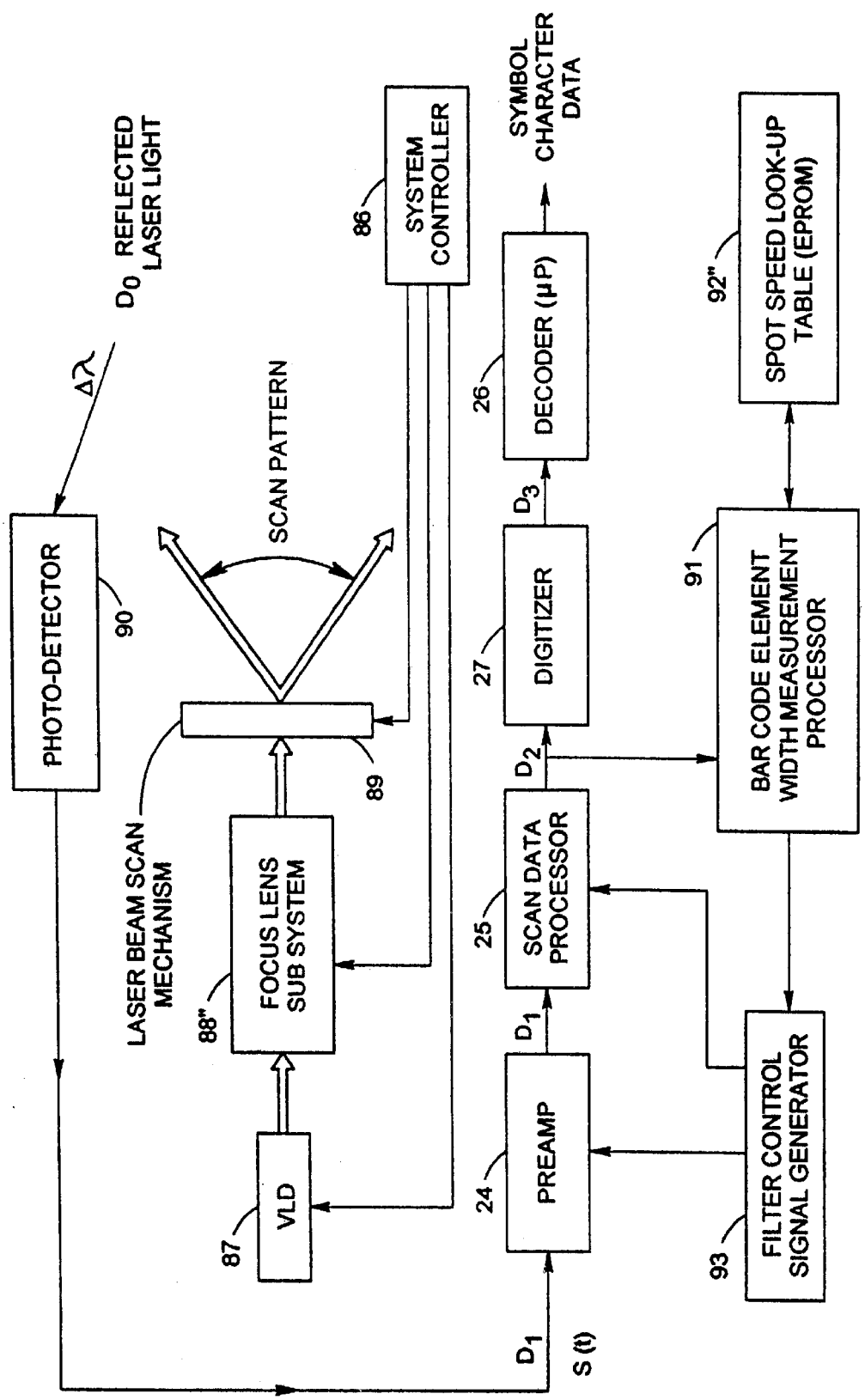
FIG. 8A is a block schematic diagram of the laser scanning system shown in FIG. 8.

In FIGS. 8 and 8A, the scan data signal processor of the present invention is shown embodied within a hand-supportable laser scanning bar code symbol reading device capable of producing a scanning field or volume having multiple focal zones or a large scanning range over which the maximum laser beam spot speed is about twice or greater than the minimum laser beam spot speed therewithin. In general, embodiments of this type will include fixed-mounted and portable projection-type laser scanning bar code symbol reading systems and devices. Examples of such bar code symbol scanning systems are disclosed in U.S. Pat. Nos. 5,796,091 and 5,557,093, incorporated herein by reference in its entirety.

In each such embodiment of the present invention, the primary function of the laser scanning mechanism, however realized, is to produce a laser scanning field or volume in which bar code symbols can be scanned in a reliable manner. In each illustrative embodiment of the present invention, the speed of the laser beam spot (or cross-section) along the extent of the scanned laser beam will vary over the depth of the scanning range of the system. The further the laser beam spot is away from the laser scanning mechanism, the greater the laser beam spot speed will be, based on well known principles of physics. A useful measure of such beam spot speed variation is given by the ratio of (i) the maximum laser beam spot speed within the scanning field of the system, to (ii) the minimum laser beam spot speed in the scanning system.

Hereinafter, this spot speed variation measure shall be referred to as the "Max/Min Beam Spot Speed Ratio" of a laser scanning system.

The substrate, usually paper, on which a bar code is printed reflects a signal of varying power when scanned with a focused laser beam within a given focal zone in the system. The laser light energy reflected (i.e. scattered) off the scanned code symbol is directed onto a photodetector by way of light collection and focusing optics. The photodetector converts these optical signals into corresponding electrical signals. The signal components produced by scanning the bar code substrate are unwanted and therefore are described as noise. Since the substrate is usually paper, consisting of fibers having a random spatial structure, such unwanted noise signals are commonly referred to as paper or substrate noise. The signal output from the photodetector is referred to as an analog scan data signal $S_{analog}$ comprising the desired bar code signal component as well as the paper noise components.

As a bar code is scanned within a focal zone disposed further away from the scanner, the analog scan data signal produced at the photodetector is increasingly compressed on the time domain by virtue of the fact that the laser beam speed increases as a function of distance away from the laser scanning mechanism. In accordance with Fourier Analysis principles, compression of the analog scan data signal (including its noise components) represented on the time-domain results in an increase in or shift of power to the higher spectral components of the analog scan data signal represented on the frequency-domain. Thus, the frequency spectra of an analog scan data signal (including its noise components) undergoes a positive frequency shift as the corresponding bar code symbol is scanned further away from the laser scanning system. This phenomenon is graphically illustrated in FIGS. 2A through 2F. Therefore, when scanning bar code symbols in a multi-focal zone laser scanning system, the bandwidth of the system must be sufficient to support the spectral components of analog scan data signals produced at the photodetector by scanning bar code symbols at the different focal zones of the system.

In accordance with teachings of the present invention, the effects of paper noise are significantly reduced in multi-focal zone laser scanning systems by processing the analog scan data signal with a scan data signal processor having a plurality of pass-band filters (and amplifiers) that are automatically selected for passing only the spectral components of the analog scan data signal produced when a bar code symbol is scanned at a particular focal zone in the laser scanning system. In the case of a five focal zone scanning system, five different pass-band filter structures can be provided within the scan data signal processor of the present invention. When a bar code symbol is scanned by a laser beam focused within the first focal zone, the passband filter structure associated with the first focal zone would be automatically switched into operation in the signal processor so that only the spectral components associated with the produced analog scan data signal and noise present over this pass-band, are present within the analog signal processor while the first and second derivative signals are generated and processed to produce a corresponding digital scan data signal, substantially free from the destructive effects of thermal and substrate noise outside the spectral pass-band of interest for the bar code symbol being scanned.

Alternatively, in order to reduced the number of components required by the scan data signal processor, the five focal zones can be divided into two or more scan ranges (e.g. Near Scan Range and Far Scan Range) so that two or more pass-band filter structures are used to pass the spectral components of analog scan data signals produced when scanning bar code symbols within these predefined scanning ranges, while rejecting the destructive power associated with spectral noise components outside of the selected pass-band filter structure.

By virtue of the present invention, it is now possible to scan bar code symbols in the nearest focal zone in a multi-focal zone system, and produce first and second derivative signals (of the analog scan data signal) that are substantially free of spectral noise components outside the pass-band filter structure associated with the nearest focal zone, so that the first and second derivative signals can be used in an optimal manner to reliably generate a corresponding digital scan data signal during A/D signal conversion within the signal processor. These and other advantages of the present invention will become apparent hereinafter.

Multi-Focal Zone Holographic Laser Scanning System Of The Present Invention

Figure 1A:
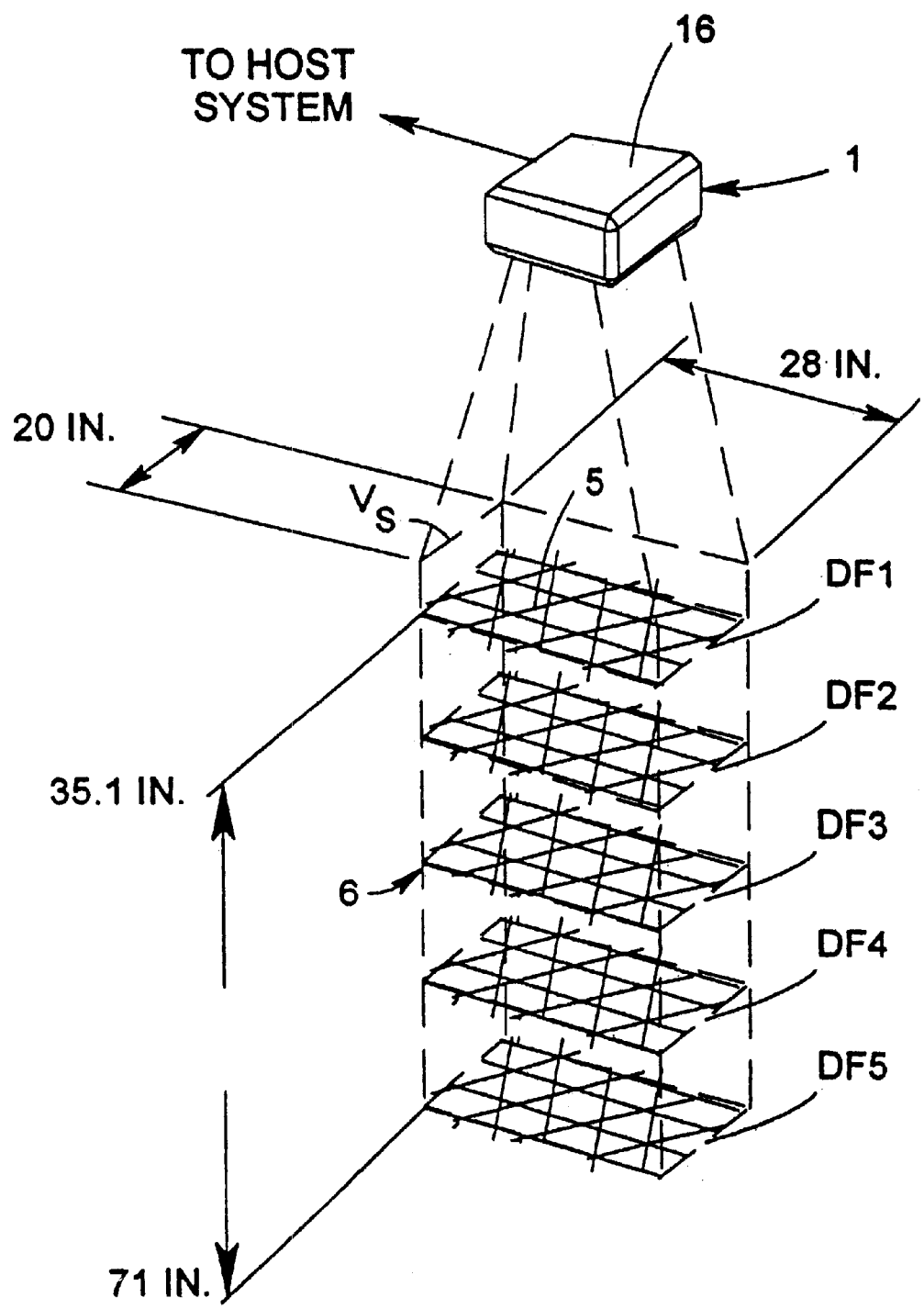
FIG. 1A is a schematic representation of the multi-focal zone holographic laser scanning bar code symbol reading system of FIG. 1, showing its omnidirectional laser scanning pattern substantially contained within a 3-D scanning volume having five different focal planes (FP1 through FP5) and five overlapping focal zones (FZ1 through FZ5)

In FIGS. 1 and 1A, the scan data signal processor of the present invention is shown embodied within a multi-focal zone holographic laser scanning bar code symbol reading system 1 that is mounted over a conveyor belt system 2 for the purpose of reading bar coded packages as described, for example, in Applicants' copending U.S. Application Ser. Nos.: 09/157,778 filed Sep. 21, 1998, now. U.S. Pat. No. 6,517,004; 09/047,146 filed Mar. 24, 1998, now U.S. Pat. Nos. 6,360,947; 08/949,915 filed Oct. 14, 1997, now U.S. Pat. No. 6,158,659; 08/854,832 filed May 12, 1997, now U.S. Pat. No. 6,085,978; 08/886,806 filed Apr. 22, 1997, now U.S. Pat. No. 5,984,185; and 08/573,949 filed Dec. 18, 1995, now abandoned; each of which is incorporated herein by reference in its entirety.

Figure 1B:
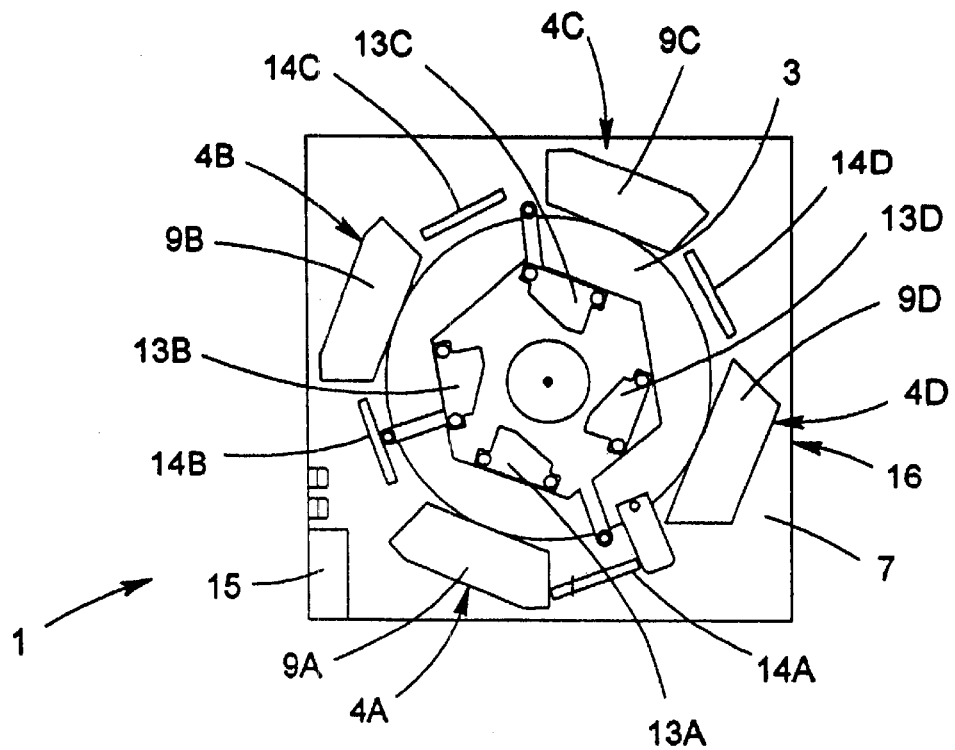
FIG. 1B is a plan view of the holographic laser scanning system of FIG. 1, showing its holographic scanning disc rotatably mounted on the optical bench of the system, and surrounded by four laser scanning stations, each consisting of a laser beam production module disposed beneath the scanning disc, a parabolic light collection mirror disposed below the scanning disc, a beam folding mirror disposed on the outer perimeter of and above the surface of the scanning disc, a photodetection and signal preamplification module disposed above the scanning disc, and a signal processing board supporting both analog and digital scan data signal processing circuits thereon, including the scan data signal processor of the present invention shown in FIGS. 4 through 4H4.
Figure 1C:
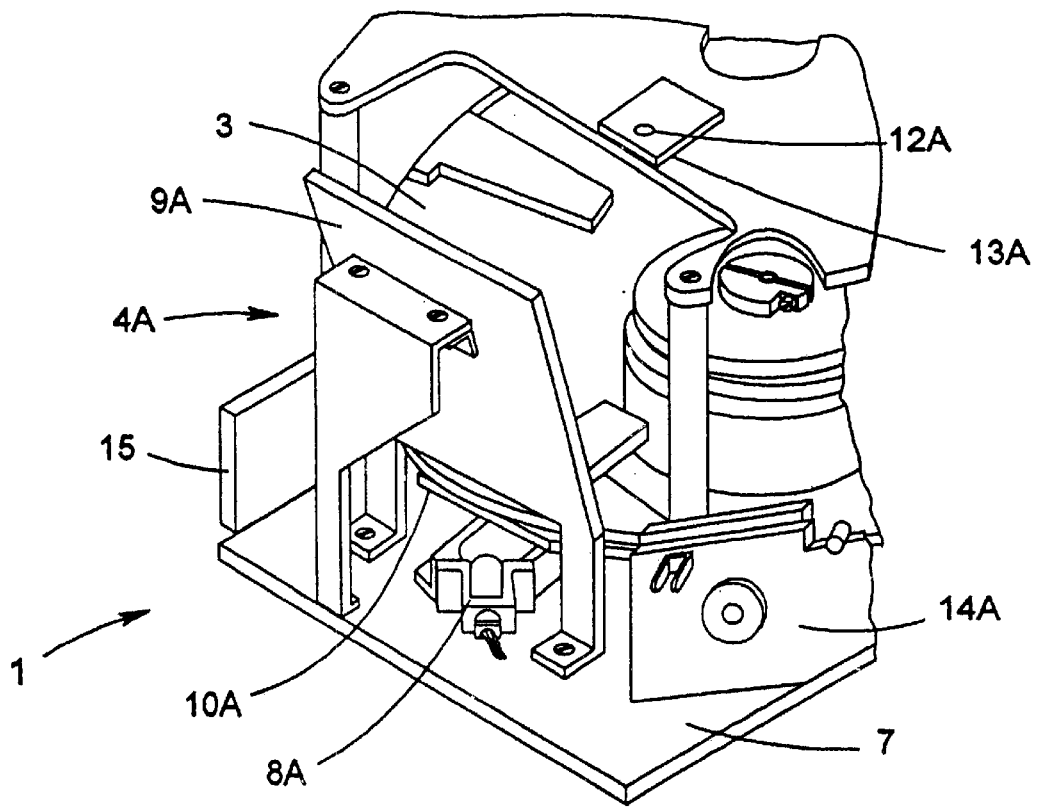
FIG. 1C is a partially cutaway schematic view of one laser scanning station disposed about the holographic scanning disc mounted within the holographic laser scanning system shown in FIG. 1.
Figure 1D:
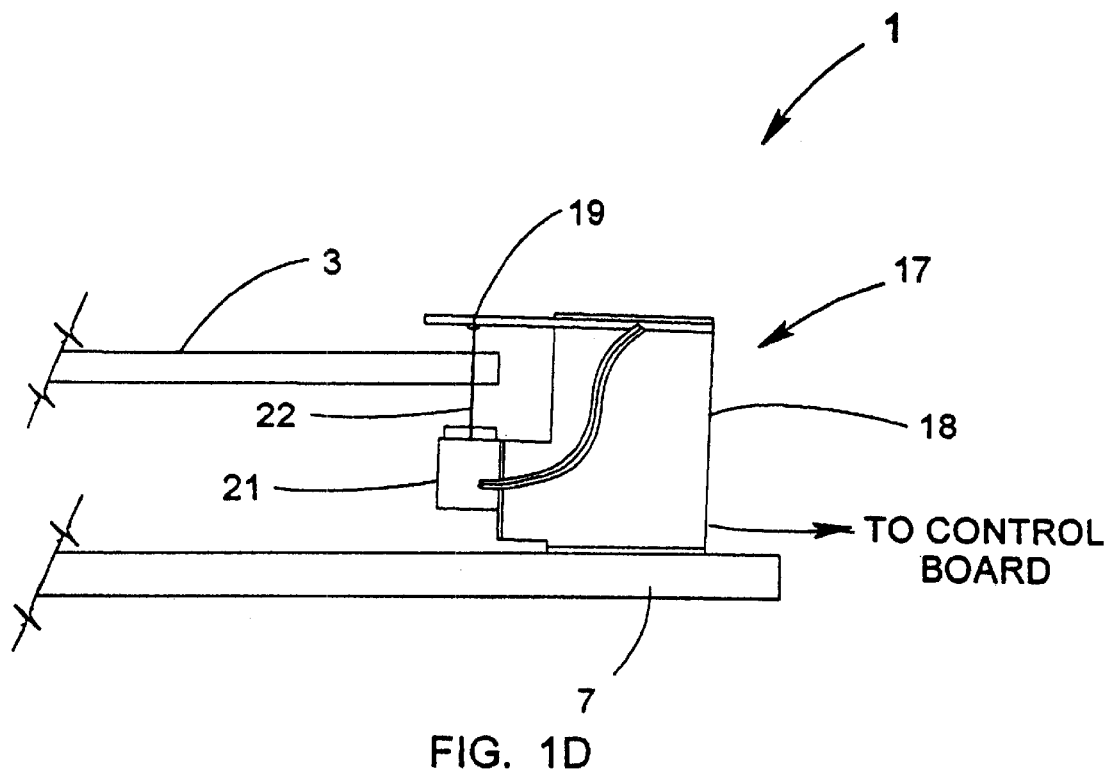
FIG. 1D is an elevated side view of the home pulse mark sensing module deployed beneath the outer edge portion of the holographic scanning disc in the system shown in FIGS. 1 through 1C.
Figure 1E:
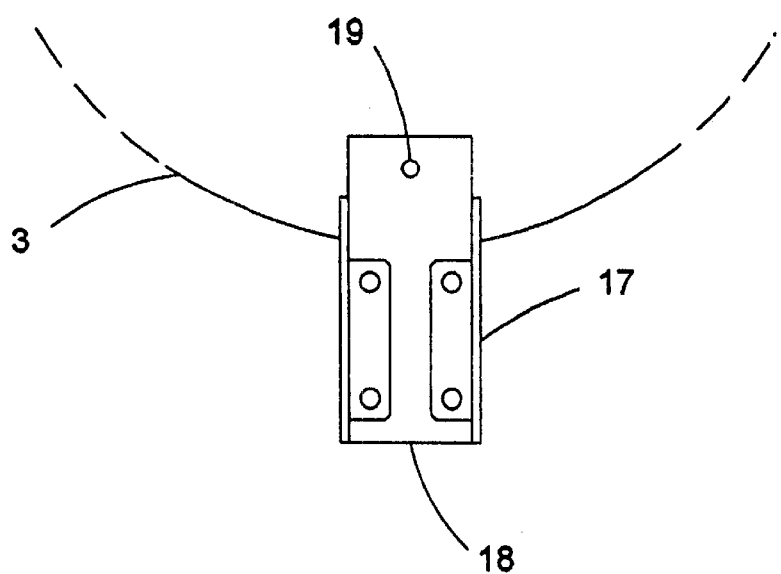
FIG. 1E is a plan view of the home pulse mark sensing module shown in FIG. 1D.
Figure 1F:
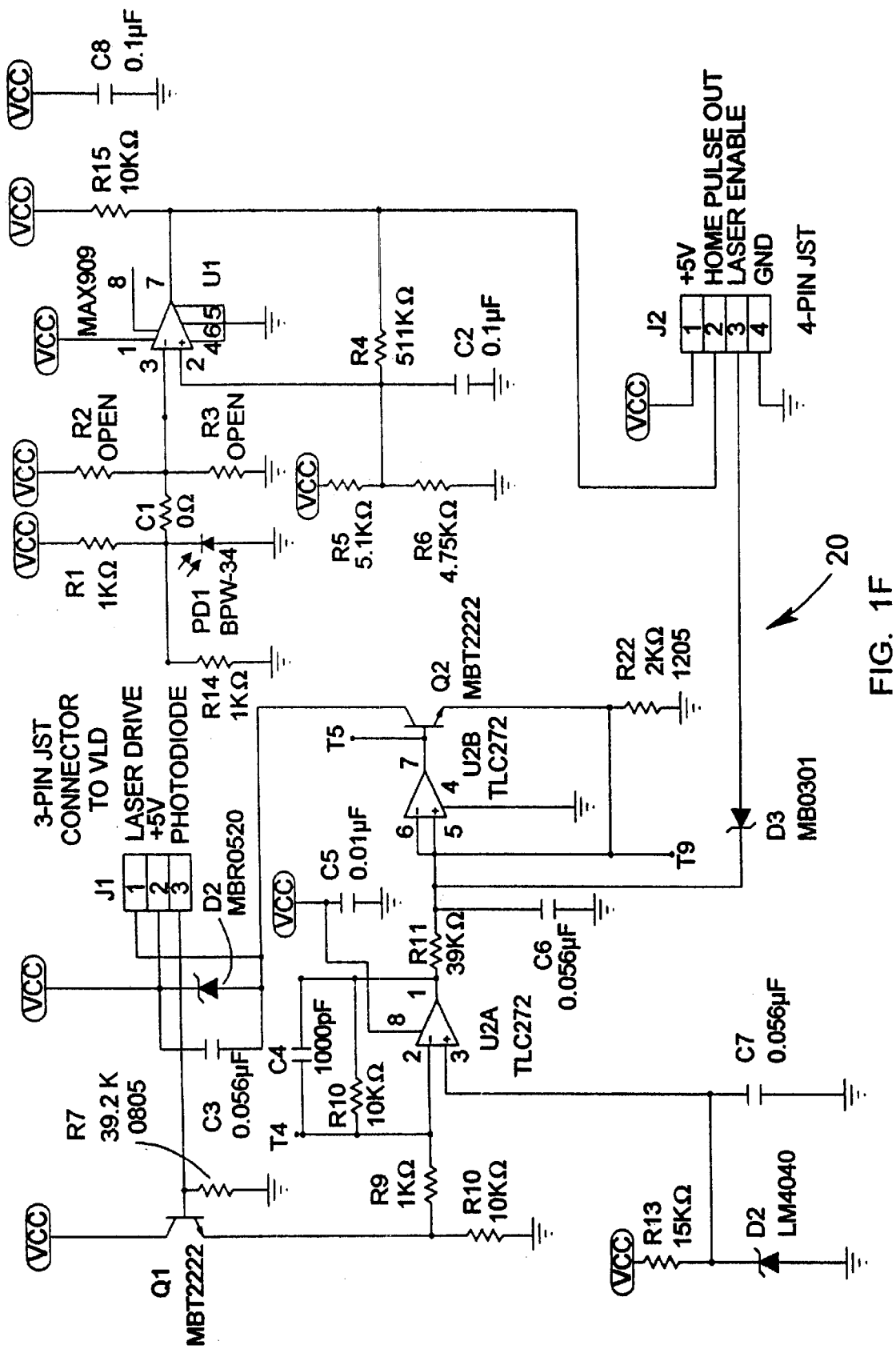
FIG. 1F is a detailed schematic diagram of a home-pulse detection and VLD driver circuit for use in the holographic laser scanning system of FIG. 1.
Figure 1G:
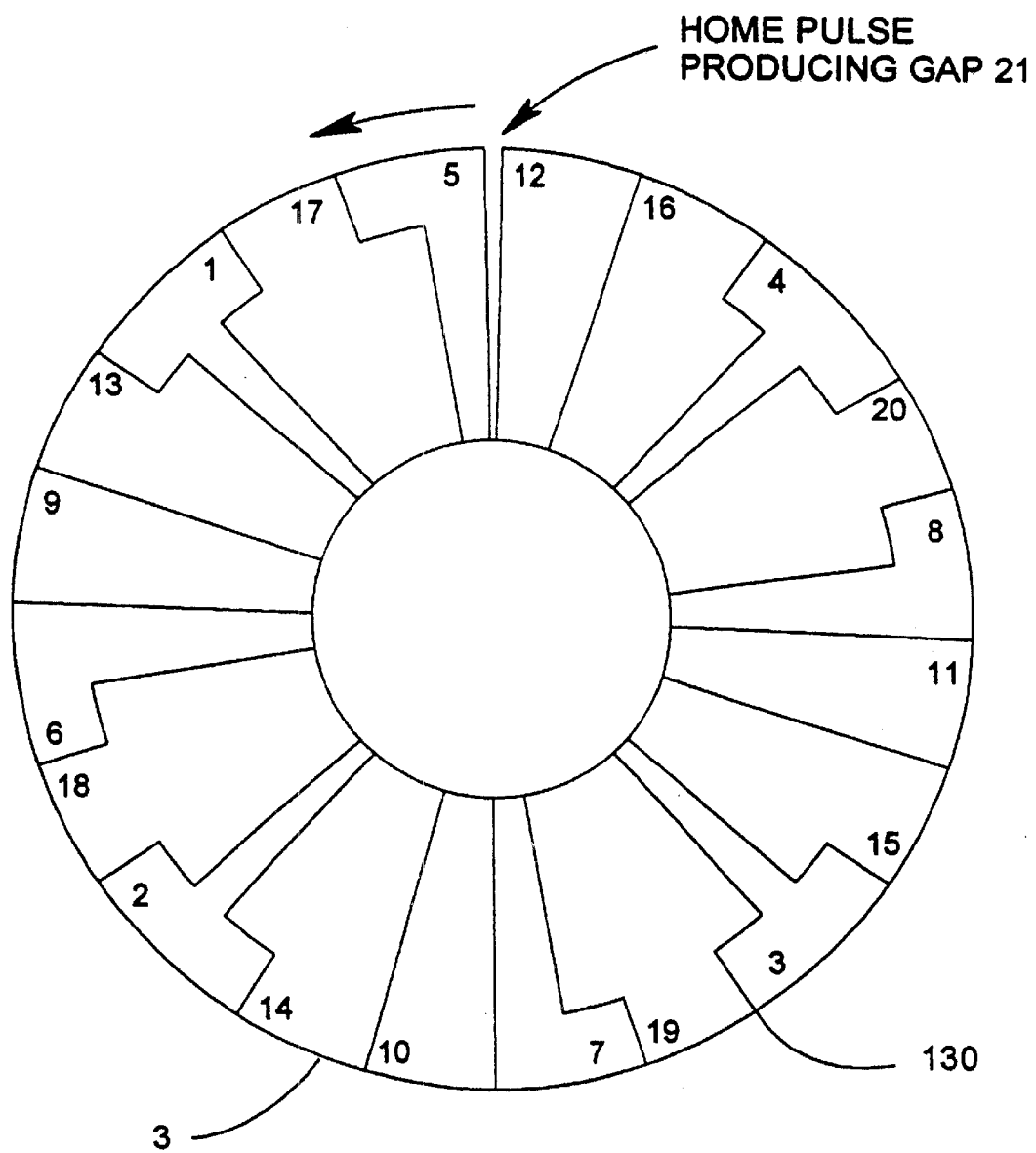
FIG. 1G is a schematic representation of the holographic laser scanning disc employed in the bar code symbol reading system of FIG. 1, showing its twenty holographic optical elements (HOPs) supported between the support plates of the scanning disc.

As shown in FIGS. 1 and 1A, the holographic laser scanning system 1 employs a holographic scanning disc 3 shown in FIGS. 1B, 1C, 1D, 1E and 1G to produces an omnidirectional scanning pattern within a well-defined 3-D scanning volume during each revolution of the disc. In the illustrative embodiment, the holographic scanning disc 3 supports twenty holographic optical elements (i.e. facets) each of which is realized as volume transmission hologram in the preferred embodiment. Methods for designing the holographic disc and its accompanying scanning platform are disclosed in great detail in copending U.S. Application Ser. Nos. 08/854,832 filed May 12, 1997, now U.S. Pat. No. 6,085,978, 08/886,806 filed Apr. 22, 1997, now U.S. Pat. No. 5,984,185, and 08/573,949 filed Dec. 18, 1995, now abandoned, supra. Design and construction parameters for the holographic scanning disc 3 are set forth in Table 1H. An optical layout for the facets on the scanning disc is shown in FIG. 1G.

Figure 5B:
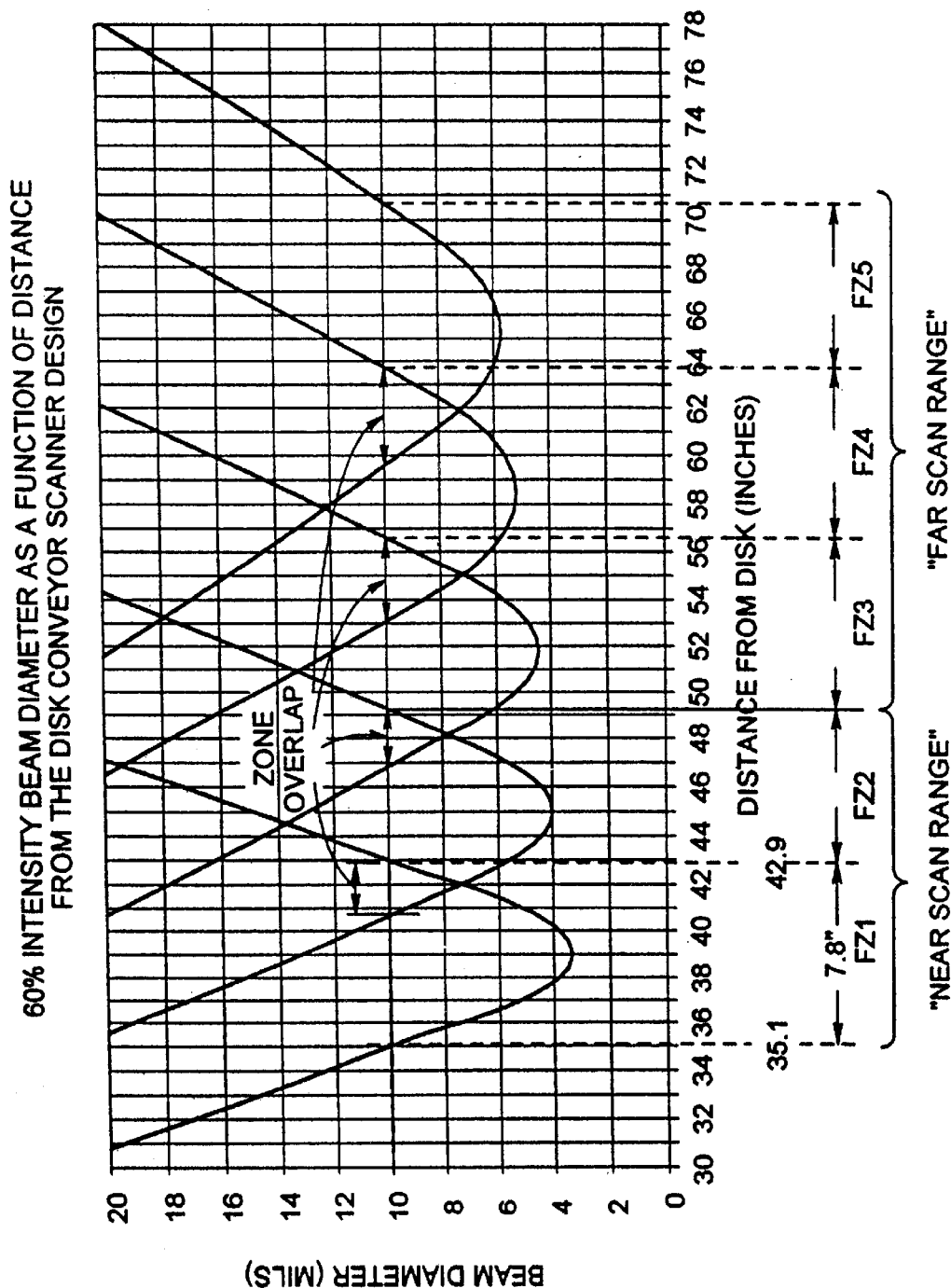
FIG. 5B is a graphical representation of the cross-sectioned diameter of laser scanning beams produced by the holographic laser scanning system shown in FIG. 1, and employing the scan data signal processor shown in FIGS. 4-1 and 4-2, shown plotted as a function of distance away from the holographic scanning disc shown in FIG. 1G, graphically indicating an increase in the depth dimension of each focal zone in the holographic laser scanning system.

In the illustrative embodiment, the holographic laser scanning system 1 comprises four laser scanning stations 4A through 4D arranged about the holographic scanning disc 3. Each time the holographic scanning disc revolves past the four laser scanning stations, the system generates an omnidirectional laser scanning pattern 5 within a highly confined 3-D scanning volume 6 having five different focal zones which overlap slightly at the end portions of each such focal region. In FIG. 5B, a graph is presented which indicates the spatial dimensions of each focal zone in the system, as well as the beam diameter therewithin and the amount of overlap provided between adjacent focal zones in the holographic laser scanning system of the illustrative embodiment. The speed of the laser beams within each focal zone (FZ1, FZ2, FZ3, FZ4 and FZ5) is listed in the table of FIGS. 1H and 1H1, along side the parameters of the holographic scanning facet producing the laser scanning beam in the focal region. Notably, at the center of each scanline in each focal zone, the beam speed is substantially equal. Also, from this table, it can be seen that the speed of the laser beam at the maximum depth of field in each focal zone is greater than the speed of the laser beam at the center of the scanlines therein, whereas the speed of the laser beam at the minimum depth of field in each focal zone is less than the speed of the laser beam at the center of the scanlines therein.

In order to reduce the number of pass-band filter structures required within the scan data signal processor of the holographic laser scanning system shown in FIG. 1, the five overlapping focal regions FZ1 though FZ5 are grouped into two distinct scanning ranges, referred to as the Near Scan Range and the Far Scan Range. The depth of field of each of these scanning ranges and the focal zones falling therewithin are specified in FIGS. 1I and 5B.

As shown in FIG. 1B, the holographic scanning disc 3 is rotatably mounted on the bench 7 of the system, and is surrounded by laser scanning stations 4A through 4D. It is understood, however, that in alternative embodiments of the present invention more or less scanning stations can be provided about the holographic scanning disc in order to modify the laser beam scanning pattern within the 3-D scanning volume of the system.

As shown in FIG. 1C, each laser beam scanning station comprises at number of subcomponents including, for example: a laser beam production module 8 disposed beneath the holographic scanning disc 3 for producing a laser beam incident the underside surface of the scanning disc while having requisite beam characteristics described in detail in copending Application Serial Nos. 08/854,832 filed May 12, 1997, now U.S. Pat. No. 6,085,978, 08/886,806 filed Apr. 22, 1997, now U.S. Pat. No. 5,984,185, and 08/573,949 filed Dec. 18, 1995, now abandoned, supra; a beam folding mirror 9 disposed on the outer perimeter of the scanning disc and above its surface, for folding the focused laser beam diffracted by the scanning disc; a parabolic light collection mirror 10 disposed below the scanning disc for collecting laser light rays scattered off a scanned bar code symbol 11 (within the focal zone associated with the particular holographic facet), and transmitted through the corresponding scanning facet and subsequently focused and retransmitted through the scanning disc onto a focal point above the scanning disc, at which the photodetector 12 is supported by a PC-based photodetection and preamplification board 13, as shown; and a signal processing board 14 (14A through 14D) supporting analog and digital signal processing circuits thereon, including the scan data signal processor of the present invention. As shown in FIG. 1B, a control (i.e. mother) board 15 is mounted within the housing 16 of the scanning system. On the control board 15, interfaces and circuits are provided for receiving and processing the digital scan data signals produced by the signal processing boards 14A through 14D from the laser scanning stations in the system.

As shown in FIGS. 1B, 1D and 1E, the holographic laser scanning system 1 also includes a home-pulse mark sensing module 17 mounted beneath the edge of the scanning disc 3 on the optical bench 7 of the system. As shown in FIGS. 1D and 1E, the module 17 comprises a number of subcomponents, namely: a miniature module housing 18 supporting a photodetector 19 which is connected to home pulse detection and VLD drive and photodetection circuitry 20 supported on the control (mother) board 15; a visible laser diode (VLD) 21 for producing-and passing a laser beam 22 through the edge of the scanning disc, onto the photodetector 19; and VLD drive circuitry 23 also on control board, for driving the VLD during scanner operation. The circuit 20 can be constructed in accordance with the schematic diagram set forth in FIG. 1F. During scanner operation, the home-pulse detector senses the home indicator gap 21 on the scanning disc 3 each time the disc passes the indicator during disc rotation. The output of the home-pulse detection circuit 20 on the control board 15 is provided as input to a microprocessor-based home offset pulse (HOP) generator 22 provided on the control board, as shown in FIG. 3A2. As will be described in greater detail hereinafter, the HOP generator 22 generates home offset pulses (HOPs) based on the following information: the known angular width of each facet; the disc motor speed; and the sequence of facets on the holographic scanning disc. A different HOP is sent to each decode board 14A–14D at a different instant in time corresponding to when the home indicator gap 21 is presented before the incident scanning beam of the corresponding scanning station about the disc. On the corresponding decode board, a microprocessor-based start of facet pulse generator 23 uses the received HOP and information about the disc speed, facet sequence, and facet angular width to generate a start of facet pulse (SFP) for each facet as it moves by the corresponding scanning station.

In the illustrative embodiment, the SFP can be used to generate a signal indicating which scanning range (e.g. Near Scan Range or Far Scan Range) is being scanned by the particular facet in use at any given time, and provide that signal to the scan data signal processor 25 on the corresponding decode processing board 14, as shown in FIG. 3A1. If the Near Scan Range is being scanned, then a digital "low" level is produced as output from the microprocessor 26 on the corresponding decode processing board 14, in accordance with the table set forth in FIG. 11. If the Far Scan Range is being scanned, then a digital "high" level is produced output from the microprocessor 26.

As shown in the system diagram of FIGS. 3A1 through 3A3, the holographic laser scanning system of FIG. 1 comprises a number of subsystem components, many of which are realized on the mother control board 15, and the preamplification boards 13A through 13D supported above the scanning disc, and the digital signal processing boards 14A through 14D beneath the scanning disc, shown in FIGS. 1B and 1C. For sake of simplicity, it will be best to describe these system components by describing the components realized on each of the abovedescribed boards, and thereafter describe the interfaces and interaction therebetween.

As shown in FIG. 3A1, each analog scan data signal processing board 14A through 14D has the following components mounted thereon: an associated photodetector 12A (through 12D), realized as a silicon photocell, for detection of analog scan data signals; and an analog signal preamplification circuit 24A (through 24D for amplifying detected analog scan data signals to produce analog scan data signal D1.

In the illustrative embodiment, each photodetector 12A through 12D is realized as an opto-electronic device and each signal preamplification circuit 24A through 24D aboard the analog signal processing board is realized as a discrete circuit. These circuits are suitably mounted onto a small printed circuit (PC) board, along with electrical connectors which allow for interfacing with other boards within the scanner housing. With all of its components mounted thereon, each PC board is suitably fastened to the photodetector support frame along its respective central reference frame, as shown in FIG. 1C.

In a conventional manner, a portion of the scattered light rays off a scanned bar code symbol are reflected along the same outgoing light ray path towards the holographic facet which produces the scanned laser beam. These reflected light rays are collected by the scanning facet and ultimately focused onto the photodetector by the parabolic light reflecting mirror $D_1$ disposed beneath the holographic scanning disc. The function of each photodetector 12A is to detect variations in the amplitude (i.e. intensity) of optical scan data signal $D_1$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the signal preamplification circuitry 24A is to pass-band filter and preamplify the electrical analog scan data signal $D_1$, in order to improve the SNR of the output signal.

In the illustrative embodiment, each digital scan data signal processing board 14A (through 14D) is constructed the same. On each of these signal processing boards, the following devices are realized: an analog scan data signal processing circuit 25A (through 25D) constructed in accordance with the principles of the present invention; a programmable digitizing circuit 24A (through 24D) realized as an ASIC chip; start-of-facet pulse (SFP) generator 23A (through 23D) realized as a programmable IC chip, for generating SFPs relative to home-offset pulses (HOP) generated by a start of facet pulse (SFP) generator circuit on the mother board 15; an EPROM 28A (through 28D) for storing parameters and information represented, for example, in the tables of FIG. 3C; and programmed decode computer 26A (through 26D) is realized as a programmed microprocessor and associated program and data storage memory and system buses, for carrying out symbol decoding operations in a real-time manner. In the illustrative embodiment, the analog scan data signal processor, the programmed microprocessor, its associated memory and systems buses are all mounted on a single printed circuit (PC) board, using suitable electrical connectors, in a manner well known in the art.

As will be described in greater detail hereinafter, the function of the scan data signal processor (25A through 25D) is to perform various signal processing operations on the analog scan data signal $D_1$ received from the photodetector 12A (through 12D) and ultimately convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit 27A (through 27D) in the illustrative embodiment is to convert the digital scan data signal D2, associated with each scanned bar code symbol, into a corresponding sequence of digital words (i.e. a sequence of digital count values) $D_3$ representative of package identification data. Notably, in the digital word sequence $D_3$, each digital word represents the time length associated with each first or second signal level in the corresponding digital scan data signal $D_2$. Preferably, the digital count values are in a suitable digital format for use in carrying out various symbol decoding operations. Reference is made to U.S. Pat. No. 5,343,027 to Knowles, incorporated herein by reference, as it provides technical details regarding the design and construction of microelectronic digitizing circuits suitable for use in the holographic laser scanning system of the present invention.

In bar code symbol scanning applications, the function of each programmed decode computer (26A through 26D) in the illustrative embodiment is to receive each digital word sequence $D_3$ produced from its respective digitizing circuit (27A through 27D), and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer. In bar code symbol reading applications, in which scanned code symbols can be any one of a number of symbologies, a bar code symbol decoding algorithm with auto-discrimination capabilities can be used in a manner known in the art.

As shown in FIG. 3A2, the central processing (i.e. mother) board 15 comprises a number of components mounted on a small PC board, namely: a programmed microprocessor 29 with a system bus and associated program and data storage memory, for controlling the system operation of the holographic laser scanner and performing other auxiliary functions; first, second, third, and fourth serial data channels 30A through 30D, for receiving serial data input from the programmable decode computers 26A (through 26D) respectively; an input/output (I/O) interface circuit 31 for interfacing with and transmitting symbol character data and other information to data management computer system 32; home pulse detector 20 and associated VLD driver circuits, realized as the electronic circuit shown in FIG. 1F, for detecting the home pulse generated when the laser beam 22 (from VLD 21 in home pulse marking sensing module 17 in FIG. 1D) is directed through home-pulse indicator gap (between Facets Nos. 5 and 12 shown in FIG. 1G) and sensed by photodetector 19; and home-offset-pulse (HOP) generator 22 realized as an ASIC chip, for generating a set of four home-offset pulses (HOPs) in response to the detection of each home pulse by circuit 20.

In the illustrative embodiment, each serial data channel 30A through 30D is realized as an RS232 port, although it is understood that other structures may be used to realize the function performed thereby. The programmed control computer 29 also produces motor control signals, and laser control signals during system operation. These control signals are received as input by a power supply circuit 33 realized on the power supply PC board. Other input signals to the power supply circuit 33 include a 120 Volt, 60 Hz line voltage signal from a standard power distribution circuit. On the basis of the received input signals, the power supply circuit produces as output, (1) laser source enable signals to drive VLDs (14A through 14D), respectively, and (2) motor enable signals in order to drive the scanning disc motor 34 coupled to holographic scanning disc 3.

Figure 3B:
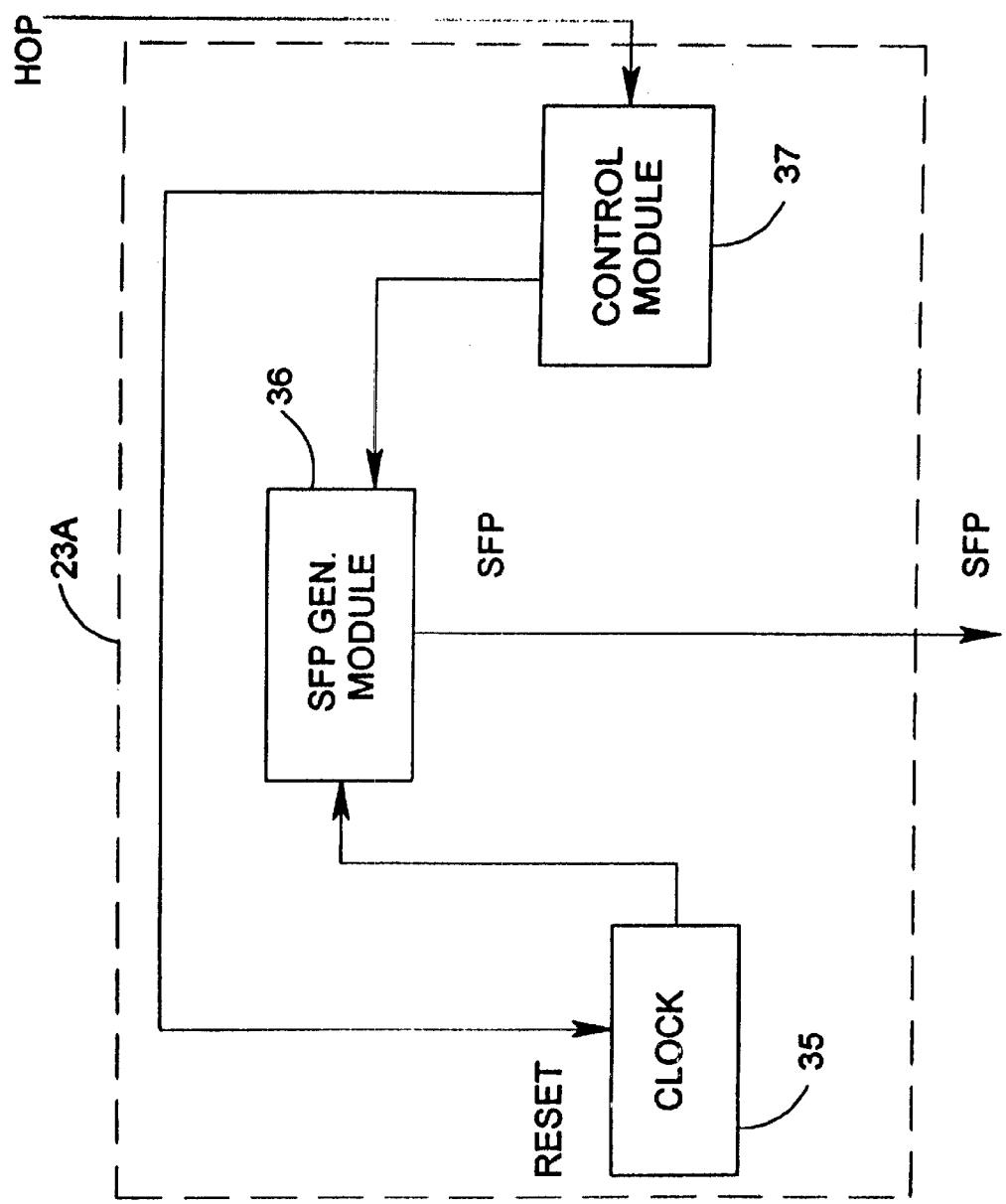
FIG. 3B is a schematic representation of the start-of-facet-pulse (SFP) generator employed on each decode processing board in the holographic laser scanning system of FIG. 1.
Figure 3D:
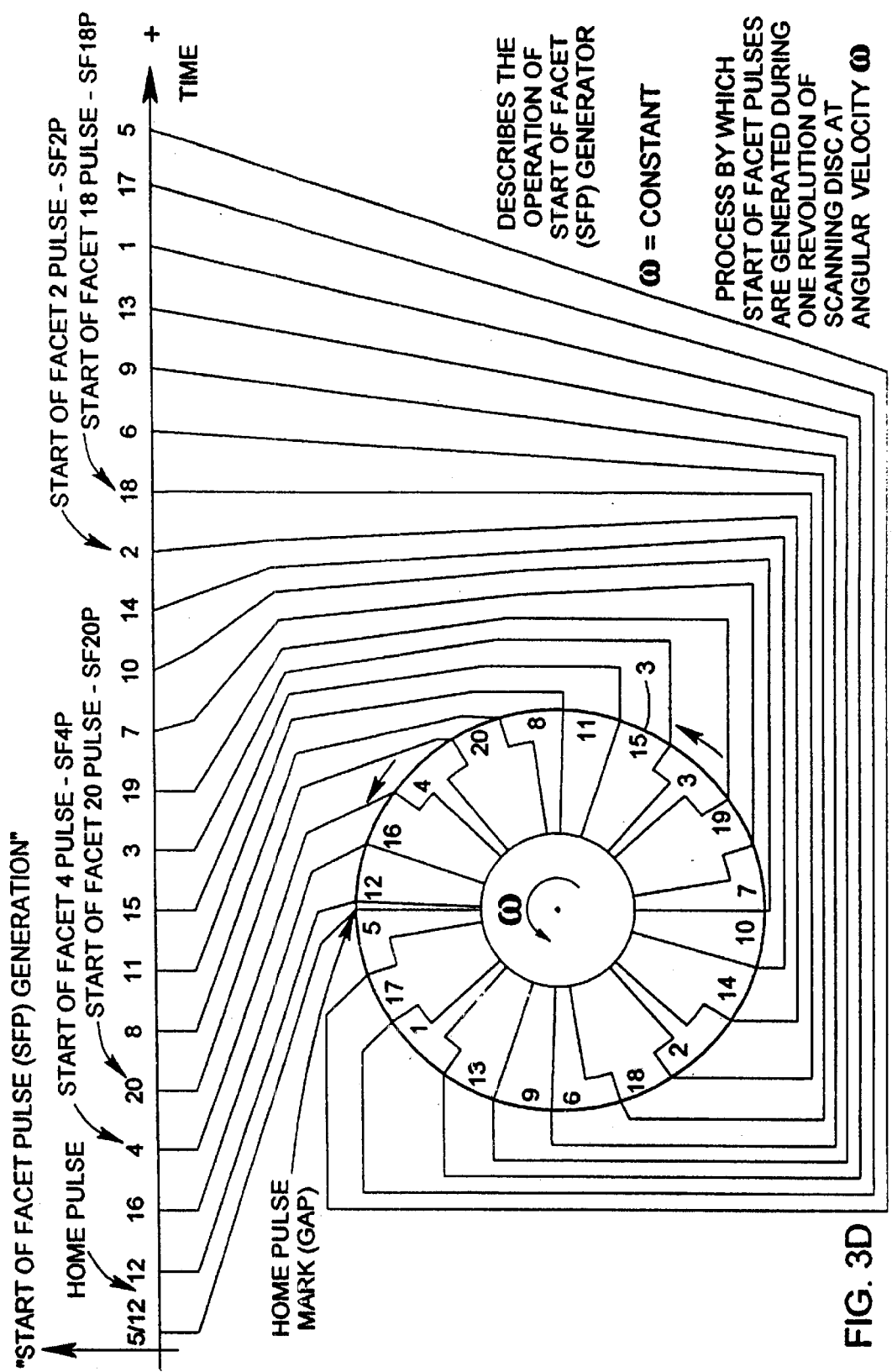
FIG. 3D is a schematic representation of the operation of the start-of-facet pulse (SFP) generator employed within each SFP generator of the holographic laser scanning system of FIG. 1, wherein start of facet pulses are generated within the SFP generator relative to the home-offset pulse (HOP) received from the HOP generator on the mother/control board in the system.

As shown in FIG. 3B, each SFP generator (23A through 23D) comprises: a clock 35 for producing clock pulses (e.g. having a pulse duration of about 4 microseconds); a SFP generation module 36 for generating SFPs using the table of FIG. 3C in accordance with the process depicted in FIG. 3D; and a control module 37 for controlling the SFP generator, and resetting the clock 39 upon each detection of a new HOP from the HOP generator on the mother control board associated with the holographic scanning unit. As shown in FIG. 3A1, SFPs are provided to the analog scan data signal processor 25A by way of bus 28, or equivalent means known in the art. As mentioned hereinabove, the SFPs are used by the analog scan data processor 25A (through 25D) to select particular filter characteristics which optimize SNR during A/D signal conversion.

Having described the structure and function of the major components of the holographic laser scanning system of FIG. 1, it is appropriate at this juncture to now describe in greater detail the scan data signal processor of the present invention 25A (through 25D) with reference to FIGS. 4-1 through 5C.

Figure 4A:
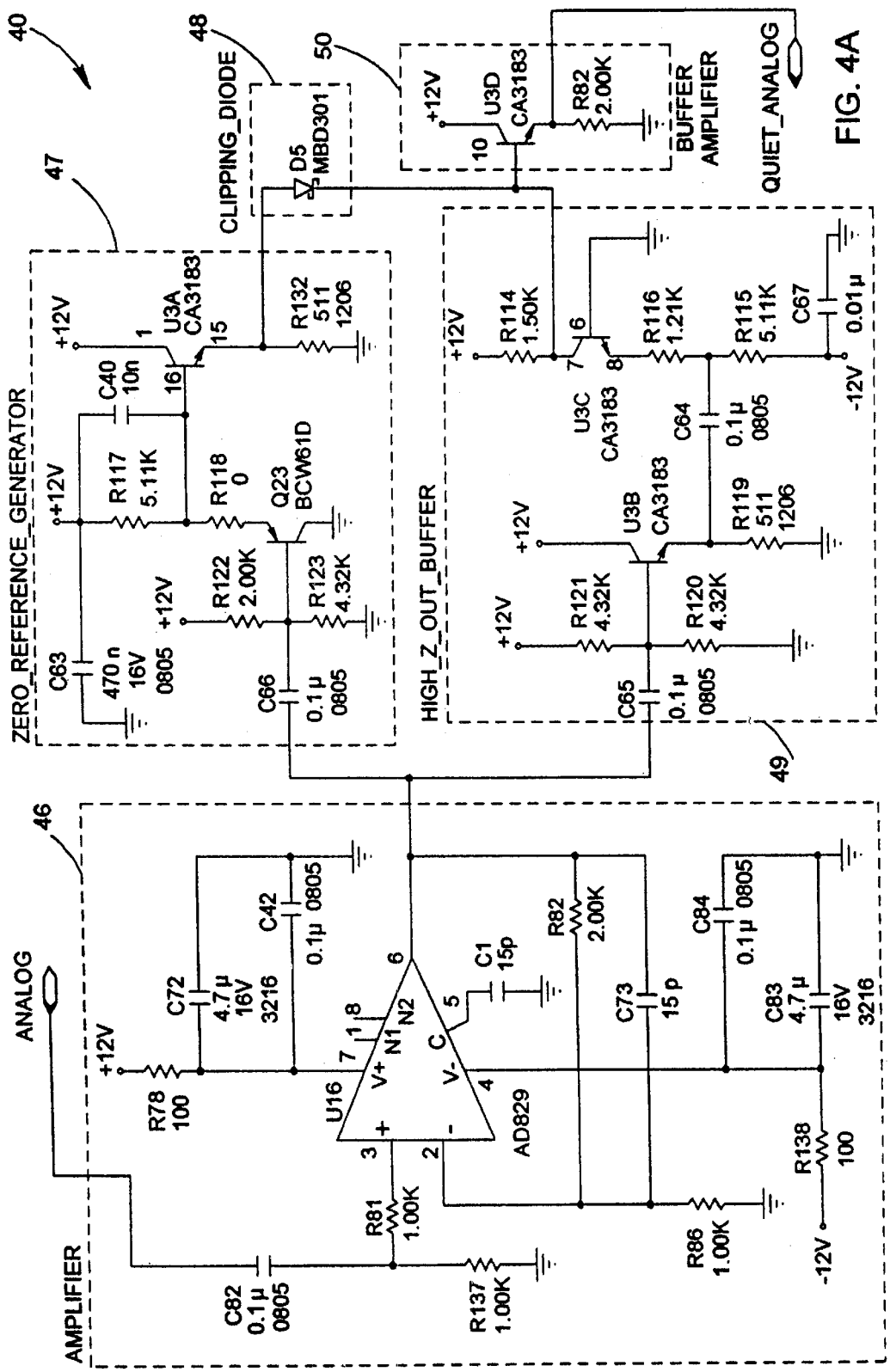
FIG. 4A is a detailed schematic diagram of the time-domain substrate noise filtering circuit employed in the scan data signal processor of FIGS. 4-1 and 4-2, shown comprising an analog signal amplifier, a zero-reference signal generator, a clipping diode, a high-impedance output amplifier and a buffer amplifier.
Figure 4B:
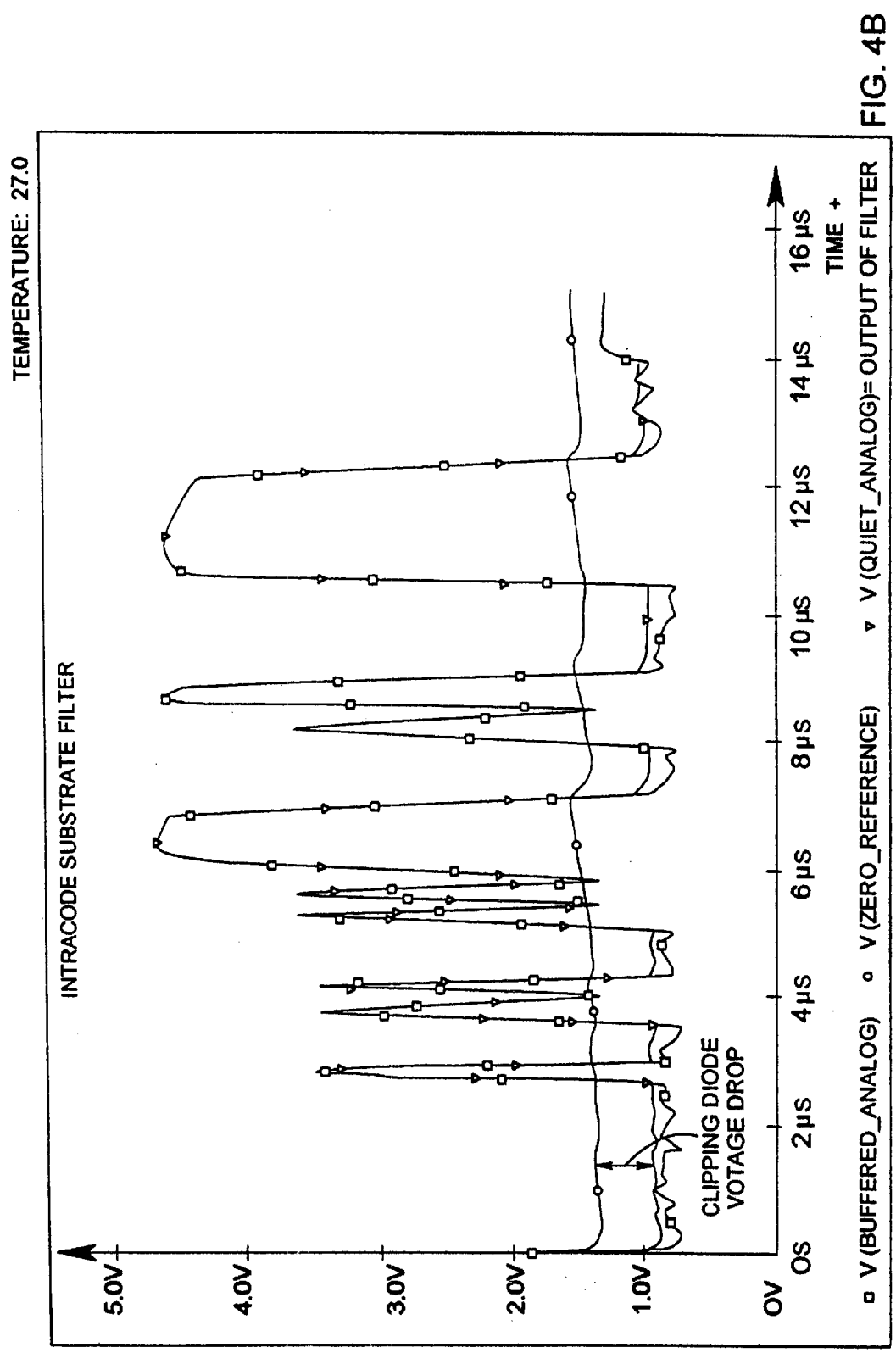
FIG. 4B is a graphical diagram of an analog scan data signal provided as input to the time domain substrate noise filtering circuit shown in FIG. 4A, a zero-reference signal generated within the circuit, and the time-domain filtered analog scan data signal produced as output from the time-domain substrate noise filtering circuit.

Analog Scan Data Signal Processor Of The Illustrative Embodiment Of The Present Invention As shown in FIGS. 4-1 and 4-2, each scan data signal processor (25A through 25D) is similar in structure and function, and comprises a number of subcomponents, namely: a timedomain substrate noise filtering circuit 40, described in greater detail in FIGS. 4A and 4B; a first derivative signal generation circuit 41 having scan-range controlled first derivative signal passband filters and amplifiers integrated therewith, described in greater detail in FIGS. 4C1 through 4C7; a second derivative signal generation circuit 42 having scan-range controlled second derivative signal pass-band filters and amplifiers integrated therewith, and described in greater detail in FIGS. 4D1A through 4D7; a first derivative signal threshold-level generation circuit 43 for generating upper and lower first derivative signal; a binary-type A/D signal conversion circuit 44; and a bar code element detection circuit 45. The structure and function of each of these processor subcomponents will be described in greater detail hereinbelow with reference to the first laser scanning station 4A, denoted by the letter A.

Non-Linear Time-Domain Substrate Noise Filtering Circuit

As shown in FIG. 4A, the non-linear time-domain substrate noise filter 40 comprises, a number of subcomponents, namely: a linear voltage preamplifier 46; a zero-reference signal generator 47, realized as peak detection; a clipping diode 48; a high-output impedance amplifier (i.e. buffer) 49; and a buffer amplifier 50. As shown in FIG. 4A, the output of the voltage amplifier 46 is provided to the input of both the zero reference level generator 47 and the highimpedance amplifier 49. The output of the zero reference level generator 47 is provided to one terminal of the clipping diode 48, whereas the output of the high output impedance amplifier 50 is connected to the other terminal of the clipping diode, as shown. The input of the output buffer amplifier 50 is connected to the output of the high-output impedance amplifier 49, whereas the output of the buffer amplifier 50 provides "quiet" output version of the analog scan data signal.

The function of the voltage preamplifer 46 is to increase the voltage separation between the two levels of the input analog scan data signal corresponding to the bars and spaces of the bar code symbol. This is done in order to provide finer clipping action given the fixed voltage drop across the diode when it is forward biased. The zero reference generator and the high output impedance buffer each receive this amplified analog scan data signal. When the zero reference voltage level is at a voltage corresponding to a space element in a bar code symbol, it is greater than the output of the impedance-matching buffer plus the forward bias voltage drop of the clipping diode 48, and the clipping diode 48 is forward biased causing the input to the buffer amplifier 50 to be equal to the zero reference voltage minus the voltage drop across the forward biased clipping diode 48. When the analog scan data signal is at a voltage level corresponding to a bar element, then the analog scan data voltage level is transferred through the high output impedance amplifier 49 to the output terminal of the buffer amplifier 50. The operation of the time-domain based substrate noise filter 40 is shown by the graphical plots set forth in FIG. 4B.

Notably, the nonlinear operation of the substrate noise filter 40 described above tends to smooth or otherwise filter out substrate noise in the analog scan data signal during signal levels corresponding to scanning of substrates and bar code spaces realized on the substrate. However, the time-domain operation of the substrate noise filter 40 does not attempt to filter out the substrate noise during signal levels corresponding to scanning of code symbol bar elements. Thus, the time-domain substrate noise filter 40 performs, in essence, a multiplication operation on the analog scan data (i.e. the analog scan data signal is multiplied by zero during substraterelated signal levels and unity during bar element related signal levels). The form of the multiplication function is a digital signal having transitions that correspond approximately with the signal level transitions in the analog scan data signal. Consequently, in accordance with Fourier Analysis, the frequency spectra of the analog scan data signal is mathematically 1 convoluted with the Fourier transform of this digital function, thereby smoothing out the spectral peaks associated with the substrate noise, and thus smoothing out the first time derivative of the analog scan data signal. Thus, the time-domain substrate noise filter 40 operates to prepare the analog scan data signal in such a way that its first time derivative dSI(t)/dt, once generated in the first derivative signal generation circuit 41, will have less random fluctuations therein due to the absence of sharp peaks in the power spectra of the underlying substrate noise signal, thereby contributing to an overall improvement in performance of the scan data signal processor of the present invention.

The First Derivative Signal Generation Circuit Having Scan-Range Controlled Pass Band Filters And Amplifiers Integrated Therewith As shown in FIGS. 4C1 and 4C1A, the first derivative signal generation circuit 41 of the illustrative embodiment comprises two channels, A and B, corresponding to the Near Scan Range and Far Scan Range of the laser scanning system. Along channel A of the first derivative signal generation circuit 41, a number of subcomponents are arranged in a serial manner, namely: a signal differentiator circuit 50A and a first derivative signal low-pass filter (LPF) circuit 52A cooperating to provide a first derivative signal pass-band filter structure 53A; and a first derivative signal pass-band amplifier 54A tuned to operate like a low pass filter (LPF) in order to prevent the $R_3C_2$ element from operating as a second signal differentiator circuit within the first derivative signal generation circuit 41; and an analog switch 55A, realized as a FET, for commuting the output of the pass-band amplifier 53A to the output terminal 56 of the first derivative signal generation circuit 41, in response to the generation of an enable signal ENABLE A produced by an analog switch controller circuit 57 which receives as its input signal, a variable pass-band (VPB) control signal 58 generated by the microprocessor 26A shown in FIG. 3A1, described in detail hereinabove. Likewise, along channel B of the first derivative signal generation circuit 41, a number of subcomponents are arranged in a serial number, namely: a signal differentiator circuit 51B and a low-pass filter (LPF) circuit 52B cooperating to provide a first derivative signal pass-band filter structure 53B; and a first derivative signal pass-band amplifier 54B tuned to operate like a low pass filter (LPF) in order to prevent the $R_3C_2$ element derivative signal generation circuit 41; and an analog switch 55B, realized as a FET, for commuting the output of the pass-band amplifier 54B to the output terminal of the first derivative signal generation circuit 41, in response to the generation of an enable signal ENABLE B produced by the analog switch controller circuit 57 described hereinabove.

In FIG. 4C2, the magnitude of the frequency response characteristics of the first derivative signal pass-band filter structure 53A are graphically represented. The bandwidth of the first derivative signal pass-band filter structure 53A and the control signal levels for enabling and disabling the same during system operation are set forth in the table of FIG. 4C3. Formulas for computing the upper and lower cutoff frequencies $f_{LA}$, $f_{UA}$ and $f_{LB}$, $f_{UB}$, characteristic of the first derivative signal pass-band filter structure 53A are set forth in the table of FIG. 4C4.

In FIG. 4C5, the magnitude of the frequency response characteristics of the first derivative signal pass-band amplifier structure 54A are graphically represented. The bandwidth of the first derivative signal pass-band amplifier 54A and the control signal levels for enabling and disabling the same during system operation are set forth in the table of FIG. 4C6. Formulas for computing the upper and lower cutoff frequencies $f_{LA}$, $f_{UA}$ and $f_{LB}$, $f_{UB}$, characteristic of the first derivative signal pass-band amplifier 54A are set forth in the table of FIG. 4C7. In general, these cut-off frequencies can be determined using the techniques described above while recognizing that the pass-band amplifiers 54A and 54B cannot function as differentiators.

Notably, in the illustrative embodiment of the present invention, the approximation formulas set forth in the tables of FIGS. 4C3 and 4C6 for computation of the corner cut-off frequencies of the pass-band filter structure 53A and amplifier 54A have been formulated through careful recognition of three interrelated facts of physics, namely: (1) that the spot speed of the laser scanning beam is increased at focal planes or over focal zones disposed at increased distances from the laser scanner; (2) that the analog scan data signal corresponding to the spatial structure of a code symbol element is time-compressed as the code symbol element is scanned at a distance further away from the laser beam scanning mechanism (e.g. holographic scanning disc); and (3) that time-compression of a signal (such as the analog scan data signal) along the time domain results in expansion of the frequency spectra of the corresponding time-domain signal on the frequency domain, based on the principle of Fourier Analysis that a multiplication operation on the time-domain results in a convolution operation on the frequency-domain, and that a convolution operation on the time-domain results in a multiplication operation on the frequency-domain.

As a result of this increased laser spot speed phenomenon, the frequency spectra of analog scan data signals produced during the scanning of bar code symbols is shifted in the direction of increased frequency for code symbols in focal zones disposed greater distances away from the laser scanning system, than for code symbols in focal zones disposed closer to the laser scanning system. Also, the power spectral distribution of paper noise produced from substrates 151 is shifted in the direction of increased frequency for substrates scanned in focal zones disposed greater distances away from the laser scanning system, than for substrates in focal zones disposed closer to the laser scanning system.

Thus, when scanning bar code symbols in the near focal zones of the system (i.e. FZ1 and FZ2), the spectral components of paper noise residing in the frequency bands associated with the farther out focal zones (i.e. FZ3, FZ4 and FZ5) are greatly amplified during the first stage of signal differentiation and would otherwise be added to the spectral components of the analog scan data signal if not filtered out in an appropriate manner. Thus, to prevent such spectral noise components from degrading the first time derivative of the analog scan data signal produced by scanning a bar code symbol within the Near Scan Range, the microprocessor 26A in FIG. 3A1 generates a "low" VPB controller input level, as indicated in FIG. 4C3, so as to cause the VPB controller 57 to generate an ENABLE A signal therefrom. In turn, this enables the first analog switch 55A to commute the output signal from amplifier 54A to the output terminal of the analog switch circuit 56, and thus enabling channel A of the first derivative signal generation circuit 41 which corresponds to the Near Scan Range of the laser scanning system. Then when a bar code symbol is scanned within the Far Scan Range, the microprocessor 26A in FIG. 3A1 generates a "high" VPB controller input level, as indicated in FIG. 4C3, so as to cause the VPB controller 57 to generate an ENABLE B signal therefrom. In turn, this enables the second analog switch 55B to commute the output signal from amplifier 54B to the output terminal of the analog switch circuit 55, and thus enabling channel B of the first derivative signal generation circuit 41 which corresponds to the Far Scan Range of the laser scanning system.

The Second Derivative Signal Generation Circuit With Integrated Focal-Zone Controlled Pass Band Filters And Amplifiers As shown in FIGS. 4D1A and 4D1B, the second derivative signal generation circuit 42 of the illustrative embodiment, like the first derivative signal generation circuit 41, comprises two channels, A and B, corresponding to the Near Scan Range and Far Scan Range of the laser scanning system. Along channel A of the second derivative signal generation circuit 42, a number of subcomponents are arranged in a serial manner, namely: a signal differentiator circuit 61A and a low-pass filter circuit 62A cooperating to provide a second pass-band filter structure 63A; and a pass-band amplifier 64A tuned to operate like a low pass filter (LPF) in order to prevent the $R_3C_2$ element from operating as a third signal differentiator circuit within the second derivative signal generation circuit 42; and an analog switch 65A, realized as a FET, for commuting the output of the pass-band filter 64A to the output terminal of the second derivative signal generation circuit 42, in response to the generation of an enable signal ENABLE A produced by an analog switch controller circuit 67 which receives as its input signal, a variable pass-band (VPB) control signal 68 generated by the microprocessor 26A shown in FIG. 3A1, described in detail hereinabove. Likewise, along channel B of the second derivative signal generation circuit 42, a number of subcomponents are arranged in a serial manner, namely: a signal differentiator circuit 61B and a low-pass filter circuit 62B cooperating to provide a second pass-band filter structure 63B; and a pass-band amplifier 64B tuned to operate like a low pass filter (LPF) in order to prevent the $R_3C_2$ element employed therein from operating as a third signal differentiator circuit within the second derivative signal generation circuit 42; and an analog switch 65B, realized as a FET, for commuting the output of the pass-band filter 64B to the output terminal 60 of the second derivative signal generation circuit 42, in response to the generation of an enable signal ENABLE B produced by the analog switch controller circuit described hereinabove. In FIG. 4D2, the magnitude of the frequency response characteristics of the second derivative signal pass-band filter structure 63A are graphically represented. The bandwidth of the second derivative signal pass-band filter structure 63A and the control signal levels for enabling and disabling the same during system operation are set forth in the table of FIG. 4D3. Formulas for computing the upper and lower cutoff frequencies $f^{LA}$, $f_{UA}$ and $f_{LB}$, $f_{UB}$, characteristic of the second derivative signal pass-band filter structure 63A are set forth in the table of FIG. 4D4.

In FIG. 4D5, the magnitude of the frequency response characteristics of the second derivative signal pass-band amplifier structure 63A are graphically represented. The bandwidth of the second derivative signal pass-band amplifier 64B and the control signal levels for enabling and disabling the same during system operation are set forth in the table of FIG. 4D6. Formulas for computing the upper and lower cutoff frequencies $f_{LA}$, $f_{UA}$ and $f_{LB}$, $f_{UB}$, characteristic of the second derivative signal pass-band amplifier 64B are set forth in the table of FIG. 4D7. In general, these cut-off frequencies can be determined using the techniques described above while recognizing that the second-derivative signal pass-band amplifiers 64A and 64B cannot function as a differentiators.

When scanning bar code symbols in the near focal zones of the system (i.e. FZ1 and FZ2), the spectral components of paper noise residing in the frequency bands associated with the farther out focal zones (i.e. FZ3, FZ4 and FZ5) are greatly amplified during first stage of differentiation and would otherwise be added to the spectral components of the analog scan data signal if not filtered out in an appropriate manner. Thus, to prevent such spectral noise components from degrading the second time derivative of the analog scan data signal produced when scanning a bar code symbol within the Near Scan Range, the microprocessor 26A in FIG. 3A1 generates a "low" VPB controller input level, as indicated in FIG. 4D3, so as to cause the VPB controller 67 to generate an ENABLE A signal therefrom. In turn, this enables the first analog switch 65A to commute the output signal from amplifier 64A to the output terminal of the analog switch circuit 65A, and thus enabling channel A of the second derivative signal generation circuit 42 which corresponds to the Near Scan Range of the laser scanning system. Then when a bar code symbol is scanned within the Far Scan Range, the microprocessor 26A in FIG. 3A1 generates a "high" VPB controller input level, as indicated in FIG. 4D3, so as to cause the VPB controller 67 to generate an ENABLE B signal therefrom. In turn, this enables the second analog switch 65B to commute the output signal from amplifier 64B to the output terminal 66 of the analog switch circuit 65, and thus enabling channel B of the second derivative signal generation circuit 42 which corresponds to the Far Scan Range of the laser scanning system.

Notably, the approximation formulas disclosed herein for determining the upper and lower cut-off frequencies of the first and second derivative signal pass-band filters 53A, 53B and 63A, 63B are first-order approximation formulas based on a mathematical model of the laser beam scanning process and assumptions about the spatial structure of bar code symbols, wherein (i) a bar code symbol of finite length (having minimum and maximum bar code element widths of $W_{min}$ and $W_{max}$, respectively) is scanned by (ii) a laser beam having a Gaussian beam width (measured at its $1/e^e$ intensity points) and a beam spot velocity ($v_b$) relative to the bar code symbol; (iii) laser light rays reflected off the scanned bar code symbol are collected by a light focusing system having a predetermined focal distance; and (iv) the focused laser light rays are detected with a photodetector located at the predetermined focal distance from the light focusing system. In accordance with this process model, an arbitrary bar code symbol (having minimum and maximum width elementis scanned by a Gaussian laser beam moving at a beam spots) speed ($v_b$) and canbe represented by a convolution integral function carried out on the spatial domain, wherein the weighing (i.e. modulation) of the laser beam intensity and the focusing of the reflected/scattered laser light rays onto the photodetector is given by the modulation transfer function (MTF) of the laser scanning system as described above which, for purposes of the present invention, shall be expressed in terms of the variable time (t), rather than the spatial dimension (x), using the intermediate variable beam spot speed $v_b$. Thus, the MTF as defined above is equivalent in form to the analog scan data signal produced from the photodetector of the system.

Having constructed a process model along the lines described above, a number of different techniques can be then employed to determine acceptable values for the upper and lower cut-off frequencies for the pass-band filters used in the scan data signal processor of the present invention. Several different techniques which can be used will be described hereinbelow.

In accordance with a first technique, based on numerical analysis, mathematical techniques such as the Discrete Fourier Transform (DFT) can be used to compute a discrete frequency spectrum representation from a discrete representation of the MTF. According to this proposed method of analysis, DFTs are computed for the first time derivative of a plurality of MTFs which correspond to a plurality of laser-scanned bar code symbols of varying code structure and resolution. Thereafter, the spectral power distributions of these first derivative functions can be carefully analyzed to arrive at upper and lower cut-off frequencies for first derivative signal pass-band filters 53A and 53B. When the cut-off frequencies are optimally selected, the first derivative signal pass-band filters 53A and 53B will optimally reject the spectral components associated with thermal and substrate noise within the system, while passing with minimal attenuation the balance of power in the spectral components of the first derivative signal. The selection of pass-band cut-off frequencies in this manner will allow the use of lower first derivative signal threshold level values during the first derivative signal peak detection stage of the scan data signal processor hereof, thereby increasing the dynamic range and SNR within this stage of the scan data signal processor, and thus improving the performance of the A/D signal conversion therewithin.

Thereafter, DFTs are computed for the second time derivative of the same plurality of MTFs which correspond to the plurality of laser-scanned bar code symbols of varying code structure and resolution. Then, the spectral power distributions of these second derivative functions can be carefully analyzed to arrive at upper and lower cut-off frequencies for second derivative signal pass-band filters 63A and 63B: When the cut-off frequencies are optimally selected, the second derivative signal pass-band filters 63A and 63B will optimally reject the spectral components associated with thermal and substrate noise within the system, while passing with minimal attenuation the balance of power in the spectral components of the second derivative signal. The selection of pass-band cut-off frequencies in this manner will ensure that second-derivative signal zero-crossing detection is carried out at a maximum SNR value, thus improving the performance of the A/D signal conversion within the scan data signal processor hereof. In accordance with a second technique, based on analytical methods, a mathematical expression can be derived for the MTF of a generalized bar code symbol having minimum and maximum bar code element widths. The MTF would be expressed as multi-variable function dependent on the various process variables including time (t) identified hereinabove. Having obtained a mathematical expression for the MTF, the first time derivative of this MTF can be derived (i.e. computed) to provide a first multi-variable function which is representative of the first time derivative of the analog scan data signal detected at the photodetector of the laser scanning system. Thereafter, the second time derivative of the MTF is derived to provide a second multi-variable function which is representative of the second derivative of the analog scan data signal detected at the photodetector of the laser scanning system.

The next step in the analytical method involves deriving (i.e. computing) the Fourier Transforms of the first and second time derivative functions of the MTF, expressed as multivariable functions dependent on the various process variables including frequency (f) identified hereinabove. The resulting Fourier Transforms provide a representation of the spectral components underlying the time-domain reconstitution of the first and second time derivatives of the MTF (i.e. photodetected analog scan data signal). However, it will be helpful to remember that the MTF has been derived by convolving a Gaussian laser beam with a bar code symbol of infinite length having minimum and maximum element widths.

Assigning assumed values to the various process parameters in the process model (including the beam spot speed in the focal plane or scanning distance of interest, the minimum and maximum bar code element widths, etc.), one can obtain the Fourier Transforms for the first and second time derivatives for the MTF expressed solely as a function of frequency (f). Thereafter, the power spectral density (PSD) functions can be derived for both the Fourier Transform of the first time derivative of the MTF, as well as the Fourier Transform of the second time derivative of the MTF. The PSD function for the first time derivative of the MTF, expressed as a function of frequency (f), represents the average power per unit bandwidth (in hertz) in the first time derivative of the analog scan data signal detected at the photodetector. The PSD function for the second time derivative of the MTF, expressed as a function of frequency (f), represents the average power per unit bandwidth (in hertz) in the second time derivative of the analog scan data signal detected at the photodetector. Then, using well known mathematical techniques, one can determine which band of frequencies (delimited by lower and upper cut-off frequencies $f_L$ and $f_L$, respectively) contain a predetermined percentage (e.g. 90%) of the total normalized power (i.e. 100%) contained in the first time derivative of the MTF to yield optimal lower and upper cut-off frequencies for the first derivative signal pass-band filter assigned to the assumed focal plane or scanning distance in the system. Thereafter, using the same mathematical techniques, one can determine which band of frequencies (delimited by lower and upper cut-off frequencies $f_L$ and $f_U$, respectively) contain a predetermined percentage (e.g. 90%) of the total normalized power (i.e. 100%) contained in the second time derivative of the MTF to yield optimal lower and upper cut-off frequencies for the second derivative signal pass-band filter assigned to the assumed focal plane or scanning distance in the system. The above method can be repeated for each focal plane or scanning distance in the system in order to provide the lower and upper cut-off frequencies of the pass-band filters to be employed in each channel of the scan data signal processor, that has been preassigned to handle signals derived from particular focal planes, zones, regions or scanning distances in the laser scanning system under design.

In accordance with a third technique, one may determine suitable lower and upper cut-off frequencies for each focal-zone/scan-range controlled pass-band filter structure of the present invention, using Discrete Fourier Transforms and related methods. According to this technique, the multi-variable MTF is evaluated by fixing all parameters, except frequency (f), using assumed values for the process parameters. Notably, the beam spot speed parameter should be fixed to the value associated with the focal plane/zone or scanning range assigned to the pass band filter under design. Then, the first and second time derivatives are computed for the discrete-time representation of the MTF so as to provide a first discrete-time derivative of the MTF and a second-discrete-time derivative of the MTF. Thereafter, using well known sampling techniques, the Discrete Fourier Transform (DFT) can be computed for the computed first and second discrete-time derivatives of the MTF. Then, using well known mathematical techniques, one can determine which band of frequencies (delimited by lower and upper cut-off frequencies $f_L$ and $f_U$, respectively) contain a predetermined percentage (e.g. $_{90}$%) of the total normalized power (i.e.

$_{100}\%$) contained in the first discrete-time derivative of the MTF to yield optimal lower and upper cut-off frequencies for the first derivative signal pass-band filter assigned to the assumed focal plane or scan range in the system. Thereafter, using the same mathematical techniques, one can determine which band of frequencies (delimited by lower and upper cut-off frequencies $f_L$ and $f_U$, respectively) contain a predetermined percentage (e.g. $_{90}\%$) of the total normalized power (i.e. 100%) contained in the second discrete-time derivative of the MTF to yield optimal lower and upper cut-off frequencies for the second derivative signal pass-band filter assigned to the assumed focal plane or scanning distance in the system. The above method can be repeated for each focal plane or scanning range in the system in order to provide the lowers and upper cut-off frequencies of the pass-band filters to be employed in each channel of the scan data signal processor, that has been preassigned to handle signals derived from particular focal planes, zones, regions or scanning distances in the laser scanning system under design.

In accordance with a fourth technique, one may derive approximation formulas for computing suitable, although not necessarily optimal, values for the lower and upper cut-off frequencies for each focal-zone/scan-range controlled pass-band filter structure in the scan data signal processor of the present invention. This alternative method, while not mathematically rigorous in comparison with the other filter design methods detailed above, requires a deep understanding of the interaction and functional-dependence (on both the time/space and frequency domains) between the various parameters employed in the process model described hereinabove. When using this method, it is possible to arrive at approximation formulas for the upper and lower cut-off frequencies for the first and second derivative signal pass-band filters 53A, 53B and 63A, 63B, respectively, expressed in terms of process parameters, for example: beam spot speed $v_b$; the minimum bar code element widths $W_{min}$; and maximum bar code element width $W_{max}$. Notably, the approximation formulas set forth in the figure drawings hereof have provided marked improvements in dynamic range and SNR in first derivative signal processing, as well as marked improvements in SNR in second derivative signal zero-crossing detection, thereby providing a significant improvement in overall system performance, as reflected in the graphs of FIGS. 5A through 5C. When using this approach, the filter designer must understand a number of basic concepts which operate between the time domain and frequency domain such as, for example: that a convolution operation between two functions on the time-domain or spatial-domain, results in a multiplication operation on the frequency-domain between the Fourier Transforms of those time or spatial domain functions; that a multiplication operation between two functions on the time-domain or spatial-domain, results in a convolution operation on the frequency-domain between the Fourier Transforms of those time or spatial domain functions; that increasing the beam spot speed of the laser beam results in time compression of the photodetected analog scan data signal; that decreasing the width of a bar code element causes a positive shift in frequency of the first and subsequent spectral components in its component frequency spectrum; that increasing the width of a bar code element causes a negative shift in frequency of the first and subsequent spectral components in its component frequency spectrum; that increasing the beam spot speed during laser scanning a bar code symbol structure results in time compression of the resulting analog scan data signal and thus in an expansion (or positive shift) in the frequency spectrum thereof; that decreasing the beam spot speed during laser scanning a bar code symbol structure results in time expansion of the resulting analog scan data signal and thus in a compression (or negative shift) in the frequency spectrum thereof; that a decrease in beam spot size during laser scanning operations results in an expansion of the frequency spectrum of the resulting analog scan data signal; and that an increase in beam spot size during laser scanning operations results in a compression of the frequency spectrum of the resulting analog scan data signal. Using these principles, the filter designer can synthesize approximation formulas for the pass-band filter structures which can be refined through empirical measurement and time and frequency domain analysis of the first and second time derivative signals pass therethrough, and other forms of undue experimentation.

Regardless of which filter design method is employed, when the cut-off frequencies are optimally selected, the first derivative signal pass-band filters 53A and 53B will optimally reject the spectral components associated with thermal and substrate noise within the system, while passing with minimal attenuation, the balance of power in the spectral components of the first derivative signal. The selection of pass-band cut-off frequencies in accordance with the present invention will ensure that first-derivative peak detection is carried out with maximum dynamic range and maximum SNR, thus improving the performance of the A/D signal conversion within the scan data signal processor hereof.

Similarly, when the cut-off frequencies are optimally selected, the second derivative signal pass-band filters 63A and 63B will optimally reject the spectral components associated with thermal and substrate noise within the system, while passing with minimal attenuation the balance of power in the spectral components of the second derivative signal. The selection of pass-band cut-off frequencies in this manner will ensure that second-derivative signal zero crossing detection is carried out at maximum SNR, thus improving the performance of the A/D signal conversion within the scan data signal processor hereof.

The filter design methods described above can also be used to determine the upper and lower cut-off frequencies for the pass-band amplifiers and preamplifiers employed in the scan data signal processor of the present invention.

First Derivative Signal Threshold Level Generation Circuits

Figure 4E:
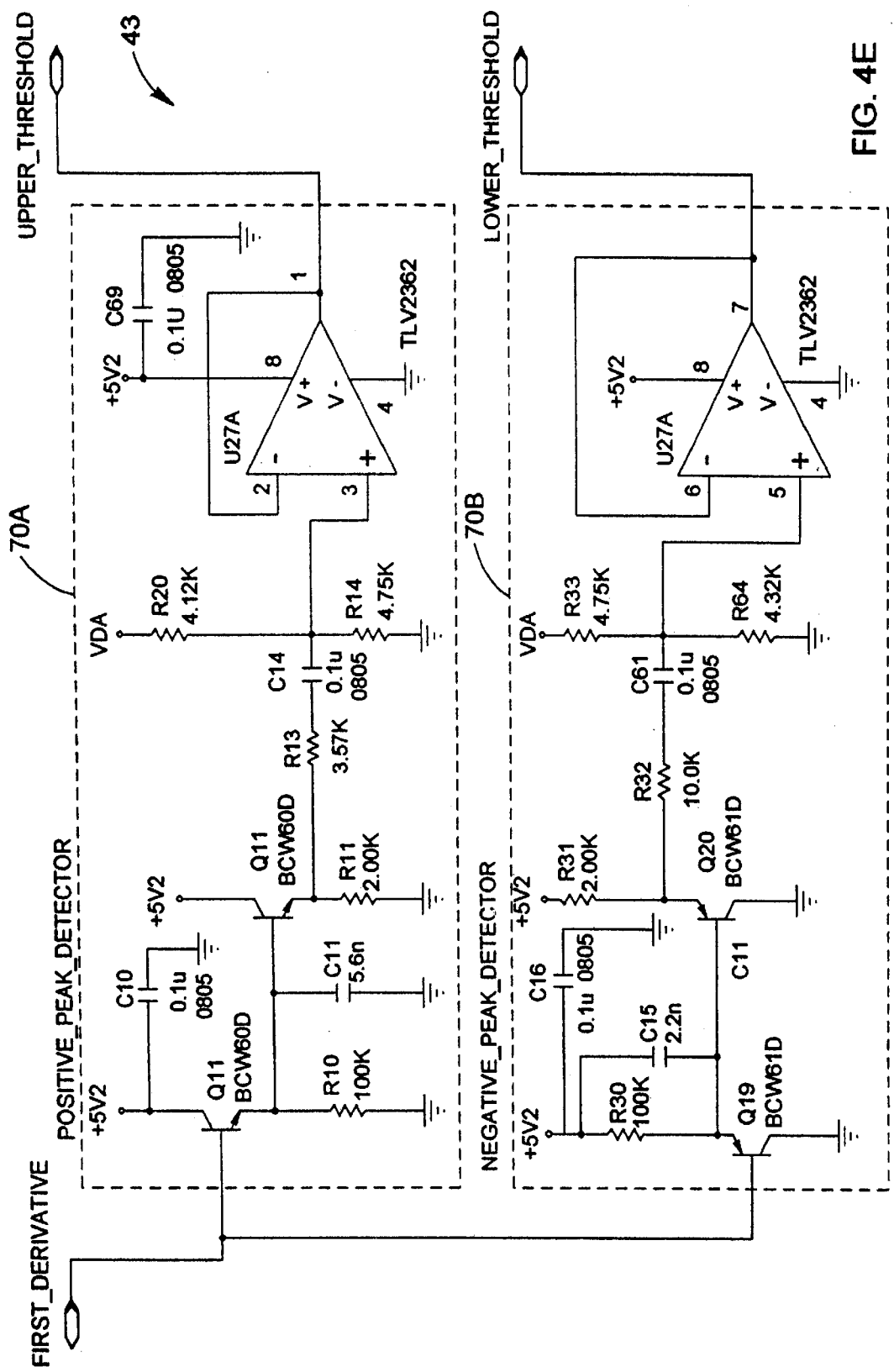
FIG. 4E is a detailed schematic diagram of the pair of first derivative signal threshold level circuits employed within the scan data signal processor of FIGS. 4-1 and 4-2, for generating upper and lower threshold levels used to determine when the first derivative signal has attained its peak positive and negative values during the signal processing method of the present invention.

As shown in FIG. 4E, first derivative signal threshold level circuit 43 is realized as a pair of positive and negative peak detection circuits 70A and 70B, respectively. As shown, the first time derivative of the analog scan data signal, denoted by S'(t)=d[S(t)]dt, is provided to both the positive and negative peak detection circuits 70A and 70B. The positive peak detection circuit 70A generates the upper threshold level (UPPER_THRESHOLD) for use when detecting "positive peaks" in the first derivative signal using a first comparator in the A/D signal conversion circuit 44. The negative peak detection circuit 70B generates the lower threshold level (LOWER_THRESHOLD) for use when detecting "negative peaks" in the first derivative signal using a second comparator in the A/D signal conversion circuit 44.

Binary A/D Signal Conversion Circuit

As shown in FIGS. 4F and 4F1, the binary (i.e. one-bit) AID signal conversion circuit 44 comprises a number of subcomponents, namely: a second derivative zero-crossing detector 70; a second derivative zero-crossing gating circuit 71; and a digital output signal generation circuit 72.

As shown, the second derivative zero-crossing detector 70 comprises: a comparator circuit 73, realized by an operational amplifier, and being enabled and disabled by the digital output signal generated by the bar code element detector 45; and a high-input/low-output impedance amplifier with unity gain (i.e. buffer) 74 connected to the comparator circuit 73 so as to prevent the bar code element detector 45 from loading the reference voltage $V_{ref}$ as detection of second derivative signal zero-crossings is enabled or disabled by the bar code element detector during scanner operation. The function of the comparator circuit 73 is to compare (i) the second derivative signal $S''(t)=d^2[S(t)]/dt^2$ produced from the second derivative generation circuit with (ii) a zero voltage reference (i.e. the AC ground level) in order to detect the occurrence of each zero-crossing in the second derivative signal.

Notably, in the absence of noise, the occurrence of each second derivative zero-crossing indicates that the first derivative signal is undergoing a (positive or negative) peak which corresponds to the point in the analog scan data signal where a signal level transition has occurred. However, in the real-world, noise is notorious for producing false zero-crossing detections within the second derivative zero-crossing detection circuit 70 described above. To reduce the number of "falsely detected" zero-crossings produced by noise, the second derivative zero-crossing gating circuit 71 is provided. As shown in FIGS. 4F and 4F1, this circuit is realized using a pair of analog comparator circuits 75A and 75B. The function of the second derivative zero-crossing gating circuit 71 is to gate the digital output signal generating circuit 72, only detected second derivative zero-crossings which occur between alternating positive and negative peaks detected in the first derivative signal by the analog comparators 75A and 75B.

As shown in FIGS. 4F and 4F1, the digital output signal generating circuit 72 is realized by four NAND gates 76A through 76D configured as a set/reset latch circuit. As shown, the output of the analog comparators 75A and 75B are connected to the first input terminals of NAND gates 76A and 76B. the second input terminal of NAND gate 76C and the output terminal of NAND gate 76D are tied together to provide the digital scan data output signal $D_2$, corresponding to the analog scan data signal $D_1$ provided as input to the scan data signal 151 processor of the present invention. The basic principles described in detail above are used by the A/D signal conversion circuit 44 to determine when to produce a high or low output signal level in the digital scan data signal $D_2$ generated therefrom during scanner operation.

Bar Code Element Detection Circuit

Figure 4G:
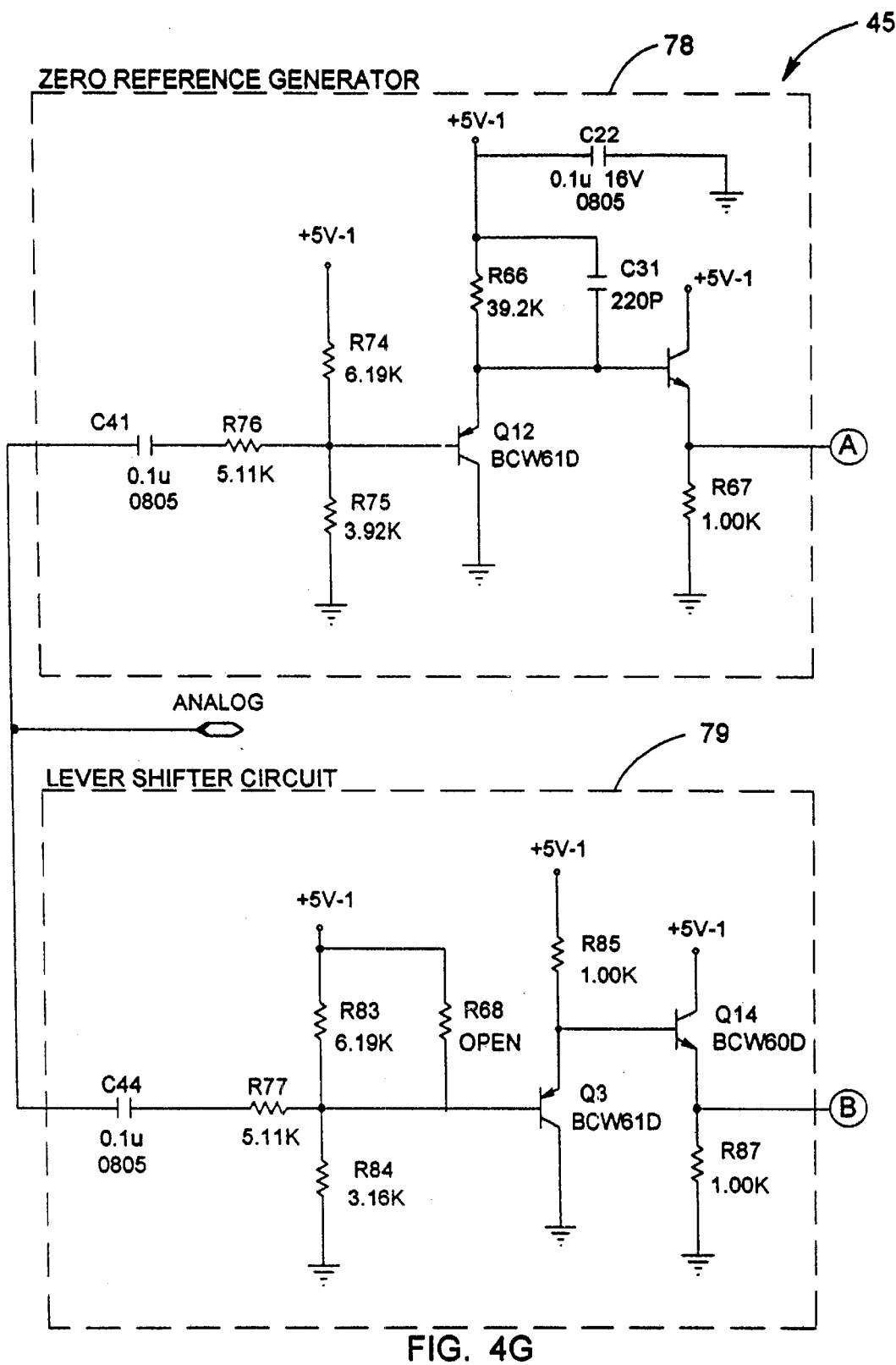

As shown in FIGS. 4G and 4G1, the bar code element detector 45 comprises: a zero-reference signal generation circuit 78; a level shifting (i.e. biasing) circuit 79; an analog comparator circuit 80; and a zero-crossing enable signal generation circuit 81. In a bar code, logical zero would represent the spaces and the white areas preceding each bar code element (e.g. bar). The electrical level corresponding to the logical zero level is what the logical zero reference generator 78 seeks to find in a continuous manner. Thus the function of this circuit is to determine the electrical analog equivalent of the paper/substrate which forms a base line for reference with the output of the level shifting circuit 79.

As shown, the analog scan data signal $S_1(t)$ is provided to both the zero-reference level generation circuit 78 as well as to the level shifter circuit 79. The level shifting circuit 79 (e.g. realized as a summing amplifier) merely adds a DC bias level to the original analog scan data signal for the purpose of offsetting it slightly so that the analog signal is then offset with respect to the logical zero reference and thus the zero reference is a slightly away from zero towards logical one. The zero-reference voltage level provided as output from circuit 78 is provided as one input to the digital comparator 80. Notably, the zero-reference level generation circuit 78 is substantially the same the one used in the substrate noise filter 40 described above. The zero reference signal produced by this circuit is provided to one input of the comparator circuit 80. A graphical representation of these two signals is shown in FIG. 4H2. In this example, the signal is produced in response to detection of the bar code elements shown in FIG. 4H1. As shown in FIG. 4H3, the output of the level shifter circuit 79 is provided as the second input to the comparator circuit 80. The output of the comparator circuit 80 is provided as input to the zero-crossing enable signal generation circuit 81 which is realized as a missing pulse detector. The output of the comparator circuit 80 is a series of pulses which are somewhat representative of the bar code elements which appear on the analog signal. The comparator output pulse train is fed into the input of the missing pulse detector 81 which is inactive on its output when there are no pulses on the analog scan data signal. As shown in FIG. 4H4, as soon as a pulse appears on the analog scan data signal input, the output of the missing pulse detector 81 goes active (i.e. it changes states from, for example, low to high). In this example, the state of the missing pulse detector 81 would stay high as long as there are pulses present on the analog scan data signal input. There is a certain time delay T built into the missing pulse detector 81, set by its time constant described below, which determines the amount of time between the end of the pulse train and the time that the missing pulse detector 81 outputs changes in state from active to inactive, or in this example, from high to low. In the illustrative embodiment shown in FIGS. 4G and 4G1, the time constant of the missing pulse detector 81 is equal to $T=(0.27)(Rs_8C_{45})$ In practice, the time constant value of the missing pulse detector 81 is set to a value greater than the time duration of the widest bar code element being scanned at the slowest beam speed in the first focal zone (FZ1) of the laser scanning system.

During operation, the missing pulse detector 81 has a low output as long as the input is a logic 1. As soon as there is a transition from high to low on the input of the missing pulse detector, the output immediately switches states from low to high and holds that state as long as there are transitions on the input signal within the time period described above. When the missing pulse detector detects that there have been no transitions for that specified time period, its output will change states from high to low and it will wait for another transition on its input.

The output of the missing pulse detector 81 controls (i.e. enables or disables) the second derivative zero-crossing detection circuit 73 via the zero-crossing enable signal. In particular, the missing pulse detector 81 enables the second derivative zero-crossing detector 73 by moving the second derivative zero reference up to analog ground (e.g. 2.0 volts), and disables its operation by moving the second derivative zero reference down to earth ground (e.g. 0 volts). Notably, the output of the missing pulse detector 81 is a TTL output and an open drain output is needed at the zero-crossing detector 73 so an inverter is used so that its output is fed into the input of a switching transistor (e.g. a field effect transistor) whose collector is then connected to the second derivative zero-crossing comparator 73 as a control signal ZERO-CROSSING_ENABLE.

Polygonal-Type Laser Scanning System Employing Dynamically-Adjusted Laser Beam Focusing Mechanism And Scan Data Signal Processor Of The Present Invention In FIGS. 6 and 6A, an alternative embodiment of the multi-focal zone laser scanning system 85 is shown. As shown in FIG. 6A, laser scanning system 85 comprises a number of subcomponents, namely: a system controller 86 (e.g. realized as a programmed microcontroller); a visible laser diode (or like device) 87 for generating a laser beam of sufficient power; a variable focus lens subsystem 88, realizable using movable optical components translated relative to each other in real-time manner in response to control signals produced by the system controller 86, so as to vary the focal distance of the laser beam at different focal planes (e.g. focal zones) within the system during laser scanning operations; a laser scanning mechanism 89, for scanning the variably focused laser beam along a predefined scanning pattern (e.g. X-bar pattern) during scanner operation; a photodetector 90 for detecting the intensity of laser light reflected off a scanned bar code symbol and producing an electrical analog scan data signal corresponding to the structure of the scanned bar code symbol; a preamplification circuit 24 for preamplifying the analog scan data signal produced by the photodetector 90; a scan data signal processor 25 as shown, for example, in FIGS. 4-1 and 4-2, for processing the preamplified analog scan data signal $D_1$ and generating a digital scan data signal $D_2$ corresponding to the analog scan data signal provided as input thereto; a digitizer circuit 27 for producing digital words $D_3$ representative of the time duration of the first and second signal levels in the digital scan data signal $D_2$; a decode processor 26 for processing the digital words $D_3$ produced from the digitizer circuit 27 (e.g. using decode tables and bar code stitching techniques when using high-speed X-bar or like scanning patterns), so as to decode the digital scan data signal and produce symbol character data string representative of the corresponding laser-scanned bar code symbol; a realtime bar code element width measurement processor (e.g. programmed microprocessor) 91 for real-time measurement of the first and second binary signal levels occurring in the digital scan data signal $D_2$, as a bar code symbol is scanned at different focal planes (or zones) within the system, and real-time comparison with predetermined time duration measures stored in a Beam Spot Speed Look-Up Table 92 as shown in FIG. 6B (e.g. realized using EPROM or like memory structures), so as to determine the corresponding laser beam spot speed that would produce such measured time durations for a bar code symbol of a particular resolution, scanned at a particular focal plane in the system; and a pass-band filter control signal generator (e.g. programmed microprocessor) 93 for producing VPB control signals based on the determined beam spot speed of the laser scanning beam (at each particular instant in time), and providing such VPB control signals to the preamplification circuit 24, and the first and second derivative signal bandpass filters and amplifiers employed in scan data signal processor 25.

In general, the laser beam scanning mechanism 89 can be realized as either a holographic scanning mechanism similar to that used in the system of FIG. 1, a polygon-type scanning mechanism of the general type disclosed in U.S. Pat. No. 5,557,093, or other electromechanical or electro-acoustical scanning mechanism (e.g. based on Bragg or like cell structures) capable of scanning one or more focused laser beams within the scanning field of the system.

In FIG. 6A, an exemplary Beam Spot Speed Table 92 is shown for n-number of bar code symbol resolutions (i.e. specified by the predetermined minimum element width (x) in the bar code symbol), wherein a premeasured digital time-duration count for each minimum bar code element (x) is provided in the table according to scanning distance ($d_i$) away from the scanning mechanism. As shown, for each scanning distance $d_i$, there is a predetermined laser beam spot speed associated with the laser scanning system. For a given laser scanning system, a Beam Spot Speed Table is constructed by measuring the signal level durations of minimum bar code elements scanned at predetermined focal planes in the system, converting these time count measures to digital words (i.e. digital numbers), and recording these numbers in the column of a table, assigned to a particular bar code element width. During system operation, the bar code element width measurement processor 91 produces digital time counts (i.e. Numbers) which are compared with the digital time counts stored in the columns of the table of FIG. 6B. The output of this count comparison process is a corresponding beam spot speed value which would produce such a time count when a bar code symbol of a particular resolution is scanned at the corresponding scanning distance from. The VPB filter control signal generator 93 uses the produced beam spot speed (or like measure) to determine the appropriate VPB control signal so that the pass-band frequency characteristics are set for each preamplifier, filter and amplifier in the scan data signal processor in accordance with the principles of the present invention.

In an alternative embodiment, the variable focal lens subsystem 88 can be replaced with a fixed lens focusing system, adapted to focus a laser beam over a single predetermined focal region determined by the beam waist characteristics and maximum beam spot size requirements in the system.

Hand-Supportable Laser Scanning System Embodying The Scan Data Signal Processor Of The Present Invention In FIGS. 7 through 7B, an alternative embodiment of laser scanning system of the present invention 95 is shown having a hand-supportable housing which, in general, may have any one of many possible form factors. Examples of such form factors are disclosed in copending Application Ser. No. 09/071,512, incorporated herein by reference in its entirety.

As shown in FIG. 7A, laser scanning system 95 comprises a number of subcomponents, namely: a system controller 86 (e.g. realized as a programmed microcontroller); a visible laser diode (or like device) 87 for generating a laser beam of sufficient power; a fixed or variable focus lens subsystem 88' realizable using movable optical components translated relative to each other in real-time in response to control signals produced by the system controller 86, so as to vary the focal distance of the laser beam at different focal planes (e.g. focal zones) within the system during laser scanning operations; a laser scanning mechanism 89, for scanning the variably focused laser beam along a predefined scanning pattern (e.g. X-bar pattern) during scanner operation; a photodetector 90 for detecting the intensity of laser light reflected off a scanned bar code symbol and producing an electrical analog scan data signal corresponding to the structure of the scanned bar code symbol; a preamplification circuit 24 for preamplifying the analog scan data signal produced by the photodetector 90; a scan data signal processor 25 as shown, for example, in FIGS. 4-1 and 4-2, for processing the preamplified analog scan data signal $D_i$ and generating a digital scan data signal $D_2$ corresponding to the analog scan data signal provided as input thereto; a digitizer circuit 27 for producing digital words $D_3$ representative of the time duration of the first and second signal levels in the digital scan data signal $D_2$; a decode processor 26 for processing the digital words $D_3$ produced from the digitizer circuit 27 (e.g. using decode tables and bar code stitching techniques when using high-speed X-bar or like scanning patterns), so as to decode the digital scan data signal and produce symbol character data string representative of the corresponding laser-scanned bar code symbol; a real-time bar code element width measurement processor (e.g. programmed microprocessor) 91 for real-time measurement of the first and second binary signal levels occurring in the digital scan data signal $D_2$, as a bar code symbol is scanned at different focal planes (or zones) within the system, and real-time comparison with predetermined time duration measures stored in a Beam Spot Speed Look-Up Table 92' as shown in FIG. 7B (e.g. realized using EPROM or like memory structures), so as to determine the corresponding laser beam spot speed that would produce such measured time durations for a bar code symbol of a particular resolution, scanned at a particular focal plane in the system; and a pass-band filter control signal generator (e.g. programmed microprocessor) 93 for producing VPB control signals based on the determined beam spot speed of the laser scanning beam (at each particular instant in time), and providing such VPB control signals to the preamplification circuit 24, and the first and second derivative signal band-pass filters and amplifiers employed in scan data signal processor 25.

In general, the laser beam scanning mechanism 89 can be realized as either a holographic scanning mechanism similar to that used in the system of FIG. 1, a polygon-type scanning mechanism of the general type disclosed in U.S. Pat. No. 5,557,093, or other electromechanical or electro-acoustical scanning mechanism (e.g. based on Bragg or like cell structures) capable of scanning one or more focused laser beams within the scanning field of the system.

In FIG. 7B, an exemplary Beam Spot Speed Table 92' is shown for n-number of bar code symbol resolutions (i.e. specified by the predetermined minimum element width (x) in the bar code symbol), wherein a premeasured digital time-duration count for each minimum bar code element (x) is provided in the table according to scanning distance ($d_i$) away from the scanning mechanism. As shown, for each scanning distance $d_i$, there is a predetermined laser beam spot speed $v_i$ associated with the laser scanning system. For a given laser scanning system, a Beam Spot Speed Table is constructed by measuring the signal level durations of minimum bar code elements scanned at predetermined focal planes in the system, converting these time count measures to digital words (i.e. digital numbers), and recording these numbers in the column of a table, assigned to a particular bar code element width. During system operation, the bar code element width measurement processor 91 produces digital time counts (i.e. Numbers) which are compared with the digital time counts stored in the columns of the table of FIG. 7B. The output of this count comparison process is a corresponding beam spot speed value which would produce such a time count when a bar code symbol of a particular resolution is scanned at the corresponding scanning distance from. The VPB filter control signal generator 93 uses the produced beam spot speed (or like measure) to determine the appropriate VPB control signal so that the pass-band frequency characteristics are set for each preamplifier, filter and amplifier in the scan data signal processor in accordance with the principles of the present invention.

Fixed Projection-Type Laser Scanning System Embodying The Scan Data Signal Processor Of The Present Invention In FIGS. 8 through 8B, another alternative embodiment of laser scanning system 100 is shown in the form of fixed or portable projection-type laser scanning system. As shown in FIG. 8A, laser scanning system 100 comprises a number of subcomponents, namely: a system controller 86 (e.g. realized as a programmed microcontroller); a visible laser diode (or like device) 87 for generating a laser beam of sufficient power; a fixed focus lens subsystem 88Δ for focusing the laser beam over a predetermined scanning range, specified by the beam waist characteristics of the laser beam and maximum beam spot size required by the system; a laser scanning mechanism 89, for scanning the focused laser beam along a predefined scanning pattern (e.g. X-bar pattern) during scanner operation; a photodetector 90 for detecting the intensity of laser light reflected off a scanned bar code symbol and producing an electrical analog scan data signal corresponding to the structure of the scanned bar code symbol; a preamplification circuit 24 for preamplifying the analog scan data signal produced by the photodetector 90; a scan data signal processor 25 as shown, for example, in FIGS. 4-1 and 4-2, for processing the preamplified analog scan data signal $D_I$ and generating a digital scan data signal $D_2$ corresponding to the analog scan data signal provided as input thereto; a digitizer circuit 27 for producing digital words $D_3$ representative of the time duration of the first and second signal levels in the digital scan data signal $D_2$; a decode processor 26 for processing the digital words $D_3$ produced from the digitizer circuit 27 (e.g. using decode tables and bar code stitching techniques when using high-speed X-bar or like scanning patterns), so as to decode the digital scan data signal and produce symbol character data string representative of the corresponding laser-scanned bar code symbol; a real-time bar code element width measurement processor (e.g. programmed microprocessor) 91 for real-time measurement of the first and second binary signal levels occurring in the digital scan data signal $D_2$, as a bar code symbol is scanned at different focal planes (or zones) within the system, and real-time comparison with predetermined time duration measures stored in a Beam Spot Speed Look-Up Table 92Δ as shown in FIG. 8B (e.g. realized using EPROM or like memory structures), so as to determine the corresponding laser beam spot speed that would produce such measured time durations for a bar code symbol of a particular resolution, scanned at a particular focal plane in the system; and a pass-band filter control signal generator (e.g. programmed microprocessor) 93 for producing VPB control signals based on the determined beam spot speed of the laser scanning beam (at each particular instant in time), and providing such VPB control signals to the preamplification circuit 24, and the first and second derivative signal band-pass filters and amplifiers employed in scan data signal processor 25.

In general, the laser beam scanning mechanism 89 can be realized as either a holographic scanning mechanism similar to that used in the system of FIG. 1, a polygon-type scanning mechanism of the general type disclosed in U.S. Pat. No. 5,557,093, or other electromechanical or electro-acoustical scanning mechanism (e.g. based on Bragg or like cell structures) capable of scanning one or more focused laser beams within the scanning field of the system.

In FIG. 8B, an exemplary Beam Spot Speed Table 92Δ is shown for n-number of bar code symbol resolutions (i.e. specified by the predetermined minimum element width (x) in the bar code symbol), wherein a premeasured digital time-duration count for each minimum bar code element (x) is provided in the table according to scanning distance ($d_i$) away from the scanning mechanism. As shown, for each scanning distance $d_i$, there is a predetermined laser beam spot speed $v_i$ associated with the laser scanning system. For a given laser scanning system, a Beam Spot Speed Table is constructed by measuring the signal level durations of minimum bar code elements scanned at predetermined focal planes in the system, converting these time count measures to digital words (i.e. digital numbers), and recording these numbers in the column of a table, assigned to a particular bar code element width. During system operation, the bar code element width measurement processor 91 produces digital time counts (i.e. Numbers) which are compared with the digital time counts stored in the columns of the table of FIG. 8B. The output of this count comparison process is a corresponding beam spot speed value which would produce such a time count when a bar code symbol of a particular resolution is scanned at the corresponding scanning distance from the system. The VPB filter control signal generator 93 uses the produced beam spot speed (or like measure) to determine the appropriate VPB control signal so that the pass-band frequency characteristics are set for each preamplifier, filter and amplifier in the scan data signal processor in accordance with the principles of the present invention.

Alternative Embodiments of The Present Invention

In order to further improve the performance of the laser scanning system of the present invention, the preamplification circuit 24A (through 24D) on each analog signal processing board 13A (through 13D) in the system, as well as the front-end amplification circuit 46 within the substrate noise filter 40 shown in FIG. 4A, can be modified to include multiple signal processing channels (e.g. channel A and channel B), in a manner similar to that done in the variable pass-band filter structure shown in FIGS. 4C1 and 4C1A. The benefit of this modification would be to reject substantially all of the spectral components associated with substrate and paper noise that reside outside the frequency spectrum of the analog scan data signal scanned within a particular focal zone of the system, at each instant in time during scanner operation.

In such an alternative embodiment, the preamplification circuit 24A (through 24D), typically realized with discrete electronic components, would include preamplification circuitry along both of its channels A and B. The preamplification circuitry along each of its channels A and B would include a high-pass filter (HPF) structure for cutting off the low frequency noise signal components, a low pass filter (LPF) for cutting off the high frequency noise signal components, and an analog switch controlled by a VPB control signal produced by an analog switch controller of the type shown in FIGS. 4C1 and 4C1A. Together, the HPF and LPF in the modified preamplification circuit would cooperate to provide a preamplification structure having a variable pass-band filter structure integrated therewithin. The HPF and LPF along channel would be tuned in accordance with the filter design criteria set forth in FIGS. 4C5 through 4C7, to reject substrate and thermal noise without causing the HFP to carry out a time derivative function on the analog scan data signal. Also, the VPB control signal generated by the microprocessor 26A (through 26D) on the corresponding decode signal processing board 14A (through 14D) would be provided to the analog switch controller in the resulting analog scan data signal preamplification/filtering circuits so that the pass-band frequency response characteristics thereof are dynamically controlled by the focal zone (or scanning range) in which bar code symbols are being scanned instant by instant, on a real-time basis. Exemplary frequency response characteristics for these analog scan data signal pass-band amplifiers are illustrated in FIGS. 9A1 and 9A2, whereas approximation formulas for the upper and lower cut-off frequencies are set forth in FIG. 9A3.

In such an alternative embodiment, the front-end preamplification circuit 46 in the substrate noise filter 40 would include amplification circuitry along both of its channels A and B. The preamplification circuitry along each of its channels A and B would include a high-pass filter (HPF) structure for cutting off the low frequency noise signal components, a low pass filter (LPF) for cutting off the high frequency noise signal components, and an analog switch controlled by a VPB control signal produced by an analog switch controller of the type shown in FIGS. 4C1 and 4C1A. Together, the HPF and LPF in the modified preamplification circuit would cooperate to an amplification structure having a variable pass-band filter structure integrated therewithin. The HPF and LPF along channel A would be tuned in accordance with the filter design criteria set forth in FIGS. 4C5 through 4C7, to reject substrate and thermal noise without causing the HPF to carry out a time derivative function on the analog scan data signal. Also, the VPB control signal generated by the microprocessor 26A (through 26D) on the corresponding decode signal processing board would be provided to the analog switch controller in the resulting analog scan data signal amplification/filtering circuit so that the pass-band frequency response characteristics thereof are dynamically controlled by the focal zone (or scanning range) in which bar code symbols are being scanned instant by instant, on a real-time basis. Exemplary frequency response characteristics for these analog scan data signal pass-band amplifiers are illustrated in FIGS. 10A1 and 10A2, whereas approximation formulas for the upper and lower cutoff frequencies are set forth in FIG. 10A3.

In addition, any and all other preamplification, amplification and/or filtering circuits disposed between each photodetector 12A (through 12D) and the one-bit A/D signal conversion circuit 44 can be modified along the lines described above to incorporate a focal-zone controlled passband filtering structure in accordance with the principles of the present invention. Such modifications to the laser scanning system of the present invention will ensure that only spectral components within the spectral band of the analog scan data signal produced by the photodetector 12A (through 12D) are utilized during the first and second derivative signal generation and handling processes carried out within the scan data signal processor of the system. In turn, such modifications can be expected to improve the overall SNR along the analog scan data signal processing channel and thus improve the bar code symbol reading performance of the laser scanning system.

One may also desire to modify the bar code element detection circuit 45 shown in FIGS. 4G and 4G1 and described hereinabove by removing its missing pulse detector 81, while retaining its output transistor (i.e. FET) 82, and connecting the gate terminal of the FET 82 directly to the output terminal of the comparator 80 in the bar code element detection circuit 45. The resulting bar code element detector would operate as follows: when the signal level of the input analog scan data signal is below the zero-reference level, set by the zero-reference level generation circuit 78, then the output of the output transistor 82 is a logical low signal level, thereby disabling the second derivative zero-crossing detection circuit 73; and when the signal level of the input analog scan data signal is above the zero-reference level, set by the zero-reference level generation circuit 78, then the output of the output transistor 82 is a logical high signal level, thereby enabling the second derivative zero-crossing detection circuit 73.

An advantage provided by the above-described bar code element detector is that, by virtue of its elimination of the missing pulse detector and its inherent time constant, the modified bar code element detector will only generate a second derivative zero-crossing enable signal, and thus enable gating of detected zero-crossings to the digital output signal level generation circuit 72, for a time period equal to the time duration that the analog scan data signal level exceeds the zero-reference level. Thus, voltage spikes in the analog scan data signal, due to substrate noise, poor quality bar code printing, or other marks on the scan code symbol, will not enable the zero crossing detection circuit 73 beyond the time duration that the analog scan data signal level exceeds the zero-reference level. However, for practical reasons concerning ambient light signals, which cause a low frequency amplitude modulation of the analog scan data signal, it may be desirable to use a bar code element detection circuit employing a missing pulse detector.

While each of the illustrative embodiments described hereinabove has multiple focal zones with different depths of focus (DF), it is contemplated that the scan data signal processor range. In such alternative embodiments, a mechanism will be provided for automatically determining the position or distance of the laser-scanned bar coded object from the scanning system, and generating variable pass band (VPB) control signals for carrying out filter switching operations in the scan data signal processor of the laser scanning system.

In the illustrative embodiments described hereinabove, the variable pass-band filter structure of the present invention has been has been realized as a pair of differently-tuned analog pass-band filter circuits embedded within an analog signal switching system, thus providing a differently tuned pass-band filter for analog scan data signals produced by laser scanning bar code symbols in either the Near Scan Range of the system, or in its Far Scan Range. It is understood, however, that there a number of alternative ways to practice the present invention. Several different modes for carrying out the present invention will be described below. For example, in laser scanning systems having a plurality of predefined focal zones or regions, an equal number of differently-tuned pass-band filter circuits can be provided within an analog signal switching system so that, while the preamplified analog scan data signal to be processed is provided to each such pass-band filter circuit, the output of the optimally-designed pass-band filter can be dynamically switched into operation under microprocessor control during laser scanning operations, as taught hereinabove. In such alternative embodiments of the present invention, predefined scanning ranges, such as "Near Scan Range" and "Far Scan Range", need not be used as the focal zone or region in which analog scan data signals are generated will directly determine which optimally-designed' pass-band filter circuit should be automatically switched into operation during laser scanning operations.

Alternatively, in laser scanning systems having a plurality of predefined focal zones or regions, a variable or tunable pass-band filter circuit can be provided, wherein certain resistance, capacitance, and/or inductance values (i.e. R, C, and L, respectively) can be electronically controlled by either electrically-active and/or electrically-switchable components provided within the variable pass-band filter design. In such alternative embodiments of the present invention, the certain resistance, capacitance, and/or inductance values will be controlled by a microprocessor or microcontroller so that the predetermined lower and upper cut-off frequencies are set for the pass-band filter circuit optimally designed for focal zone or region from which each analog scan data signal is generated during laser scanning operations.

Alternatively, rather than using "analog-type" circuit technology for realizing the subcomponents of the scan data signal processor (i.e. the variable pass-band filter circuits, the analog signal switches, the first and second signal differentiation circuits, the first and second derivative signal amplifiers, the first derivative threshold level generators, the second-derivative zero-crossing detectors, the first derivative signal comparators and the digital output level generation circuit), it is understood that the scan data signal processing method and apparatus of the present invention can be implemented using finite-impulse response (FIR) type digital filters carried out either within a programmed microcomputer or using one or more custom or commercially available digital signal processing (DSP) chips known in the digital signal processing art. When carrying out a digital-filter implementation of the scan data signal processor of the present invention, the preamplified analog scan data signal $D_i$ is first pass-band filtered and then time sampled at least two times the highest frequency component expected in the analog scan data signal, in accordance with the well known Nyquist criteria. Thereafter, each time-sampled scan data signal value is quantized to a discrete signal level using a suitable length number representation (e.g. 64 bits) to produce a discrete scan data signal. A suitable quantization level can be selected in view of expected noise levels in the signal.

Thereafter, the discrete scan data signal is processed by a digital (FIR) filter implementation of the time-domain substrate-noise filter of the present invention. The discrete scan data-signal output therefrom is pass-band filtered using an FIR-type digital filter whose filter parameters (e.g. time delays and multiplier-coefficient values employed therein) are controlled or otherwise set by the microprocessor determining the focal zone (or scanning range) from which the corresponding analog scan data signal was obtained. Due to the time delays involved during digital filtering (e.g. required to sample the entire length of the analog scan data signal associated with a laser-scanned bar code symbol and perform other digital signal processing operations required by the scan data signal processing method), the variable pass band (VPB) control signals will need to be buffered for a time period equal to the time delay. Thereafter, the VPB control signal is linked up with the corresponding discrete scan data signal being processed so that the digital pass-band filter can be optimally tuned in accordance with the principles of the present invention. The discrete scan data signal is then differentiated using a derivative-type digital filter to produce a discrete first derivative signal. The discrete first derivative signal is then subject to the derivative-type filter once again to produce the second derivative signal. Both of these discrete derivative signals are then buffered in memory a conventional manner. First derivative signal thresholds are generated for each discrete point in the discrete first derivative signal.

In accordance with the method of the present invention, the discrete first derivative signal is subject to a digital (FIR) filter implementation of the bar code element detector, whereas the discrete second derivative signal is subject to zero-crossing detection. In addition, the following operations must be carried out in a time-synchronized manner: comparing the discrete first derivative signal with its generated threshold values; enabling of the digital filter implementation of the zero-crossing detector (using the output of the digital filter implementation of the bar code element detector); gating of the second derivative zero-crossings to the input of the digital output level generator; and generating digital output values for the discrete (binary-level) scan data signal. Thereafter, the discrete binary-level scan data signal can be "digitized" using digital signal processing techniques in order to produce a digital "time" count value for each of the first and second signal levels in the discrete binary scan data signal. The digital count values can then be provided to a programmed decoder for decoding the scan data signal and producing symbol character data string representative of the corresponding laser-scanned bar code symbol. Alternatively, the generated discrete binary-level scan data signal can be converted back into a continuous-type binary-level scan data signal so that it may be "digitized" using a digital signal processor of the type taught in U.S. Pat. No. 5,828,049, incorporated herein by reference.

Advantages Provided By The Analog Scan Data Signal Processor Of The Present Invention One advantage provided by the scan data signal processor of the present invention is that the scan data signal processor has improved signal-to-noise ration (SNR) and dynamic range at t its first derivative signal thresholding stage, and improved SNR at its second-derivative zero crossing detection stage, which results in a significant decrease in the effective beam diameter at each focal zone in the system. In turn, this increases the length of each focal zone in the system, was shown in FIGS. 5A and 5B, which allows the system designer to (i) provide more overlap between adjacent focal zones or produce a laser scanning system with a larger overall depth of field; and (ii) produce a laser scanning system capable of scanning/resolving bar code symbols having narrower element widths and/or printed on substrates whose normal vector is disposed at large angles from the projection axis of scanning system.

In general, an excellent figure of merit for a laser scanning system is given by the ratio of t(i) the laser beam cross-sectional dimension at a focal plane in the system; to (ii) the minimum element width of a bar code that can be accurately represented by the digital output of the analog scan data signal processor when scanned at that focal plane. As used hereinafter and in the claims to invention, this figure of merit provided by the above-described ratio shall be referred to as the "Minimum Beam Dimension/Minimum Bar Width (MBD/MBW) Ratio", or alternatively, the MBD/MBW figure of merit of a particular laser scanning system. The importance of this figure is revealed by the fact that a laser scanning system having a MBD/MBW ratio greater than can resolve (or read) a bar code symbol with a laser beam having a minimum beam dimension greater than the minimum width of the bar code elements in the scanned symbol.

The greater the MBD/MBW ratio, the higher the resolution of the bar code symbols that can be read by the system without increasing the output power of VLD producing the laser scanning beams in the system. Thus an increase in the MBD/MBW ratio of a system implies that the less laser beam power is required to produce a digital scan data signal by virtue of an increase in SNR within the analog scan data signal process of the system. By reducing the effects of substrate noise in the laser scanning system of the present invention, it has been possible to use (or define) smaller cross-section of the laser scanning beams in the system, containing less laser power, to scan smaller bar code symbol elements without reducing the overall SNR of the scan data signal processor.

As shown in the table of FIG. 5C, the MBD of the laser scanning beams at each focal plane in the system of FIG. 1 are presented along the MBW of bar code symbols that have been correctly read by the system at such focal planes. As indicated by the data in this table, the MBD/MDW ratio for this system in each of its five focal zones is 2.0. Notably, this figure of merit was achieved using the analog signal processor shown in FIGS. 4-1 through 4H4, but without installation of the time-domain substrate noise filter 40 shown in FIG. 4A. With the substrate noise filter installed in the signal processor, it is expected that the MBD/MBW ratio for each of the focal zones in the system of FIG. 1 will be significantly increased to at least 2.1 or greater, thus providing for the first time in history, a laser scanning bar code symbol reader having a MBD/MBW ratio comparable to that of conventional single focal zone polygonal-type laser scanning systems.

It is understood that the laser scanning system, and scan data signal processor of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A multi-focal zone laser scanning system for scanning bar code symbols having a minimum bar element width (MBW), said multi-focal zone laser scanning system comprising:

a laser beam producing device for producing a laser beam;

a laser beam scanning mechanism for scanning said laser beam so as to generate a laser scanning pattern having a plurality of different focal zones and producing an analog scan data signal representative of a bar code symbol scanned by said laser scanning pattern, and a scan data signal processor for processing said analog scan data signal, said scan data signal processor including a plurality of different pass-band filters, wherein one of said pass-band filters is dynamically switched into operation for pass-band filtering the analog scan data signal produced by said laser beam scanning a bar code symbol within one of said plurality of different focal zones so as to filter out spectral components of paper noise residing outside the frequency spectrum of said analog scan data signal produced in response to scanning said bar code symbol within said different focal zone;

wherein said scanned laser beam has a minimum beam dimension (MBD) with each said focal zone, and wherein the ratio of said minimum beam dimension (MDB) within each said focal zone to said minimum bar element width (MBW) of a scanned bar code symbol within said focal zone (i.e. MDB/MBW) is greater than or equal to 2.0.

2. The multi-focal zone laser scanning system of claim 1, wherein said laser beam producing device is a visible laser diode.

3. The multi-focal zone laser scanning system of claim 1, wherein said laser scanning mechanism is a holographic-type laser scanning mechanism employing a holographic scanning disc supporting a plurality of holographic optical elements.

4. A method of scanning bar code symbols having a minimum bar element width (MBW), said method comprising the steps of:

(a) producing a laser beam from a laser beam producing device; and (b) scanning said laser beam with a laser beam scanning mechanism so as to generate a laser scanning pattern having a plurality of different focal zones, and (c) processing said analog scan data signal using a data signal processor including a plurality of different pass-band filters, wherein one of said pass-band filters is dynamically switched into operation for pass-band filtering the analog scan data signal produced by said laser scanning beam scanning a bar code symbol within one of said plurality of different focal zones so as to filter out spectral components of paper noise residing outside the frequency spectrum of said analog scan data signal produced in response to scanning said bar code symbol within said different focal zone wherein said scanned laser beam has a minimum beam dimension (MBD) with each said focal zone, and wherein the ratio of said minimum beam dimension (MDB) within each said focal zone to said minimum bar element width (MBW) of a scanned bar code symbol within said focal zone is greater than or equal to 2.0.

5. The method of claim 4, where during step (a) said laser beam producing device is a visible laser diode.

6. The method of claim 4, where during step (b) said laser scanning mechanism is a holographic-type laser scanning mechanism employing a holographic scanning disc supporting a plurality of holographic optical elements.

* * * * *

UNITED STATES PATENT AND TRADEMARK OFFICE
CERTIFICATE OF CORRECTION

PATENT NO. : 6,581,835 B1
APPLICATION NO. : 09/500874
DATED : June 24, 2003
INVENTOR(S) : Mark Lucera et al.

Page 1 of 1

It is certified that error appears in the above-identified patent and that said Letters Patent is hereby corrected as shown below:

On the Title Page, Item (63), should read,

Continuation of application No. 09/442,718 filed November 18, 1999, which is a continuation of application No. 09/241,930 filed February 2, 1999, which is a continuation of application No. 09/157,778 filed September 21, 1998; which is a continuation of application No. 09/047,146 filed March 24, 1998; which is a continuation of application No. 08/949,915 filed October 14, 1997, now Pat. No. 6,158,659, which is a continuation of application No. 08/854,832 filed May 12, 1997, now Pat. No. 6,085,978; which is a continuation of application No. 08/886,806 filed April 22, 1997, now Pat. No. 5,984,185; which is a continuation of application No. 08/726,522 filed October 7, 1996, now Pat. No. 6,073,846; which is a continuation of application No. 08/573,949 filed December 18, 1995, now abandoned.

Signed and Sealed this

Second Day of December, 2008

JON W. DUDAS
*Director of the United States Patent and Trademark Office*